US010533128B2

United States Patent
Vadrucci et al.

(10) Patent No.: US 10,533,128 B2
(45) Date of Patent: Jan. 14, 2020

(54) OPTICALLY UPCONVERTING LIQUID-FILLED POLYMERIC MATERIALS

(71) Applicant: ADOLPHE MERKLE INSTITUTE, UNIVERSITY OF FRIBOURG, Fribourg (CH)

(72) Inventors: Roberto Vadrucci, Bachenbuelach (CH); Yoan C. Simon, Hattiesburg, MS (US); Christoph Weder, Duedingen (CH)

(73) Assignee: ADOLPHE MERKLE INSTITUTE, UNIVERSITY OF FRIBOURG, Fribourg (CH)

(*) Notice: Subject to any disclaimer, the term of this patent is extended or adjusted under 35 U.S.C. 154(b) by 0 days.

(21) Appl. No.: 15/780,922

(22) PCT Filed: Dec. 2, 2016

(86) PCT No.: PCT/EP2016/079661
§ 371 (c)(1),
(2) Date: Jun. 1, 2018

(87) PCT Pub. No.: WO2017/093530
PCT Pub. Date: Jun. 8, 2017

(65) Prior Publication Data
US 2019/0169495 A1 Jun. 6, 2019

Related U.S. Application Data
(60) Provisional application No. 62/262,081, filed on Dec. 2, 2015.

(51) Int. Cl.
C09K 11/02 (2006.01)
C09K 11/06 (2006.01)
(Continued)

(52) U.S. Cl.
CPC .......... *C09K 11/025* (2013.01); *C08F 220/28* (2013.01); *C08K 5/01* (2013.01);
(Continued)

(58) Field of Classification Search
CPC .......................... C09K 11/025; C09K 11/06
See application file for complete search history.

(56) References Cited

U.S. PATENT DOCUMENTS 6,733,946 B2* 5/2004 Kumacheva ........... B82Y 10/00
428/141
2004/0183963 A1* 9/2004 Nakamura ............. H01L 27/322
349/69
2010/0301285 A1 12/2010 Miteva et al.

FOREIGN PATENT DOCUMENTS

EP 2067838 A1 6/2009
EP 2420547 A1 2/2012
(Continued)

OTHER PUBLICATIONS

Börjesson, K., Photon upconversion facilitated molecular solar energy storage, J. Mater. Chem. A., vol. 1, No. 30, Aug. 14, 2013, pp. 8521-8524, RSC Publishing.
(Continued)

*Primary Examiner* — C Melissa Koslow
(74) *Attorney, Agent, or Firm* — Hudak, Shunk & Farine Co. LPA

(57) ABSTRACT

Optically upconverting liquid-filled polymeric materials that are made by curing a curable composition. The materials include a substantially liquid phase that serves to dissolve upconverting chromophores, optionally surfactants and an optionally cross-linked polymer matrix that retains or houses the liquid phase, provides mechanical stability, and offers some protection from oxygen. The optically upconverting liquid-filled polymeric materials have a phase-separated
(Continued)

morphology. In preferred embodiments, the domains formed by the two phases are so small that light scattering is largely suppressed, which renders the upconverting liquid-filled polymeric materials largely transparent. The liquid phase provides a high mobility of the dissolved chromophores and the photophysical properties, such as the high upconversion quantum efficiency and the low excitation intensity threshold required to achieve upconversion, are thus more reminiscent of conventional or oxygen-free solutions than polymeric solids. These photophysical properties can be achieved by preparing the polymers under oxygen-free or, in preferred embodiments, under ambient conditions. The design principle introduced here to create upconverting liquid-filled polymeric materials is versatile and general; the liquid phase, the surfactants, the polymer matrix, and the upconverting chromophores can all readily be varied. Importantly, the optically upconverting liquid-filled polymeric materials can be prepared in a one-step process, which makes them preferable over other liquid-containing polymers that enable upconversion.

25 Claims, 26 Drawing Sheets

(51) Int. Cl.
  *C08K 5/19* (2006.01)
  *C08F 220/28* (2006.01)
  *C08K 5/01* (2006.01)
  *C08K 5/56* (2006.01)
(52) U.S. Cl.
  CPC .................. *C08K 5/19* (2013.01); *C08K 5/56* (2013.01); *C09K 11/06* (2013.01); *C08F 2220/281* (2013.01); *C08F 2800/20* (2013.01); *C08F 2810/20* (2013.01); *C09K 2211/1007* (2013.01); *C09K 2211/1011* (2013.01); *C09K 2211/1022* (2013.01); *C09K 2211/1029* (2013.01); *C09K 2211/185* (2013.01)

(56) References Cited

FOREIGN PATENT DOCUMENTS

JP  2011505479 A  2/2011
WO  2014117203 A1  8/2014

OTHER PUBLICATIONS

Goldschmidt et al., Upconversion for Photovoltaics—a Review of Materials, Devices and Concepts for Performance Enhancement, Advanced Optical Materials, 2015, pp. 510-535, vol. 3.
Zhou et al., Upconversion Luminescent Materials: Advances and Applications, Chemical Reviews, 2015, pp. 395-465, vol. 115.
Amemori et al., Metallonaphthalocyanines as Triplet Sensitizers for Near-Infrared Photon Upconversion Beyond 850 nm, Phys. Chem. Chem. Phys., 2015, pp. 22557-22560, vol. 17.
Yakutkin et al., Towards the IR Limit of the Triplet-Triplet Annihilation-Supported Up-Conversion: Tetraanthraporphyrin, Chemistry, A European Journal, 2008, pp. 9846-9850, vol. 14.
Duan et al., Photon Upconverting Liquids: Matrix-Free Molecular Upconversion Systems Functioning in Air, Journal of the American Chemical Society, 2013, pp. 19056-19059, vol. 135.
De Mello et al., An Improved Experimental Determination of External Photoluminescence Quantum Efficiency, Advanced Materials, 1997, pp. 230-232, vol. 9, No. 3.
Singh-Rachford et al., Photon Upconversion based on sensitized Triplet-Triplet Annihilation, Coordination Chemistry Reviews, 2010, pp. 2560-2573, vol. 254.
Simon et al., Low-Power Photon Upconversion Through Triplet-Triplet Annihilation in Polymers, Journal of Materials Chemistry, 2012, pp. 20817-20830, vol. 22.
Derosa et al., Photosensitized Singlet Oxygen and its Applications, Coordination Chemistry Reviews, 2002, 233-234, pp. 351-371.
Moth-Poulsen et al., Molecular Solar Thermal (MOST) Energy Storage and Release System, Energy & Environmental Science, 2012, pp. 8534-8537, vol. 5.
Borgesson et al., Photon Upconversion Facilitated Molecular Solar Energy Storage, Journal of Materials Chemistry A, 2013, pp. 8521-8524, vol. 1.
Gray et al., Triplet-Triplet Annihilation Photo-Upconversion:Towards Solar Energy Applications, Phys. Chem. Chem. Phys. 2014, pp. 10345-10352, vol. 16.
Khnayzer et al., Upconversion-powered Photoelectrochemistry, Chem. Commun., 2012, pp. 209-211, vol. 48.
Monguzzi et al., High Efficiency Up-Converting Single Phase Elastomers for Photon Managing Applications, Advanced Energy Materials, 2013, pp. 680-686, vol. 3.
Ye et al., Oil-in-Water Microemulsion: An Effective Medium for Triplet-Triplet Annihilated Upconversion with Efficient Triplet Acceptors, Journals of Materials Chemistry C, 2014, pp. 8507-8514, vol. 2.
Jiang et al., Red-Light-Controllable Liquid-Crystal Soft Actuators via Low-Power Excited Upconversion Based on Triplet-Triplet Annihilation, Journal of the American Chemical Society, 2013, pp. 16446-16453, vol. 135.
Liu et al., Blue-Emissive Upconversion Nanoparticles for Low-Power-Excited Bioimaging in Vivo, Journal of the American Chemical Society, 2012, pp. 5390-5397, vol. 134.
Liu et al., Upconversion Luminescence Imaging of Cells and Small Animals, Nature Protocols, 2013, pp. 2033-2044, vol. 8, No. 10.
Borisov et al., Triplet-Triplet Annihilation-Based Anti-Stokes Oxygen Sensing Materials with a Very Broad Dynamic Range, Advanced Functional Materials, 2012, pp. 4360-4368, vol. 22.
Bagnich et al., Origin of Delayed Fluorescence of a Ladder-Type Methyl-poly(para-phenylene) Doped with Pt(II) octaethylporphyrin, Chemical Physics Letters, 2003, pp. 464-470, vol. 381.
Keivanidis et al., Up-Conversion Photoluminescence in Polyfluorene Doped with Metal(II)-Octaethyl Porphrins, Advanced Materials, 2003, pp. 2095-2098, vol. 15, No. 24.
Duan et al., Aggregation-Induced Photon Upconversion Through Control of the Triplet Energy Landscapes of the Solution and Solid States, Angewandte Chem. Int. Ed. 2015, pp. 7544-7549, vol. 54.
Mahato et al., Fast and Long-Range Triplet Exciton Diffusion in Metal-Organic Frameworks for Photon Upconversion at Ultralow Excitation Power, Nature Materials, 2015, pp. 924-932, vol. 14.
Vadrucci et al., Low-Power Photon Upconversion in Organic Glasses, Journal of Materials Chemistry C, 2014, pp. 2837-2841, vol. 2.
Vadrucci et al., Organogels for Low-Power Light Upconversion, Materials Horizons, 2015, pp. 120-124, vol. 2.
Duan et al., Photon Upconversion in Supramolecular Gel Matrixes: Spontaneous Accumulation of Light-Harvesting Donor-Acceptor Arrays in Nanofibers and Acquired Air Stability, Journal of the American Chemical Society, 2015, pp. 1887-1894, vol. 137.
Sripathy et al., Highly Efficient Photochemical Upconversion in a Quasi-Solid Organogel, Journal of Materials Chemistry C, 2015, pp. 616-622, vol. 3.
Perez-Ruiz et al., Photophysical and Photochemical Processes in 3D Self-Assembled Gels as Confined Microenvironments, Soft Matter, 2015, pp. 5180-5187, vol. 11.
Islangulov et al., Noncoherent Low-Power Upconversion in Solid Polymer Films, Journal of the American Chemical Society, 2007, pp. 12652-12653, vol. 129.
Singh-Rachford et al., Influence of Temperature on Low-Power Upconversion in Rubbery Polymer Blends, Journal of the American Chemical Society, 2009, pp. 12007-12014, vol. 131.
Merkel et al., Low-Power Green-to-Blue and Blue-to-UV Upconversion in Rigid Polymer Films, Journal of Luminescence, 2009, pp. 303-306, vol. 129.

(56) References Cited

OTHER PUBLICATIONS

Lee et al., Melt-Processed Polymer Glasses for Low-Power Upconversion via Sensitized Triplet-Triplet Annihilation, Journal of Materials Chemistry C, 2013, pp. 5142-5148, vol. 1.

Lee et al., Light Upconversion by Triplet-Triplet Annihilation in Diphenylanthracene-based Copolymers, Polymer Chemistry, 2014, pp. 6898-6904, vol. 5.

Lee et al., Glassy Poly(methacrylate) Terpolymers with Covalently Attached Emitters and Sensitizers for Low-Power Light Upconversion, Journal of Polymer Science, Part A: Polymer Chemistry, 2015, pp. 1629-1639, vol. 53.

Lee et al., Low-Power Upconversion in Poly(Mannitol-Sebacate) Networks with Tethered Diphenylanthracene and Palladium Porphyrin, J Inorg Organomet Polym, 2014, pp. 898-903, vol. 24.

Monguzzi et al., Upconversion-Induced Delayed Fluorescence in Multicomponent Organic Systems: Role of Dexter Energy Transfer, Physical Review B, 2008, pp. 155122-1 to 155122-4, vol. 77.

Monguzzi et al., Energy Transfer Enhancement by Oxygen Perturbation of Spin-Forbidden Electronic Transitions in Aromatic Systems, Physical Review B, 2010, pp. 125113-1 to 125113-4, vol. 82.

Wohnhaas et al., All Organic Nanofibers as Ultralight Versatile Support for Triplet-Triplet Annihilation Upconversion, ACS Macro Letters, 2013, pp. 446-450, vol. 2.

Svagan et al., Photon Energy Upconverting Nanopaper: A Bioinspired Oxygen Protection Strategy, ACS Nano, 2014, pp. 8198-8207, vol. 8, No. 8.

Monguzzi et al., Low Power, Non-Coherent Sensitized Photon Up-Conversion: Modelling and Perspectives, Phys. Chem. Chem. Phys., 2012, pp. 4322-4332, vol. 14.

Lester et al., Physical Properties of Hydrogels Synthesized from Lyotropic Liquid Crystalline Templates, Chem. Mater., 2003, pp. 3376-3384, vol. 15.

Gin et al., Polymerized Lyotropic Liquid Crystal Assemblies for Materials Applications, Accounts of Chemical Research, 2001, pp. 973-980, vol. 34, No. 12.

Yamamoto et al., Phase-Separated Conetwork Structure Induced by Radical Copolymerization of Poly (dimethylsiloxane)-α,ω-diacrylate and N,N-Dimethylacrylamide, Macromolecules, 2009, pp. 9561-9567, vol. 42.

Yokota et al., Transmission Electron Microscopic Observations of the Multilevel Microstructure of Crosslinked Copolymers with Methacrylates and Siloxane Macromers by a Radically Polymerizable Tuning Approach, Journal of Applied Polymer Science, 2013, DOI: 10.1002/APP.37764, pp. 3325-3332.

Seo et al., Reticulated Nanoporous Polymers by Controlled Polymerization-Induced Microphase Separation, Science, 2012, pp. 1422-1425, vol. 336.

Schulze et al., High-Modulus, High-Conductivity Nanostructured Polymer Electrolyte Membranes via Polymerization-Induced Phase Separation, Nano Letters, 2014, pp. 122-126, vol. 14.

Singh-Rachford et al., Low Power Visible-to-UV Upconversion, Journal Phys. Chem. A, 2009, pp. 5912-5917, vol. 113.

Baluschev et al., Up-Conversion Fluorescence: Noncoherent Excitation by Sunlight, Physical Review Letters, 2006, PRL 97, pp. 143903-1 to 143903-3.

Singh-Rachford et al., Pd(II) Phthalocyanine-Sensitized Triplet-Triplet Annihilation from Rubrene, Journal Phys. Chem. A, 2008, pp. 3550-3556, vol. 112.

Singh-Rachford et al., Triplet Sensitized Red-to-Blue Photon Upconversion, The Journal of Physical Chemistry Letters, 2010, pp. 195-200, vol. 1.

Monguzzi et al., Multicomponent Polymeric Film for Red to Green Low Power Sensitized Up-Conversion, The Journal of Physical Chemistry A Letters, 2009, pp. 1171-1174, vol. 113.

Peng et al., In-Situ Synchrotron SAXS Study of Polymerizable Microemulsions, Macromolecules, 2011, pp. 3007-3015, vol. 44.

Page et al., Capturing Nanoscale Structure in Network Gels by Microemulsion Polymerization, ACS Macro Letters, 2012, pp. 1398-1402, vol. 1.

Gratzel, M., Photoelectrochemical Cells, Nature, 2001, pp. 338-344, vol. 414.

Monguzzi et al., Upconversion-Induced Fluorescence in Multicomponent Systems: Steady-state Excitation Power Threshold, Physical Review B, 2008, pp. 195112-1-195112-5, vol. 78.

Haefele et al., Getting to the (Square) Root of the Problem: How to Make Noncoherent Pumped Upconversion Linear, The Journal of Physical Chemistry Letters, 2012, pp. 299-303, vol. 3.

* cited by examiner a)

b)

OPTICALLY UPCONVERTING LIQUID-FILLED POLYMERIC MATERIALS

FIELD OF THE INVENTION

This invention relates to optically upconverting liquid-filled polymeric materials that are made by curing a curable composition. The materials according to the invention comprise a substantially liquid phase that serves to dissolve upconverting chromophores, optionally surfactants and an optionally cross-linked polymer matrix that retains or houses the liquid phase, provides mechanical stability, and offers some protection from oxygen. The optically upconverting liquid-filled polymeric materials according to the present invention have a phase-separated morphology. In preferred embodiments, the domains formed by the two phases are so small that light scattering is largely suppressed, which renders the upconverting liquid-filled polymeric materials largely transparent. The liquid phase provides a high mobility of the dissolved chromophores and the photophysical properties, such as the high upconversion quantum efficiency and the low excitation intensity threshold required to achieve upconverison, are thus more reminiscent of conventional or oxygen-free solutions than polymeric solids. These photophysical properties can be achieved by preparing the polymers under oxygen-free or, in preferred embodiments, under ambient conditions. The design principle introduced here to create upconverting liquid-filled polymeric materials is versatile and general; the liquid phase, the surfactants, the polymer matrix, and the upconverting chromophores can all readily be varied. Importantly, the optically upconverting liquid-filled polymeric materials according to the present invention can be prepared in a one-step process, which makes them preferable over other liquid-containing polymers that enable upconversion.

BACKGROUND OF THE INVENTION

Light upconversion (UC) is a process capable of transforming low-energy radiation into blue-shifted light by combining the energy of two or multiple photons. Among the various upconversion-schemes, UC by means of triplet-triplet annihilation (TTA) relies on organic and/or organometallic dyes, which enable upconversion to occur at low radiation intensities (often at power densities of 100 mW·cm$^{-2}$ or even lower) therefore widening the scope of UC-materials.[1,2] TTA-UC systems usually comprise two dyes: a sensitizer, which harvests light and converts it into triplet excited-states and an emitter, which accepts and transforms these triplet excitons into high-energy radiation by means of TTA (FIG. 1). Important requirements for TTA-UC systems are shielding from oxygen, as it efficiently quenches excited triplet states[3] and sufficient exciton mobility for both triplet-energy transfer and TTA-steps. Both requirements are best met in oxygen-free solutions.

TTA-UC has been proposed for energy-conversion related applications such as molecular energy storage,[4-6] photoelectrochemical water splitting[7-9] or soft actuators[10] and for other applications such as bioimaging[11,12] or oxygen sensing.[13] In the last years, research efforts have also been directed towards the efficient implementation of TTA-UC in solid-state materials as they are more suitable for or even instrumental for certain applications. Organic materials only consisting of chromophores have been among the first solid TTA-UC materials studied[14,15] and are still an important subject of investigation.[16-18] Self-standing solid-state materials have been obtained by blending TTA-UC dye-pairs into polymeric[19] and molecular gels[20-22] as well as in rubbery[23,24] or glassy[18,25-28] polymer matrices. Usually, high dye contents exceeding 20 wt. % are required in rigid host polymers to compensate for the low translational and rotational mobility of the dye molecules and in order to maximize their upconversion efficiency.[26-29] This can be rationalized by the fact that triplet-energy transfer from sensitizers to emitters mainly follows Dexter energy-transfer scheme[30] and therefore requires close proximity (typically a distance of less than ca. 30 Å) of the moieties involved.[31] In contrast to glassy polymers, rubbery polymers achieve high upconversion quantum efficiencies also at relatively low dye loadings (ca. 0.1 wt. % emitter-content). However, TTA-UC elastomers can suffer from phase segregation of the dyes blended therein and display more limited mechanical properties compared to glasses.[23,24] A different strategy pursued to preserve the photophysical solution-properties of dyes in rigid materials is the use of rigid-shell, liquid-core capsules. Such capsules contain the TTA-UC dyes in their core and can subsequently be embedded in a polymer poly(vinyl alcohol)[32] or cellulose nanofibers[33] matrix, for example by electrospinning or solution casting. Unfortunately, such prior-art materials can only be fabricated by complex multi-step processes. Another problem is the fact that such approaches often lead to materials in which either the liquid-filled particles, their aggregates or the matrix cause scattering. This renders materials made with prior art processes often opaque, which in the context of the desired upconversion is undesirable. Opaque materials lead to a reduced light absorption and give lower quantum efficiencies.[34]

SUMMARY OF THE INVENTION

The present invention teaches new optically upconverting liquid-filled polymeric materials and methods for producing the same, which combine the high upconversion efficiency achieved in solutions with features offered by solid-state materials. An optional but important feature of the new materials is that the design can provide relatively good protection from oxygen (a well-known quencher of the triplet excited states that are formed as intermediates in the UC process) leading to high TTA-UC efficiencies under ambient conditions, which is achieved thanks to the low oxygen diffusion into the material. Other important features of the new materials are their high mechanical stability and in some embodiments their heat-processablilty.[26] The upconverting liquid-filled polymeric materials according to the invention comprise a substantially liquid phase that serves to dissolve the upconverting chromophores and an optionally cross-linked polymer matrix that retains or houses the liquid phase and provides mechanical stability. In preferred embodiments, the ensemble also provides some protection of the dyes from oxygen. In the embodiments described here, the liquid phase is selected to be hydrophobic, whereas the polymer phase is selected to be hydrophilic, but it should be obvious to those skilled in the art that the polarity can be reversed. A schematic representation of a preferred embodiment is shown in FIG. 2. In preferred embodiments the matrix polymer is glassy and the phase separated morphology is characterized by feature dimensions that are smaller than the wavelength of light (so that the materials are largely transparent), although it is emphasized that other valuable embodiments may comprise a non-glassy matrix or may display other phase separated morphologies with different feature sizes. It is also duly noted that the term "liquid-filled" is used to convey that the upconverting liquid-filled polymeric materials according to the present invention contain a phase referred to as "liquid", in which the dye molecules enjoy a higher mobility than they would in the polymer matrix, based on the knowledge that higher dye mobility often leads to higher energy transfer rates and higher upconversion efficiency. So the liquid phase may be a true low-viscosity or high viscosity liquid, a gel, a viscous polymer, or even a rubbery material.

In one aspect, a light upconverting phase-separated material is disclosed, which contains at least one solid phase that comprises, by majority, a polymer; and which contains at least one liquid phase, wherein said at least one liquid phase contains at least a dye pair that is capable of optical upconversion. In preferred embodiments, the light upconverting phase-separated materials according to the present invention are made by curing a curable composition. The process of "curing" can include various processes that cause the solidification of an originally liquid composition. Thus, when utilized herein, the term "cured" specifically with respect to the solid phase or a polymer of the solid phase, is defined as a solidified composition. Preferred embodiments of curing are disclosed that involve solidification through polymerization of an initially liquid monomer or mixture of monomers, leading to either linear or cross-linked polymers. Most preferred are embodiments where the curing occurs through a free radical polymerization process.

In another aspect, a method for producing a light upconverting phase-separated material is disclosed, comprising the steps of combining at least a hydrophilic monomer or mixture of monomers, a hydrophobic liquid, and a dye pair that is capable of optical upconversion to form a liquid mixture; polymerizing the hydrophilic monomer or mixture of monomers to form a phase-separated material containing at least one solid phase and at least one liquid phase, wherein the solid phase is substantially composed of the polymerized monomer or monomers and the liquid phase is substantially composed of the hydrophobic liquid and the dye pair.

In another aspect, a method for producing a light upconverting phase-separated material containing at least one solid phase that comprises, by majority, a polymer, and containing at least one liquid phase, wherein said at least one liquid phase contains at least a dye pair that is capable of optical upconversion, is disclosed, comprising the steps of providing a curable composition and curing said curable composition to form said light upconverting phase-separated material, wherein said curable composition is a liquid containing at least one polymerizable monomer, a non-polymerizable liquid, and at least one dye pair that is capable of optical upconversion, wherein preferably the polymerizable monomer is selected from hydrophilic monomers, and the non-polymerizable liquid is selected from hydrophobic liquids.

In a further aspect, a liquid curable composition is disclosed, comprising at least one monomer polymerizable by radical polymerization, at least one non-polymerizable liquid, and at least one dye pair that is capable of optical upconversion, and one or more auxiliary components selected from surfactants, plasticizers, stabilizers, wherein said liquid curable composition can be cured into a light upconverting phase-separated material that comprises at least one solid phase and at least one liquid phase.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
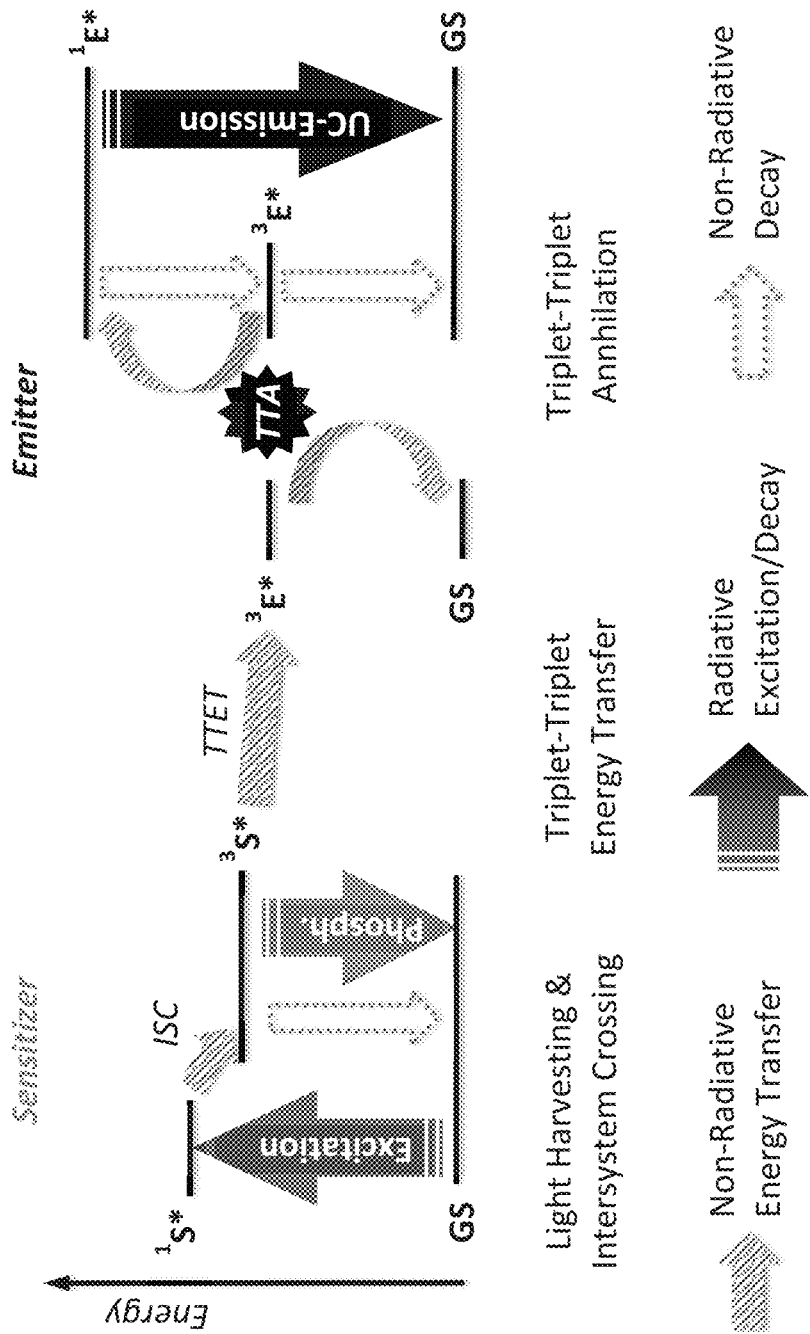
FIG. 1 illustrates an energy diagram displaying the various radiative and non-radiative processes involved in a triplet-triplet annihilation upconversion (TTA-UC) system. ISC: intersystem crossing, TTET: triplet-triplet energy transfer, TTA: triplet-triplet annihilation, GS: ground state, $^1S^*$, $^1E^*$: first singlet excited states of the sensitizer S and the emitter E, $^3S^*$, $^3E^*$: first triplet excited states of these species. As a result of exciting the sensitizer, blue-shifted light is emitted. In case of insufficient TTET, red-shifted sensitizer phosphorescence is observed.

Disclosed herein are light upconverting phase-separated materials, comprising at least one solid phase and at least one liquid phase, which differ in their polarity. In the embodiments demonstrated herein, the solid phase is hydrophilic and the liquid phase is hydrophobic, but those skilled in the art will appreciate that the polarities can be reversed via the choice of the constituents so to obtain materials in which the solid phase is hydrophobic and the liquid phase is hydrophilic. Indeed, those skilled in the art will appreciate that the polarity difference between the molecules that form the solid phase and the molecules of the liquid phase is important for the separation of these phases. The phase-separated material of the invention can contain up to 70 wt. % of the liquid phase, the rest being the solid phase; in preferred embodiments, the fraction of the liquid phase is up to 40 wt. % and in most preferred embodiments 30 wt. % or less. It can also be advantageous to limit the fraction of the liquid phase to 20 wt. % or less. Normally, the fraction of the liquid phase is at least 1 wt. %, in preferred embodiments more than 2 wt. % and in most preferred embodiments at least about 5 wt. % or more than 5 wt. %.

The one or more solid phases of the embodiments shown herein comprise, by majority, a polymer, herein defined as a polymer or copolymer, the term "majority" indicating 50 wt. % or more of the solid phase or phases. The solid may further contain other components such as stabilizers, plasticizers, compounds that modify the refractive index, components of the liquid in immobilized form; such components are described further below. In a typical embodiment, the polymer or copolymer comprises, or is formed from monomers including hydrophilic units. Monomers useful for the purpose typically comprise two or more functional groups, and are capable to undergo a polymerization reaction. A key element of preferred embodiments of the present invention is that the liquid phase does not need to be encapsulated prior to being used to fabricate the present phase-separated materials; instead, the components forming the liquid phase are combined with all other components used to form the present phase-separated materials and the resulting liquid curable composition can be cured to form the present phase-separated material comprising separate liquid and solid phases. The liquid phase(s) of the embodiments shown herein include(s) at least one dye pair that is capable of optical upconversion and a hydrophobic liquid. In this case, i.e., when the phase-separated material is composed of a hydrophobic liquid phase and a hydrophilic solid phase, the dyes employed are preferably well soluble in said hydrophobic liquid and display a higher solubility in said hydrophobic liquid phase than in the hydrophilic polymer or copolymers that form the solid phase. When the phase-separated material is composed of a hydrophilic liquid phase and a hydrophobic solid phase, the dyes employed are preferably well soluble in said hydrophilic liquid and display a higher solubility in said hydrophilic liquid phase than in the hydrophobic polymer or copolymers that form the solid phase. While in preferable embodiments of the present invention the majority of the dyes and in most preferred embodiments all of the dyes are included in the liquid phase, the present invention also includes embodiments in which the dyes can be found in both phases, embodiments in which the majority of the dyes is included in the solid phase, and embodiments where several dyes are present, with the majority of at least one of said dyes being incorporated in the liquid phase, and the majority of at least one of said dyes being incorporated in the solid phase. Typically, the curable composition according to the present invention is a liquid mixture comprising all components necessary for the present material. The curable composition according to the present invention can also consist of more than one liquid phase, typically comprising a monomer-rich (and in the case of the present examples: hydrophilic) phase as a continuous phase and the components ultimately forming the liquid (and in the present examples: hydrophobic) phase or phases as discontinuous phase(s). In preferred embodiments, the materials and the curable composition of the present invention also include an amphiphilic component, preferably a surfactant. Other preferred embodiments also contain a plasticizer.

As evidenced by the examples presented below, the properties of the light upconverting phase-separated materials can be specifically tailored by varying the concentrations of the components, as well as the individual species or types of components per se. For example, minimizing the size of the domains and matching the refractive indices of the solid phase and the liquid phase help to minimize scattering effects and thus maximize the transmission. The refractive index can be matched via the specific components used to form said phases. Optionally, one or multiple refractive index modifying compounds are introduced into at least one of the two phases.

The at least one solid phase of the materials of the invention provides mechanical stability and retains or houses the at least one liquid phase. Depending upon the composition of the solid phase, varying degrees of protection from oxygen can be obtained.

The embodiments of the present invention are made by curing a curable composition. For example, various monomers can be utilized in the curable composition according to the present invention to form, upon curing, the solid phase. Examples of suitable hydrophilic monomers that can be polymerized by free radical processes to create a hydrophilic solid phase include, but are not limited to, polar acrylates (such as 2-hydroxyethyl acrylate) or methacrylates (such as 2-hydroxyethyl methacrylate and dimethylaminoethyl methacrylate), acrylamides or methacrylamides, acrylic acids or methacrylic acids and their salts (such as acrylic acid or methacrylic acid), vinylpyridines (such as 4-vinyl pyridine), oxazolines and combinations thereof. Multifunctional cross-linkers such as tetraethylene glycol diacrylate or triethylene glycol dimethacrylate can also be used to create cross-linked materials. Those skilled in the art will appreciate that if materials are made in which the polarity of the solid and liquid phase are reversed, hydrophobic monomers are used. Examples include non-polar acrylates (such as butyl acrylate or methyl acrylate) or methacrylates (such as methyl meth-acrylate), acrylamides or methacrylamides (such as N-octadecylacrylamide), and styrenes. In the case of curing by free radical polymerization, the curable composition normally contains an initiator. Suitable initiators are those known in the art of free radical polymerization and include, but are not limited to, thermal initiators such as 2,2'-azobisisobutyronitrile and other azo initiators or benzoyl peroxide and other peroxides or hydroperoxides, as well as photoinitiators such as alpha-hydroxyalkylphenones or benzophenone/amine systems. In preferred embodiments redox initiators are used, such as the pair benzoyl peroxide and N, N-dimethylaniline.

As an alternative or addition to monomers that can be polymerized by free radical polymerization, the curable composition of the present invention can comprise monomer systems that can be polymerized by step growth polymerization, such as diisocyanate/diol mixtures, or epoxy resin and other thermoset resin formulations such as vinylesters and polyesters.

Other materials that can be included as matrix forming material are compounds that influence the phase separation, act as a plasticizer, and/or modify the refractive index such as ethylene glycol and other polyols, water, oligo and polyethers such as oligo and poly(ethylene oxide) and oligo and poly(tetrahydrofurane).

The curable composition utilized to form the light upconverting phase-separated materials according to the invention includes generally up to about 99 wt. % monomers, preferably up to about 90 wt. % monomers, and most preferably up to about 75 wt. % monomers based on the total weight, i.e. 100 wt. % of the material forming composition. Normally, the fraction of the monomers in the curable composition is at least 1 wt. %, in preferred embodiments more than 30 wt. %, more preferably more than 50 wt. % and in most preferred embodiments more than 70 wt. %. In one embodiment, the liquid curable composition includes 30 to 90 wt. % of the monomer or monomers. Various additional materials can be present that help controlling the morphology, i.e., the phase separation and size and shape of the resulting domains. In some embodiments, multifunctional monomers are utilized which allow or facilitate cross-linking of the matrix polymer. Other components that can be present in the curable composition are stabilizers, plasticizers, compounds that modify the refractive index. The curable composition utilized to form the light upconverting phase-separated materials according to the invention also includes the components forming the liquid phase and the upconverting chromophores.

As described herein, at least one liquid phase serves to dissolve or disperse the upconverting chromophores. In embodiments where the solid phase is a hydrophilic, the liquid phase is preferably hydrophobic. The hydrophobicity is provided by utilizing a hydrophobic liquid component, such as a nonpolar organic solvent or an oil. Examples of suitable liquid components or oils include, but are not limited to, nonpolar high-boiling low-vapor pressure liquids formed by small-molecule compounds such as 1-tert-butyl-3,5-dimethylbenzene (BMB) and other, optionally aliphatic hydrocarbon residues-containing, (poly-)aromatic compounds such as 1,1-bis(3,4-dimethylphenyl)ethane, 1-phenyldodecane, 2,7-diisopropylnaphthalene, o-terphenyl, and 1,2-diphenylethane, liquid aliphatic hydrocarbon compounds, such as bis(2-ethylhexyl) sebacate, 1-octadecene or other esters and ethers, halogenated liquid aromatics optionally containing aliphatic residues (such as 1,2,4-trichlorobenzene) and other high-boiling (>200° C.) nonpolar solvents. In certain embodiments, the hydrophobic liquid phase can also be formed by hydrophobic oligomers or polymers, which may display a higher viscosity or even elastic behavior. Examples include, but are not limited to poly(budadiene), poly(dimethylsiloxane), and poly(butyl acrylate). The at least one liquid phase can, of course, also be formed by mixtures of various compounds, including, but not limited to, the above. Finally, these examples should also provide a guideline for the choice of a hydrophilic liquid phase, should the polarity be switched and a hydrophobic solid phase be used.

The curable composition utilized to form the light upconverting phase-separated materials according to the invention includes generally up to about 70 wt. % components forming the liquid phase, preferably up to about 40 wt. % components forming the liquid phase, and most preferably up to about 30 wt. % components forming the liquid phase. In certain embodiments, components forming the liquid phase make up less than 20 wt. % based on the total weight, i.e. 100% of the material forming composition. Normally, the fraction of the components forming the liquid phase in the curable composition is at least 1 wt. %, in preferred embodiments more than 2 wt. % and in most preferred embodiments at least about 5 wt. % or more than 5 wt. %. The materials of the invention comprise at least one dye pair that is capable of optical upconversion, which substantially resides in the one or more liquid phases. Dyes that are substantially soluble in the liquid phase of the materials are particularly useful. Dye pairs that are capable of optical upconversion generally include at least one sensitizer and at least an emitter, selections of which are well known to those of ordinary skill in the art. Examples of suitable dye pairs include, but are not limited to MOEP (sensitizer) and DPA, anthracene or BODIPY-derivatives (emitter); MTPBP (sensitizer) and rubrene (emitter); MTPBP (sensitizer) and TBPe or perylene derivatives (emitter); MTPBP (sensitizer) and BPEA or bis(phenylethynyl)anthracene derivatives (emitter); $M(OBu)_8Pc$ (sensitizer) and rubrene (emitter); $[Ru(4,4'-dimethyl-2,2'-dipyridyl)_3]^{2+}$ or derivatives (sensitizer) and DPA, BODIPY or anthracene derivatives (emitter); tris[2-phenylpyridinato-$C^2$,N]iridium(III) or derivatives (sensitizer) and pyrene or pyrene derivatives (emitter); in all cases M=Pd, Pt. Examples of metal-free sensitizer-emitter pairs are also known, for example 4CzPN and 4CzIPN (sensitizer) and 2,7-di-tert-butylpyrene (emitter).

It is known to those skilled in the art that dyes that are particularly useful as sensitizers for TTA-UC and are useful in the present invention show a high extinction coefficient, a broad absorption range, high singlet-triplet intersystem-crossing yields and high triplet-state lifetimes. To attain the spin-orbital coupling enhanced intersystem crossing (ISC), most reported triplet photosensitizers contain heavy atoms, such as Ir, Pt, Pd, Re, Os, Ru, I, Br. Organic triplet photosensitizers are also known and contain often other heavy atoms, such as Br or I. Recent studies have shown that organic molecules with small singlet-triplet energy gap may possess increased first-order mixing of the singlet and triplet states and therefore show efficient spin conversion in the absence of heavy atoms. Such molecules are also known to be useful as sensitizer in TTA-UC schemes.

The emitter dye consists preferably of a polyaromatic hydrocarbon with a high propensity for delayed fluorescence. To allow for triplet-triplet annihilation, the emitter's lowest excited triplet state must have an energy that is at least half of that of the lowest singlet excited state.

The materials of the present invention contain the dye molecules in a concentration that ranges generally from 0.0001-20 wt. %, and/or from about 0.001 wt. % to about 30 wt. %, and preferably in a concentration in the range from about 0.01 wt. % to about 5 wt. % based on the total weight of the liquid phase. In preferable embodiments of the present invention the majority of the dyes and in most preferred embodiments all of the dyes are included in the liquid phase, but the present invention also includes embodiments in which the dyes can be found in both phases, embodiments in which the majority of the dyes are included in the solid phase, and embodiments where several dyes are present, with the majority of at least one of said dyes being incorporated in the liquid phase, and the majority of at least one of said dyes being incorporated in the solid phase.

In some embodiments of the present invention, an amphiphilic component, preferably a surfactant is utilized. Various surfactants that aid in forming nanostructures and stabilize the phased-separated morphology are preferably incorporated into the material-forming composition. Examples of suitable surfactants include, but are not limited to, cationic surfactants such as cetyltrimethylammonium bromide (CTAB), anionic surfactants such as sodium stearate and alkyl benzene sulfonates, such as sodium dodecylbenzenesulfonate, and nonionic surfactants such as polyoxyethylene glycol alkyl ethers and polyoxyethylene glycol octylphenol ethers. The amphiphilic component or surfactant can be utilized in the curable composition in a concentration of generally less than about 30 wt. %, preferably in a concentration of less than about 20 wt. % and in certain embodiments in a concentration of about 15 wt. % or less based on the total weight of the composition. Generally, the curable composition could contain no surfactant or amphiphilic at all, but preferably the content in the curable composition is at least 0.5 wt. %, and more preferably more than about 2 wt. %.

Preparation of Upconverting Liquid-Filled Polymeric Materials

Examples of new upconverting liquid-filled polymeric materials were prepared by polymerizing a liquid mixture of a hydrophilic monomer, ethylene glycol, the cationic surfactant cetyltrimethylammonium bromide (CTAB) and a dye-containing hydrophobic liquid using a redox-initiated free radical polymerization procedure (see methods-section herein). This new preparation procedure was inspired by a multi-step technique that utilizes polymerizable lyotropic liquid crystalline (LLC) assemblies for the fabrication of ordered nano-architectures such as hydrogels[35,36] and a polymerization-induced phase separation (PIPS) process, which has been developed to afford transparent, nanophase separated polymers,[37-40] when copolymerizing methacrylate-terminated poly(dimethylsiloxane) (PDMS) macromonomers with methacrylamides[37] or methacrylates[38] by free-radical polymerization. However, these prior art processes use very different starting compositions, are in some cases of complex multi-step nature, and they have not been demonstrated nor can they reasonably be expected to result in the formation of liquid chromophore-containing droplets in a polymer matrix, as claimed herein.

The present invention is based on a new one-step process that affords phase-separated and in some cases substantially transparent materials that comprise a liquid phase and a glassy or rubbery solid phase. For the purpose of defining the characteristics of materials according to the present invention, transparency shall be determined by either measuring the transmission spectrum of a reference material without the upconverting dyes or measuring the transmission spectrum of the upconverting material and reasonably correcting the spectrum for the absorption caused by the absorption of the dyes. Experiments shall be conducted with samples of an optical path length of 1 cm or reasonably be extrapolated to this path length from measurements on samples with smaller path length. Preferred materials according to the present invention display a transmission at 533 nm of more than 50%, more preferably more than 70%, and most preferably more than 85%. Preferred materials according to the present invention further display a transmission at 635 nm of more than 50%, more preferably more than 80%, and most preferably more than 90%. Preferably the phase-separated material displays a transmission of at least 50%, more preferably of at least 70%, and most preferably of at least 85% measured over a path length of 1 cm at any wavelength between 415 and 670 nm.

The optically upconverting liquid-filled polymeric materials according to the present invention have a phase-separated morphology. In preferred embodiments, the domains formed by the two phases are so small that light scattering is largely suppressed, which renders the materials highly transparent. Under some conditions the domain features have dimensions in the tens of nanometers, preferably maximally 100 nm, more preferably maximally 50 nm, and most preferably maximally 30 nm. For the purpose of defining the characteristics of materials according to the present invention, the domain feature size shall be determined by analysis of images obtained by transmission electron or scanning electron microscopy of adequately prepared samples and the dimensions of only the liquid phase shall be considered. In certain embodiments of the present invention the domains of the liquid phase are spherical, in some embodiments they are elongated, and in other embodiments they may adopt even more complex shapes. In the case of anisotropic domains and percolating domains (i.e. a phase which at least on a local level appears to be continuous), the average diameter of the structures formed shall be measured.

Unless otherwise noted, examples reported herein refer to materials made from compositions containing 70 wt. % hydrophilic monomers (see Table 2), 15 wt. % ethylene glycol (which serves as a plasticizer of the solid phase and also as a refractive index modifier), 10 wt. % 1-tert-butyl-3,5-dimethyl benzene (BMB) as hydrophobic oil, 5 wt. % CTAB as a surfactant, and normally the upconverting chromophore pair. The synthetic protocol employed is a simple one-step process involving combination of the components to form a liquid mixture and subsequent polymerization as per the detailed procedures set forth herein. The examples presented here employ redox-initiated free radical polymerization, but under appropriate conditions photochemical or thermal initiation should also be possible. Thus, the polymerization of a mixture with the composition mentioned above initiated with the redox pair benzoyl peroxide (BPO) and N,N-dimethylaniline (DMA) afforded a transparent, hard and crack-free material. The material was substantially colorless when the dye pair was omitted, but showed the characteristic color of the dyes when they were used.

Figure 2:
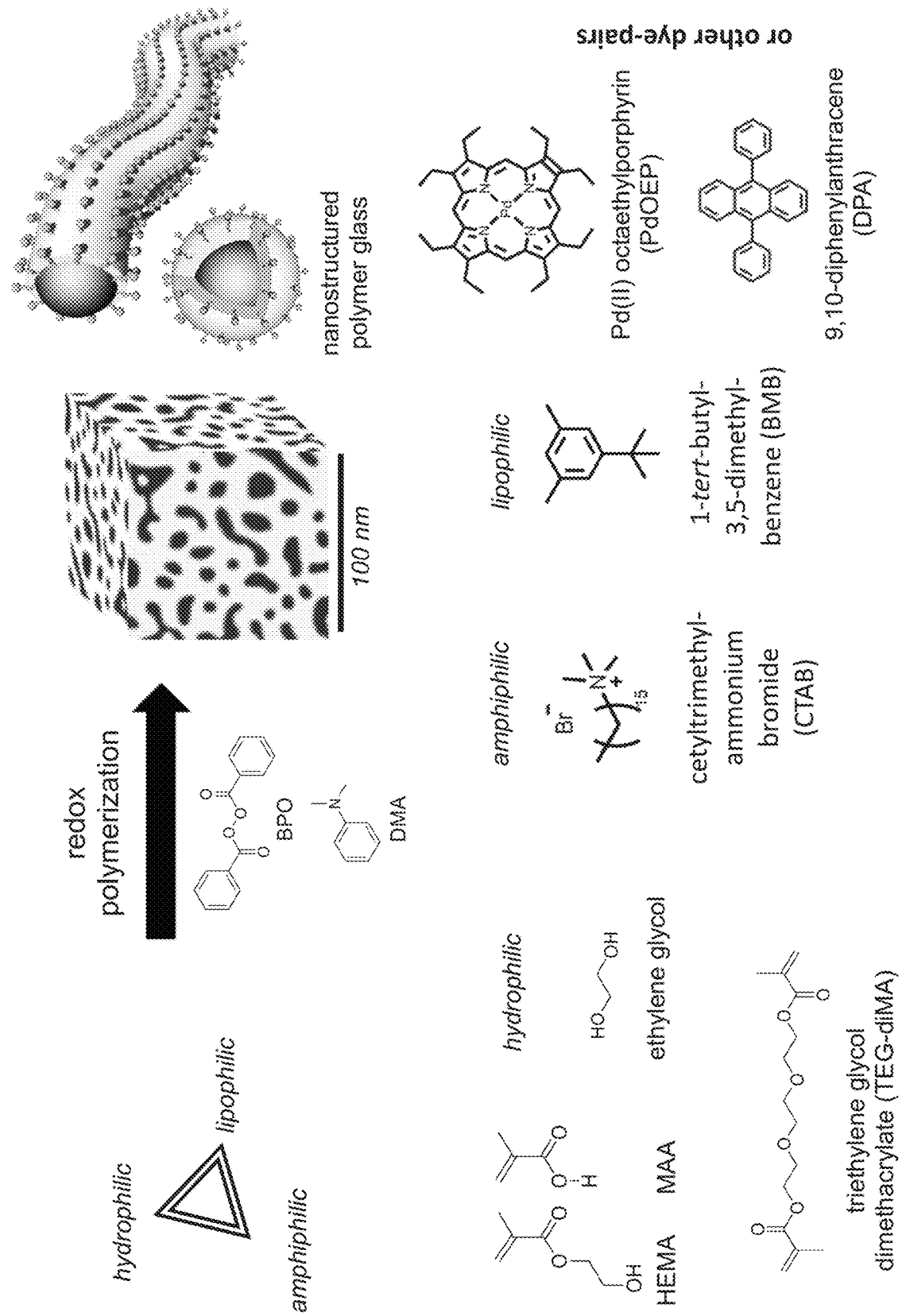
FIG. 2 illustrates a graphic representation of a preferred embodiment of the present invention. Here, the upconverting liquid-filled polymeric materials comprise a cross-linked hydrophilic matrix formed from 2-hydroxyethyl methacrylate (HEMA), methacrylic acid (MAA), triethylene glycol dimethacrylate (TEG-diMA), and ethylene glycol. The liquid phase is lipophilic and consists mainly of 1-tert-butyl-3,5-dimethylbenzene (BMB) in which the upconverting dye pair Pd(II) octaethylporphyrin (PdOEP) and 9,10-diphenylanthracene (DPA) is dissolved or dispersed. Benzoyl peroxide (BPO) and N,N-dimethylaniline (DMA) were used as redox initiator, while cetyltrimethylammonium bromide (CTAB) was used as a surfactant that serves to stabilize a phase-separated morphology. In preferred embodiments, the domain sizes are substantially smaller than the wavelength of light, so that the materials are largely transparent.

The new upconverting liquid-filled polymeric materials contain hydrophilic, hydrophobic and amphiphilic components. The main amphiphilic component used in the examples presented here is CTAB, a cationic trimethylammonium-based surfactant (FIG. 2. The hydrophobic liquid used in the examples presented here is BMB, an alkyl aromatic system that boils above 200° C. ($T_{bp}$=205° C.) and is liquid at ambient conditions ($T_m$=−18° C.). BMB was chosen since it was found to give transparent NGs and due to its good ability to dissolve the aromatic upconverting dyes employed. The major part of the upconverting liquid-filled polymeric materials is made-up by the hydrophilic polymer phase, which in the examples shown here mainly consists of poly(2-hydoxyethyl methacrylate-co-methacrylic acid). In most of the examples presented here the hydrophilic polymer phase was cross-linked, and the cross-linker used was the hydrophilic triethylene glycol dimethacrylate (TEG-diMA) (FIG. 2). The choice to co-polymerize 2-hydroxyethyl methacrylate (HEMA) with methacrylic acid (MAA) in the examples shown here was motivated by the hydrophilic character of these monomers and copolymerization is a simple and effective way to obtain amorphous polymers and control their properties, such as the glass transition temperature, by variation of the ratio of the monomers. Those skilled in the art will appreciate that the monomer composition can be varied, that other monomers can be selected, and that the cross-linker can be omitted or its concentration increased, all with the goal to change the properties (e.g. glass transition temperature, mechanical properties, gas diffusion) of the polymer matrix. Likewise, other hydrophobic liquids, and alternative surfactants may be employed. Auxiliary chemicals, such as ethylene glycol, which may assist with the dissolution of the surfactant (vide infra) and act as a plasticizer for the polymer and serve to modify the refractive index may also be employed. The examples given herein document that changing the nature and/or concentration of one of the components usually requires further changes of the recipe, in order to balance the phase-separation between hydrophilic and hydrophobic phases and other aspects, such as the size of the respective domains and the refractive indices of the various phases.

Variation of Components and Composition

A systematic variation of some of the components, such as the amphiphile, the hydrophobic solvent and the monomer has been performed. Replacing the cationic amphiphile CTAB with the anionic amphiphile sodium dodecylbenzenesulfonate resulted in more opaque glasses. More opaque polymer glasses were also obtained when replacing the hydrophobic BMB with other hydrophobic substances, including 1,1-bis(3,4-dimethylphenyl)ethane ($T_{bp}$=333° C.), 1-phenyldodecane ($T_{bp}$=331° C.), 2,7-diisopropylnaphthalene ($T_{bp}$>300° C.), o-terphenyl ($T_{bp}$=332° C.), 1,2-diphenylethane ($T_{bp}$=284° C.), bis(2-ethylhexyl) sebacate ($T_{bp}$=212° C.) and 1-octadecene ($T_{bp}$=314° C.), where most of them possess a higher boiling point $T_{bp,\ hydrocarbon}$>$T_{bp,\ BMB}$ and are non-volatile ($T_{bp}$>250° C.). When employing 1,2,4-trichlorobenzene ($T_{bp}$=214° C.) clear glasses were obtained.

All of the monomers employed in the composition given in Table 2 are methacrylates. Replacing these methacrylic monomers by the corresponding acrylic monomers resulted in elastomeric materials, which are further discussed herein. The elastomeric character is imparted by reduction of the glass transition temperature (viz a viz the materials made with the composition shown in Table 2) to below ambient temperature, and by maintaining the cross-linked structure.

The precise understanding of the phase behavior of such complicated compositions was not extensively studied. However, some basic variations of the "standard" composition given in Table 2 have been performed. For example, omitting ethylene glycol but otherwise using the same preparation procedure and composition resulted in a phase-segregated material. Omitting of the surfactant CTAB or increasing its content led to polymer glasses without an observable morphology or with a different morphology at the nanoscale.

Upconverting liquid-filled polymeric materials that displayed low-power upconversion were obtained by including at least one suitable upconverting dye pair consisting of a sensitizer and an emitter into the curable composition prior to polymerization by redox-initiation. As will become apparent from the examples given herein, materials according to the present invention can be made with many different dye pairs, of which a selection is already described in the pertinent literature.[41-45] It should also be apparent, that dyes that have a high solubility in the liquid phase of the liquid-filled polymeric materials are particularly useful. However, in preferred embodiments of the present invention the solid phase constitutes the majority of the material so that even if the dyes have a higher solubility in the liquid phase, overall, a majority of the dyes may reside in the solid phase.

Green-to-blue upconverting, cross-linked liquid-filled polymeric materials were obtained by using the well-known dye-pair PdOEP/DPA. In the following sections, we describe the structural and optical properties of such green-to-blue upconverting, cross-linked liquid-filled polymeric materials comprising the well-known dye pair PdOEP/DPA. It is shown below that other dye pairs can also be used in materials according to the present invention, such as the NIR-to-yellow upconverting dye pair PdTPBP/rubrene.

Structural Characterization of Nanostructured Glasses

Upconverting, cross-linked, liquid-filled polymeric materials according to the invention with the monomer composition shown in Table 2, and which contain the UC dye-pair PdOEP/DPA and which were prepared using the procedure detailed herein were analyzed by scanning electron microscopy (SEM). The SEM images reveal two nanophases (FIG. 3), where the minor phase forms ca. 20 nm wide channels, which have a length of up to 100 nm or in some cases even more. Such structures were not observed when preparing materials without CTAB-surfactant, but otherwise following the same preparation procedure (FIG. 4b, c). Instead, the material seems to be porous at a scale of several 100 nm (FIG. 4b). Materials made without CTAB also displayed crystals with dimensions of a few μm on the surface, which are believed to be DPA since it is the only easily crystallisable component in the polymerized material (FIG. 4a). The presence of nanoscale structures in the bulk of the PdOEP/DPA-containing liquid-filled polymeric materials according to the invention and their absence in glasses lacking CTAB was also confirmed by small angle X-ray scattering (SAXS). The difference-spectrum between the nanostructured material according to the invention and a reference material made without CTAB was found to be non-zero (FIG. 5) and is reminiscent of SAXS and SANS spectra recorded for nano-structured, polymerized microemulsions.[46,47]

Figure 6:
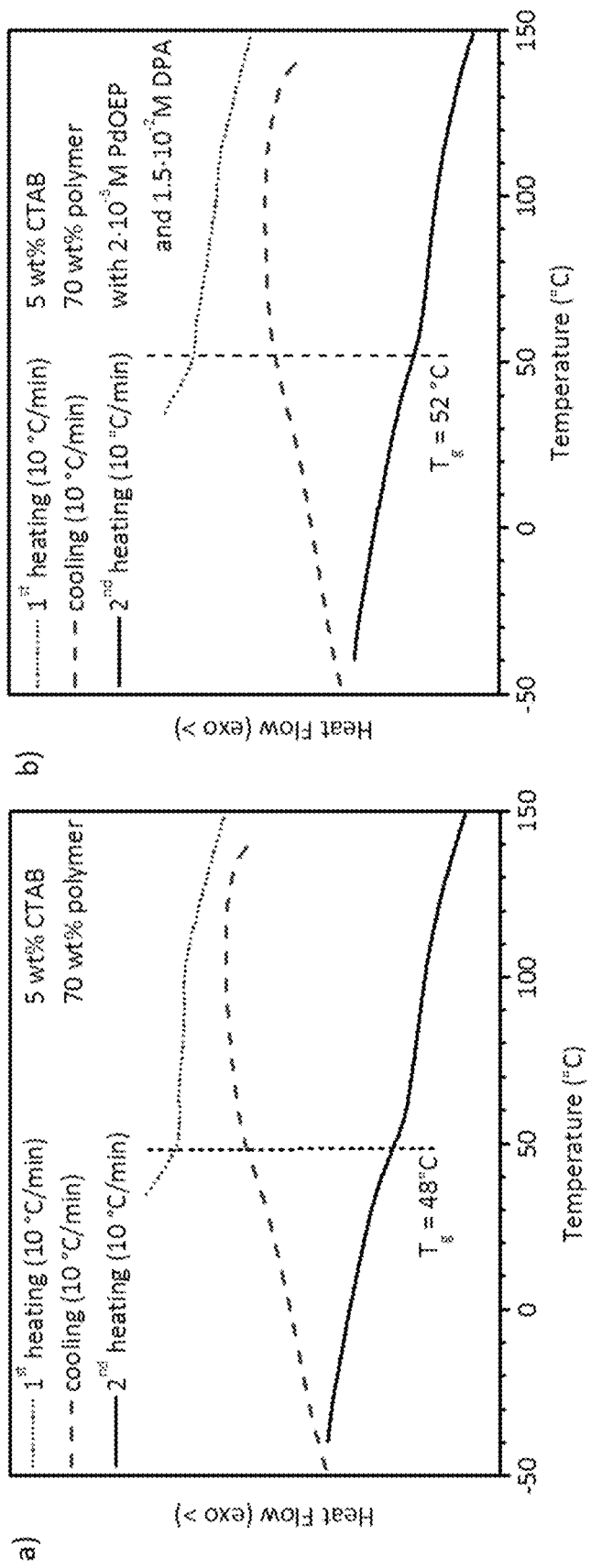
FIG. 6 illustrates differential scanning calorimetric (DSC) scans of a) a cross-linked liquid-filled polymeric material without dyes and b) an upconverting cross-linked liquid-filled polymeric material according to the present invention containing PdOEP (c=2·10$^{-5}$ M) and DPA (c=1.5·10$^{-2}$ M). Both materials were prepared using an otherwise identical preparation procedure herein and display the same composition given in Table 2. Both materials show a similar glass transition $T_g$ at 48° C. and 53° C., respectively, during the second heating cycle.

Differential scanning calorimetric (DSC) analysis of the PdOEP/DPA-containing, upconverting cross-linked liquid-filled polymeric material according to the present invention revealed a glass transition temperature of $T_g=53°$ C. and a similar glass transition at $T_g=48°$ C. for the photoinactive, cross-linked material without PdOEP/DPA during the second heating cycle (FIG. 6). No thermal transition other than this $T_g$ was observed in the temperature range between −50 and 150° C.

Figure 7:
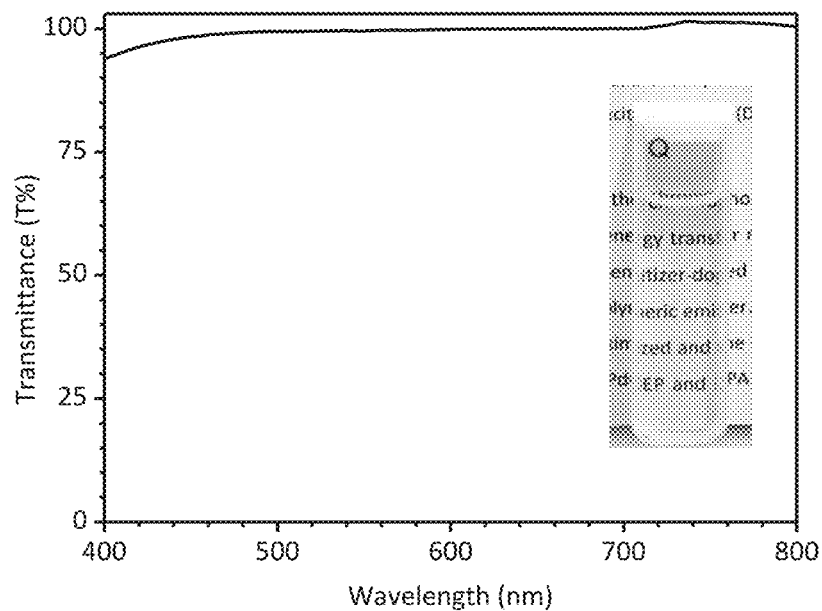
FIG. 7 illustrates the transmission spectra and images of (a) a cross-linked liquid-filled polymeric material with a composition of 70 wt. % polymer (prepared using the preparation procedure given herein and the composition given in Table 2), but without any chromophores and (b) the non-polymerized mixture, that is, a mixture similar to the one used in (a), which was also similarly treated, but without redox-initiators BPO and DMA.
Figure 7:
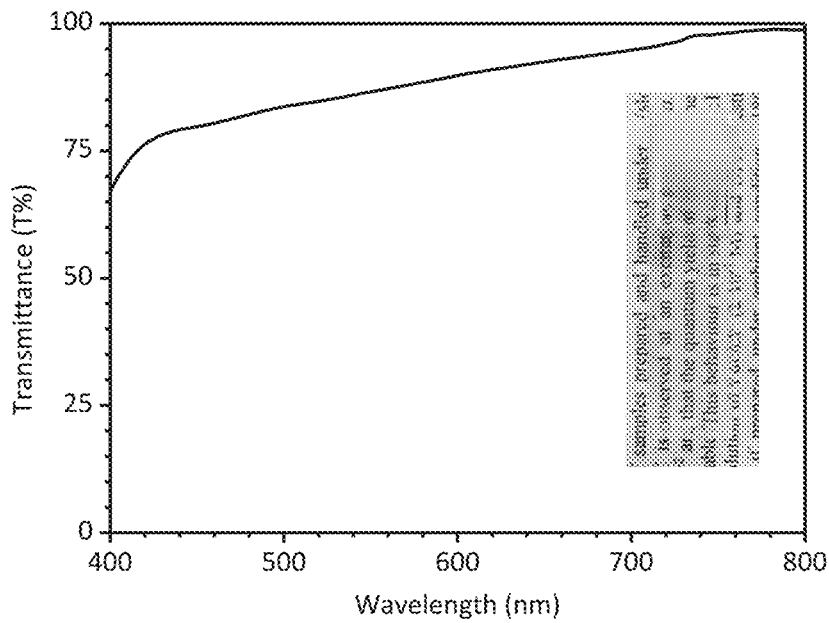

Optical Characterization and Quantum Yield of PdOEP/DPA-Containing, Upconverting Cross-Linked Liquid-Filled Polymeric Material High transparency is a major advantage for upconversion materials since a maximum fraction of incident light can be absorbed by the chromophores and a minimum of the emitted light is absorbed or scattered.[34] A reference material with a composition of 70 wt. % polymer (prepared using the preparation procedure given herein and the composition given in Table 2), but without any chromophores, displayed a transmission of greater than 75% at wavelengths λ>415 nm, when using an optical path of 1 cm. The transparency at typical laser wavelengths was found to be ca. 86% in the green range (533 nm/543 nm) and ca. 92% in the red or far-red range (635 nm/670 nm) (FIG. 7a). Despite the high transparency found in the dye-free cross-linked liquid-filled polymeric material, the absorption is lower than that found in the non-polymerized mixture, that is, the mixture containing all the components and that was processed as the cross-linked liquid-filled polymeric material but without redox-initiators BPO and DMA. This non-polymerized mixture displayed a very high transparency of greater than 95.5% at wavelengths λ>415 nm (FIG. 7b). The transmittance curve for the polymerized material (FIG. 7a) indicates that, in contrast to the pre-polymerized mixture (FIG. 7b), some scattering occurs. This leads to a somewhat reduced transparency at shorter wavelengths and is consistent with a nanophase separated structure, leading to light-scattering. It should be apparent to those skilled in the art that the level of scattering can be further limited by reducing the feature size of the domains formed by the polymer and liquid phase, respectively as well as better matching the refractive indices.

Figure 8:
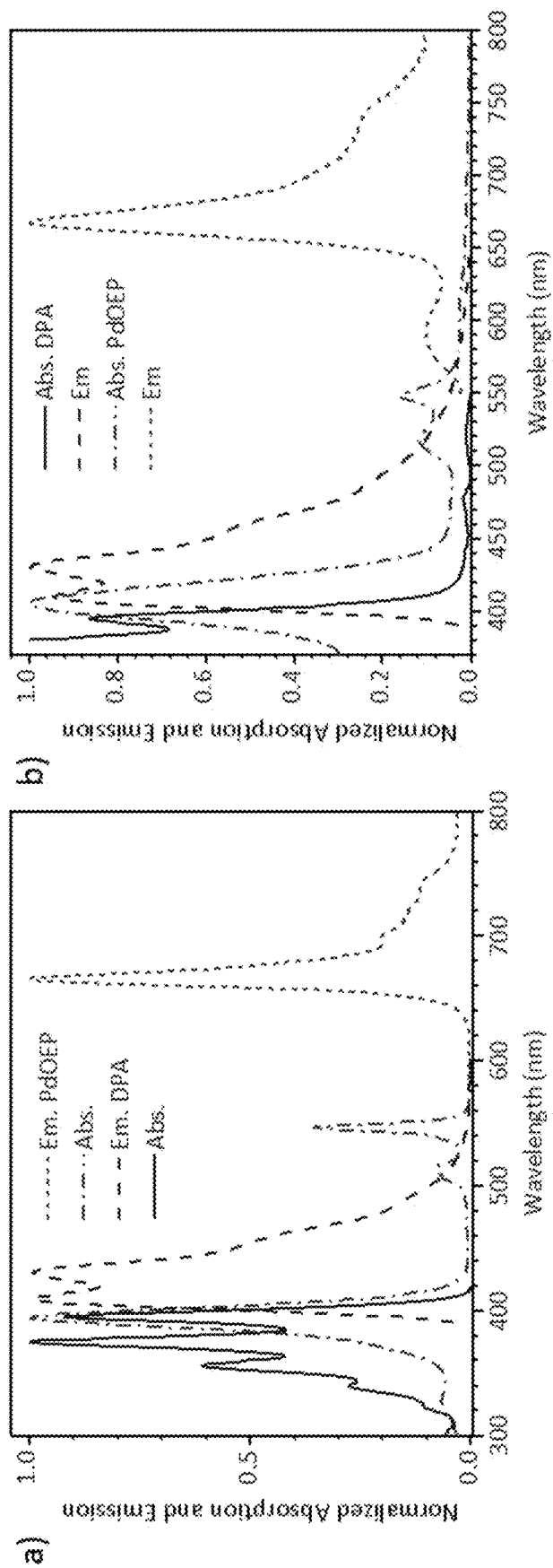
FIG. 8 illustrates the normalized absorption (dotted line) and emission spectra (full line) of a) PdOEP (c=$10^{-5}$ M, red) or DPA (c=$10^{-5}$ M, blue) in BMB and b) PdOEP (c=$10^{-5}$ M, red) or DPA (c=$10^{-5}$ M, blue) in the cross-linked liquid-filled polymeric material (prepared using the preparation procedure herein and the composition given in Table 2). BMB solutions containing PdOEP were degassed with argon for 30 min in order to observe phosphorescence, whereas no additional treatment was required in order to observe PdOEP-phosphorescence in the NGs.
Figure 9:
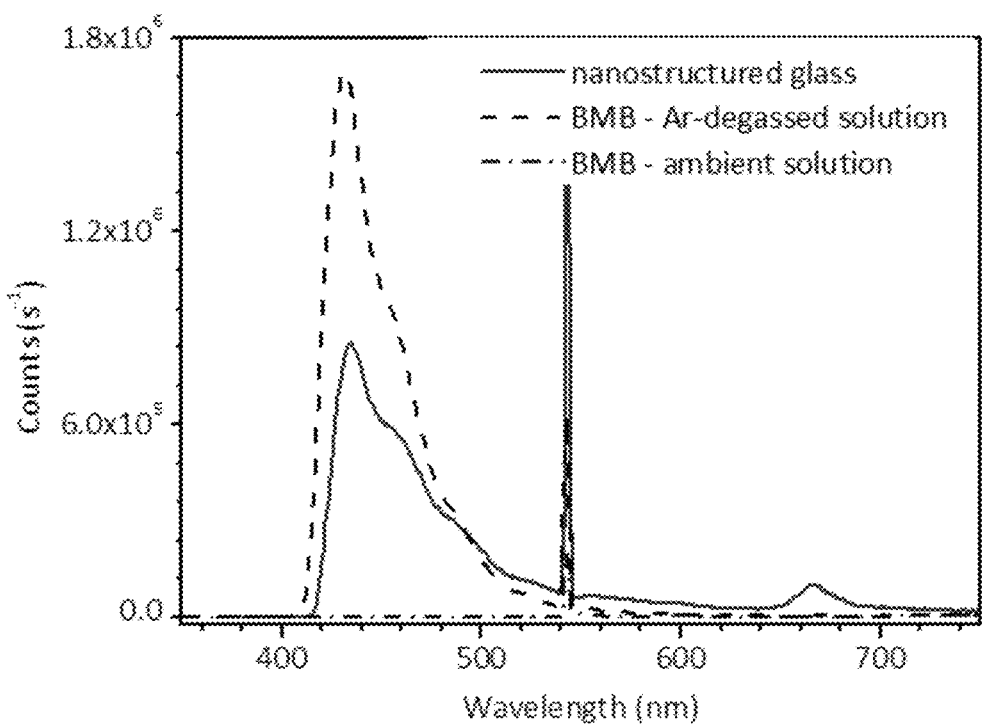
FIG. 9 illustrates the emission spectra recorded from a cross-linked liquid-filled polymeric material according to the invention (prepared using the preparation procedure given herein and the composition given in Table 2) and from a BMB solution, both containing PdOEP (c=$10^{-5}$ M) and DPA (c=$1.5 \cdot 10^{-2}$ M), prepared under ambient conditions (solution, polymer) and Ar-degassed (solution). The samples were excited with a 2 mW HeNe laser at 543 nm (275 mW·cm$^{-2}$). No emission was observed from the BMB-solution prepared under ambient conditions, whereas the polymer displayed upconverted light and little PdOEP-phosphorescence. The same BMB solution displayed a strong UC, if degassed with argon for 30 min.
Figure 10:
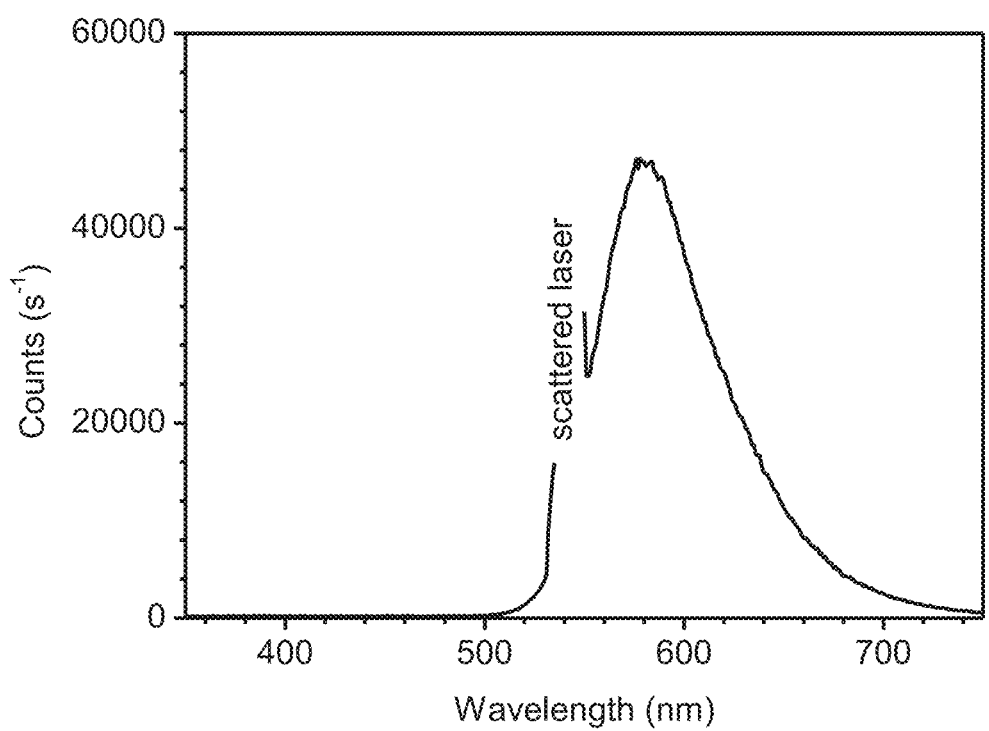
FIG. 10 illustrates an emission spectrum recorded from a neat cross-linked liquid-filled polymeric material, where no additional dyes were added, upon irradiation at 543 nm (235 mW·cm$^{-2}$)
Figure 26:
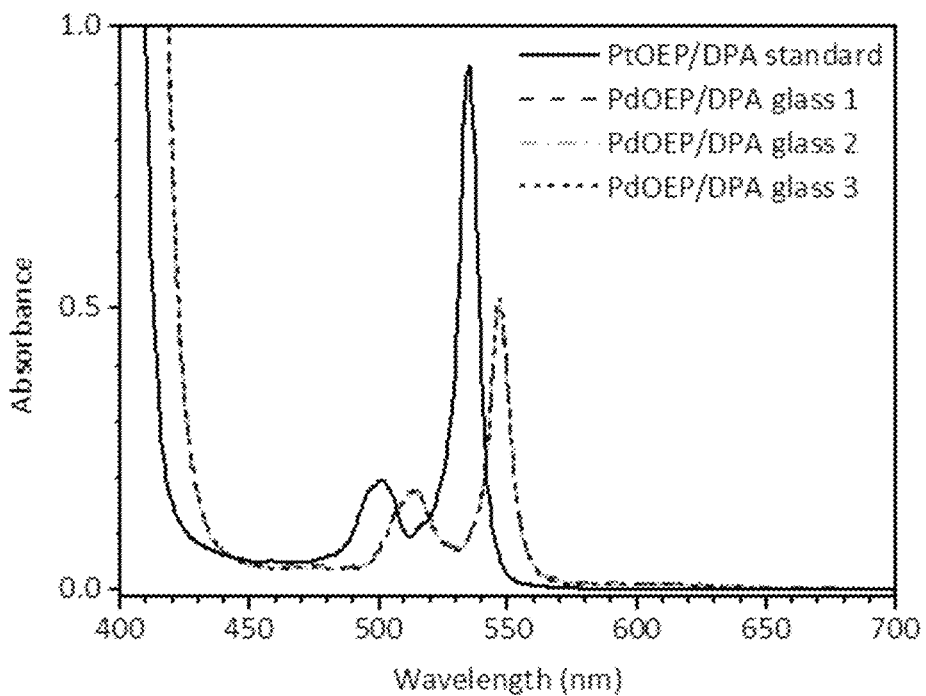
FIG. 26 illustrates the absorption spectra of the standard and of three green-to-blue upconverting, cross-linked liquid-filled polymeric materials according to the present invention of the same composition (D1, D2, D3), recorded at normal incidence. The optical path length was 0.1 cm for the standard and 1 cm for the glasses. The absorption spectra of the three PdOEP/DPA-containing NGs overlap.

We investigated the optical properties of cross-linked liquid-filled polymeric reference materials containing either PdOEP or DPA (FIG. 8b). The absorption and emission spectra of these reference materials are similar to those of BMB solutions of these chromophores (FIG. 8a), which in turn are virtually identical to those of previously measured toluene solutions of the same chromophores.[18] In contrast to the corresponding BMB solution, the PdOEP-containing cross-linked liquid-filled polymeric reference material showed a yellow emission centered around 590 nm, which was also observable in the cross-linked liquid-filled polymeric reference material without additional dyes (FIG. 10). We speculate that the emission originates from photoactive substances formed in side-reactions during redox-polymerization. Further the absorption spectrum of the PdOEP-containing cross-linked liquid-filled polymeric reference material showed slight differences compared to the corresponding BMB solution. In fact, in the cross-linked liquid-filled polymeric reference material, the PdOEP soret band ($\lambda_{max\text{-}polymer}=404$ nm) displayed a red-shift by 10 nm ($\lambda_{max\text{-}BMB}=394$ nm) and slightly distortions of the Q-bands ($\lambda_{max}=513$ and 546 nm). Interestingly, the PdOEP Q-band does not show this distortion in the PdOEP/DPA containing upconverting cross-linked liquid-filled polymeric material (FIG. 26). These results suggest that in the cross-linked liquid-filled polymeric material the dyes largely reside in the hydrophobic BMB-phase.[23] Neither the PdOEP or DPA containing cross-linked liquid-filled polymeric reference materials displayed any upconversion upon irradiation with a 2 mW HeNe laser at 543 nm. By contrast, the PdOEP/DPA containing cross-linked liquid-filled polymeric material displayed bright blue upconverted light and only a minor contribution of residual PdOEP phosphorescence (FIG. 9) when excited under similar conditions. The upconverted emission spectrum of the PdOEP/DPA-containing material is very similar to the one observed from a BMB solution containing the same components and concentrations. However, the former displayed residual phosphorescence, which will be further discussed below. In contrast to the upconverting cross-linked liquid-filled polymeric material, which displayed vivid blue UC emission under ambient conditions, the BMB solution displayed a strong UC only after degassing with argon for 30 min (FIG. 9). This is a strong indication of the protective effect for the nanoscopic hydrophobic phase by the surrounding hydrophilic polymer matrix.

Figure 11:
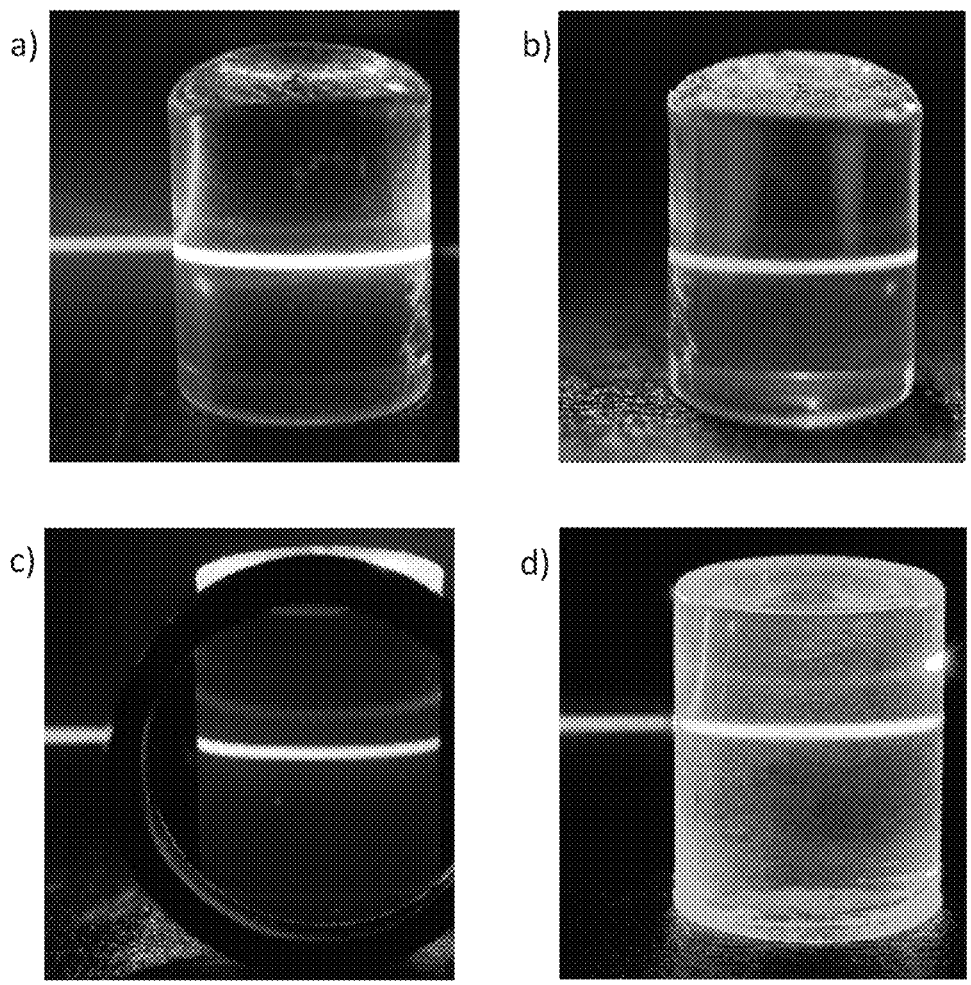
FIG. 11 illustrates pictures of a), b) green-to-blue upconverting, PdOEP/DPA containing cross-linked liquid-filled polymeric material according to the present invention a) taken in the dark and b) taken under ambient illumination. c), d) Pictures of cross-linked liquid-filled polymeric reference materials containing c) only PdOEP (c=$2 \cdot 10^{-5}$ M) and d) only DPA (c=$1.5 \cdot 10^{-2}$ M), emitting red porphyrin phosphorescence (after a 600 nm long-pass filter, c)) and scattering incident laser light (c, d). All the samples were excited with a 2 mW, 543 nm HeNe laser at a power density of 275 mW·cm$^{-2}$ and prepared using a glass vial as a sacrificial mold.
Figure 12:
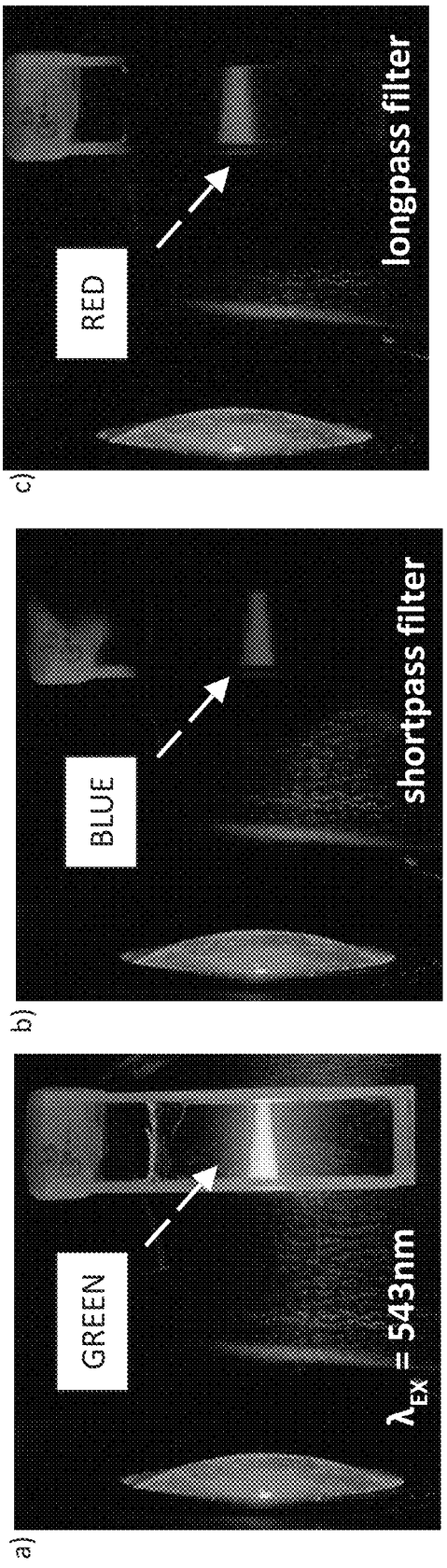
FIG. 12 illustrates pictures of green-to-blue upconverting, PdOEP/DPA containing cross-linked liquid-filled polymeric material according to the present invention excited with incoherent light. a-c) Sample excited at 543 nm using a Xe-lamp and a 543+/−10 nm laser line filter (0.6 mW, ca. 20-30 mW·cm$^{-2}$), a) seen without, b) seen through a 500 nm shortpass and c) seen through a 600 nm longpass filter. The sample displayed up-as well as downconverted light. d) Sample excited with concentrated solar light longer than 515 nm. The picture shows the upconverted light seen through a 500 nm shortpass filter.
Figure 12:
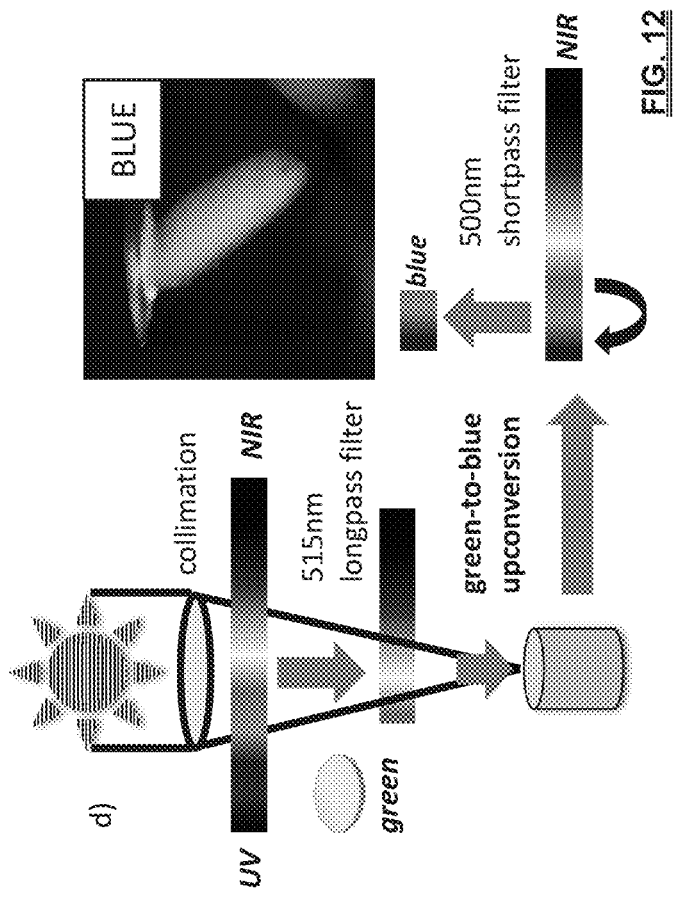

The PdOEP/DPA containing cross-linked liquid-filled polymeric material according to the present invention (FIG. 11a,b) displayed a strong upconverted blue emission that, upon excitation at 543 nm, is well visible in the dark (FIG. 11a) or under ambient illumination (FIG. 11b). Cross-linked reference materials lacking either the PdOEP sensitizer (FIG. 11d) or the DPA emitter (FIG. 11c) did not display any upconversion, but rather scattered incident laser light and displayed red porphyrin phosphorescence (after a 600 nm long-pass filter), respectively. The DPA-only containing glass (FIG. 11d) appears to display a weak yellow emission, which also appeared in the cross-linked glasses containing no added dyes (FIG. 10, vide supra). The PdOEP/DPA containing cross-linked liquid-filled polymeric material according to the present invention also displayed upconversion upon irradiation with incoherent light (FIG. 12). Some of the proposed energy-conversion applications for TTA-UC rely entirely on low-intensity, incoherent light under realistic application conditions, such as solar or photoelectrochemical cells.[48] Therefore it is very important to have materials displaying high upconversion efficiencies also at low power densities. Gratifyingly, PdOEP/DPA-containing glasses performed visible green-to-blue UC if excited at low intensities with green, incoherent light centred around 543 nm (+/−10 nm, laser line filter, ca. 20-30 mW·cm$^{-2}$) or if excited with concentrated solar light led through a 515 nm longpass filter (FIG. 12).

The TTA-UC quantum yield ($\phi_{UC}$) of the green-to-blue upconverting, PdOEP/DPA containing cross-linked liquid-filled polymeric material according to the present invention has been measured using two different methods: a relative quasi-collinear and an integrating sphere setup. An air-free THF-solution containing PtOEP (c=10$^{-4}$ M) and DPA (c=10$^{-2}$ M) with a $\phi_{UC}$=0.26 served as a reference.[34] Measurements were conducted using a 150 mW Nd:YAG-duplicated laser at 532 nm. The laser was operated at full power in order to perform upconversion in the high excitation regime, where the conversion yield is constant and maximum.[34] The green-to-blue upconverting, cross-linked glasses showed a quantum efficiency of $\phi_{UC}$=0.15±0.03, which was calculated by averaging the yields obtained by the two different methods mentioned above and by using three different glass-samples of the same composition.

As discussed in the seminal publication by Monguzzi et al.,[34,49] the threshold value $I_{th}$ represents the power-density, where 50% of the triplets decay by triplet-triplet annihilation. Below this value the upconversion quantum efficiency $\phi_{UC}$ decays rapidly, whereas above the threshold it saturates to a constant value. When plotting the power density $I_{exc}$ against the upconverted intensity $I_{UC}$ in a log-log scale, then the slope changes from quadratic to linear at the threshold value.

Figure 13:
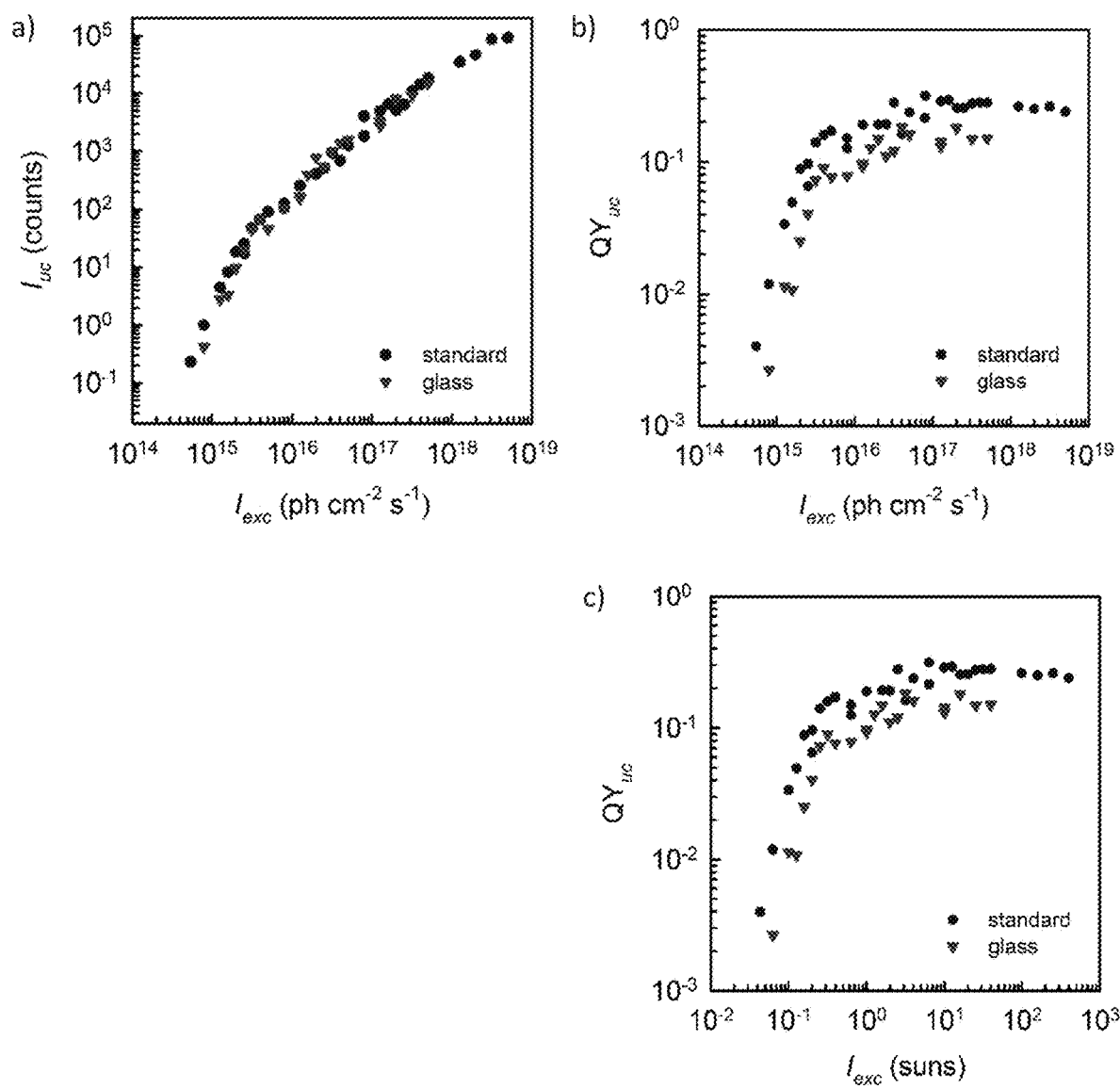
FIG. 13 illustrates a) UC intensity $I_{UC}$ of an upconverting cross-linked liquid-filled polymeric material according to the present invention containing PdOEP (c=$2 \cdot 10^{-5}$ M) and DPA (c=$1.5 \cdot 10^{-2}$ M) and of a THF standard-solution containing PtOEP (c=$10^4$ M) and DPA (c=$10^{-2}$ M), plotted as function of the excitation intensity $I_{exc}$ in a log-log scale. The blue dots represent the QY-standard and the red triangles a green-to-blue upconverting liquid-filled polymeric material, both excited at 532 nm with Nd:YAG-duplicated laser. The $I_{exc}$ values have been normalized by the sample absorbance in order to remove trivial differences in the threshold due to the different donor concentrations. Graph b) depicts the calculated $\phi_{UC}$ as a function of $I_{exc}$. c) $\phi_{UC}$ plotted as a function of the excitation intensity expressed in suns referring to the solar irradiance absorbed under AM1.5 conditions.

For the green-to-blue PdOEP/DPA containing cross-linked liquid-filled polymeric material according to the present invention the threshold $I_{th}$ was found at very low values of around 2-3·10$^{-15}$ ph·cm$^{-2}$·s$^{-1}$ or 0.75-1.1 mW·cm$^{-2}$ (at 533 nm), which corresponds to the values found in the standard THF-solution containing PtOEP and DPA (FIG. 13). This finding strongly indicates that TTA-UC occurs in the liquid hydrophobic, nanoscale-phase and that the process is comparable to the one in a conventional low-viscosity solution. The threshold $I_{th}$ was also calculated relative to the solar irradiance absorbed by the PdOEP/DPA system under AM1.5 conditions, giving a value of about $I_{th}$=0.2-0.3 suns (FIG. 13c). The values obtained for $I_{th}$ and $\phi_{UC}$ are very important, as they show that the rigid, nanostructured glasses almost retain the properties found for TTA-UC in solution. Especially the sub-solar threshold may pave the way to utilize these glasses in solar-light driven applications.

Figure 14:
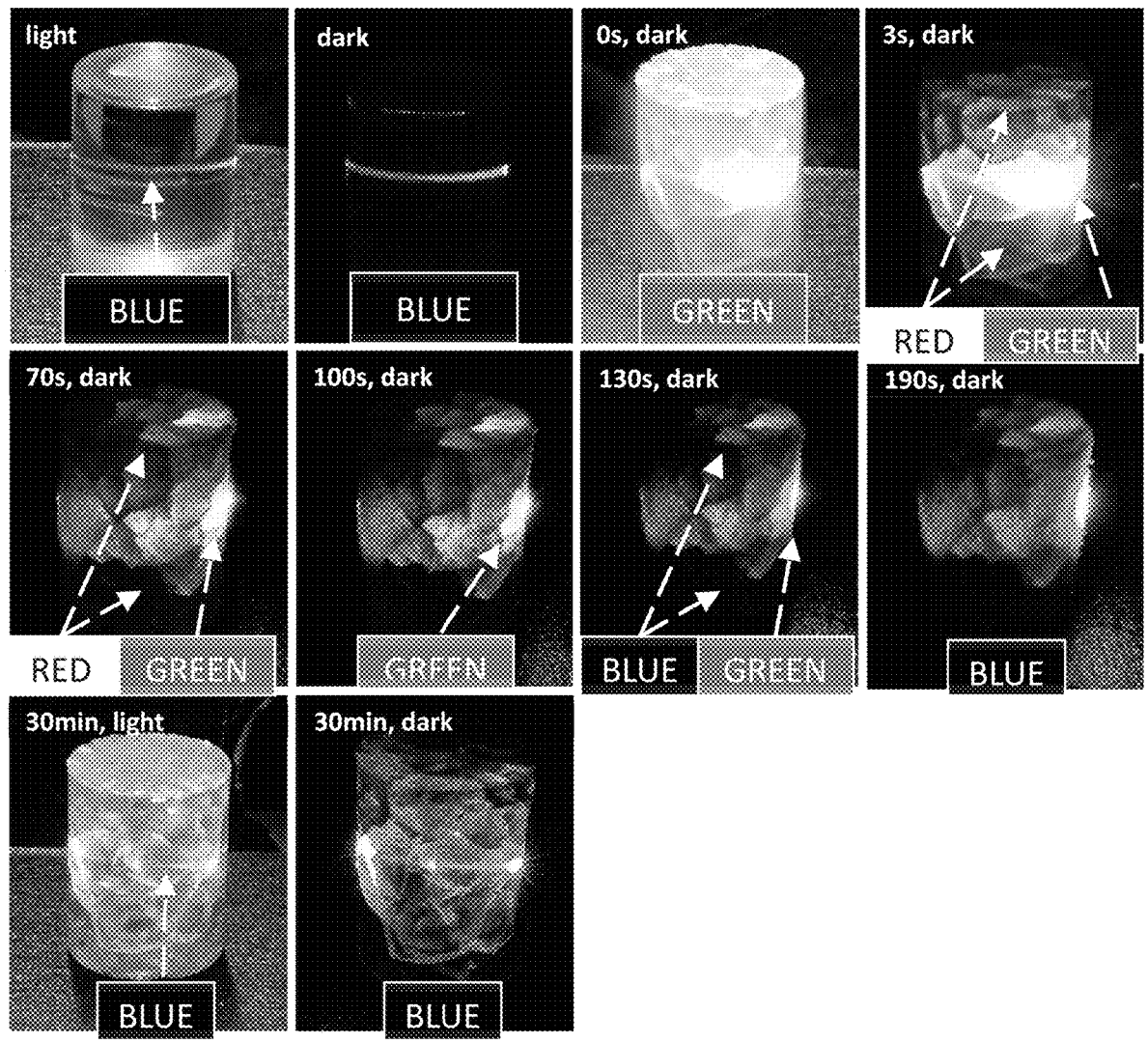
FIG. 14 illustrates a picture series of a green-to-blue upconverting cross-linked liquid-filled polymeric material according to the present invention containing PdOEP (c=$2 \cdot 10^{-5}$ M) and DPA (c=$1.5 \cdot 10^{-2}$ M) before and after cooling by placement in liquid nitrogen. Samples were excited with a 2 mW, 543 nm HeNe laser at a power density of ca. 275 mW·cm$^{-2}$. Cooling suppresses TTA-UC and leads to the appearance of PdOEP-phosphorescence. Equilibration of the thermally-cracked glass to ambient temperature makes the blue emission reappear.

The importance of the mobility imparted by the liquid phase of the upconverting cross-linked liquid-filled polymeric material according to the present invention on the dye molecules residing in this phase mobility was qualitatively shown by cooling a green-to-blue upconverting glass through immersion in liquid nitrogen. Upon cooling (and solidification of the liquid phase), the translational mobility of the dye molecules is suppressed. As the concentration of the dyes is too low to enable an efficient exciton diffusion and triplet-triplet annihilation in absence of translational diffusion, no UC should be observed in the frozen state. Instead, PdOEP-phosphorescence should be observed since triplets and only scarcely transferred to DPA. Indeed, the experiment showed that green-to-blue upconversion is suppressed and that red porphyrin phosphorescence appears when cooling a PdOEP/DPA-containing liquid-filled polymer in liquid nitrogen (FIG. 14). Also, blue upconverted emission was observed to gradually reappear when the material was allowed to warm to ambient temperature. The cooling leads to cracking of the cross-linked material.

Figure 15:
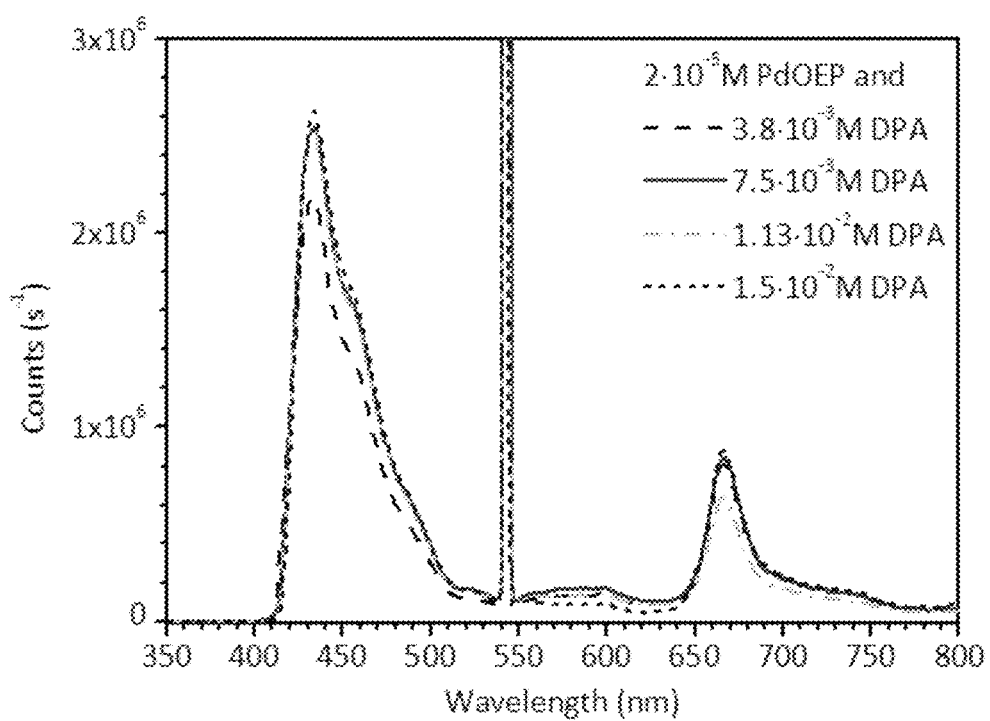
FIG. 15 illustrates the emission spectra of a green-to-blue upconverting, PdOEP/DPA containing cross-linked liquid-filled polymeric material according to the present invention containing various amounts of DPA (c=1.5, 1.13, 0.75, and 0.38·$10^{-2}$ M) and a constant amount of PdOEP (c=$2 \cdot 10^{-5}$ M) upon irradiation of 180 mW·cm$^{-2}$ at 543 nm.

Interestingly, the minor, residual porphyrin-phosphorescence observed in the green-to-blue upconverting, PdOEP/DPA containing cross-linked liquid-filled polymeric material according to the present invention (FIG. 9) remained more or less constant if the DPA concentration was varied between c=0.38 to 1.5·10$^{-2}$ M (the concentration of PdOEP was kept constant at c=2·10$^{-5}$ M) and did not decrease with the DPA content, as one would expect due to an enhanced triplet energy-transfer from the sensitizer to the emitter (FIG. 15). This is especially surprising, since in solution, PdOEP/DPA should display a significant Stern-Volmer dynamic quenching constant around 10$^5$ M$^{-1}$ and therefore barely any phosphorescence should be observable above c=1 mM DPA,[50] if the dyes reside in a liquid environment. Taken together, this is strongly indicative that a small part of the PdOEP is not accessible by the DPA, for example because it is trapped in the hydrophilic polymer phase. Therefore, an even higher efficiency of green-to-blue upconverting, PdOEP/DPA containing cross-linked liquid-filled polymeric material according to the present invention could be achieved by simply better directing the dyes into the hydrophobic, liquid nanophase and thus maximizing the energy-transfer from the sensitizer to the emitter.

Figure 16:
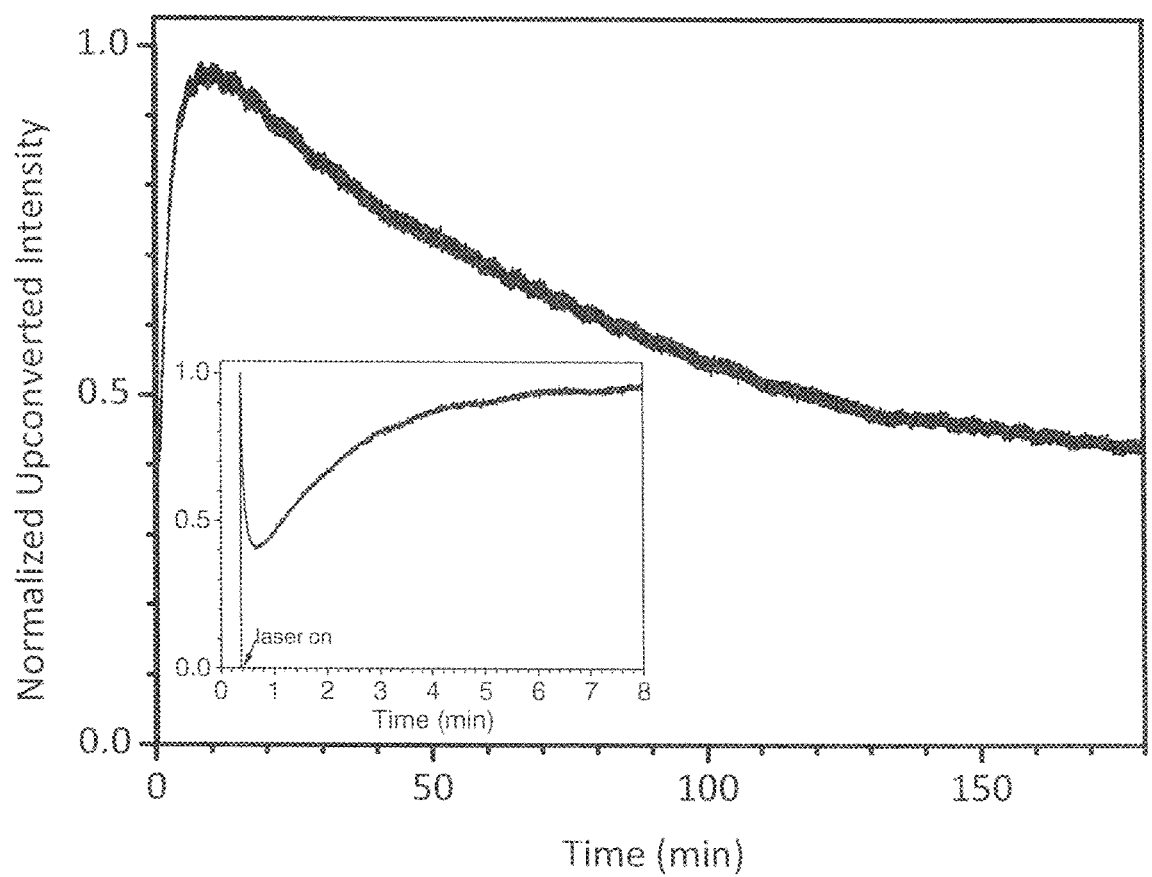
FIG. 16 illustrates the upconversion emission intensity of a green-to-blue upconverting, PdOEP/DPA containing cross-linked liquid-filled polymeric material according to the present invention containing PdOEP (c=$2 \cdot 10^{-5}$ M) and DPA (c=$1.5 \cdot 10^{-2}$ M) monitored at 433 nm upon continuous irradiation of 100 mW·cm$^{-2}$ at 543 nm with a 2 mW HeNe laser. Upconversion intensity decays to 67%, 50% and 43% of the maximum intensity after 1, 2 and 3 hours, respectively. Inset: Upconversion intensity decay and recovery behavior during the first 8 min of irradiation. In the first few seconds TTA-UC reaches maximum and rapidly decays, in order to recover to 100% during the following 8 min.
Figure 17:
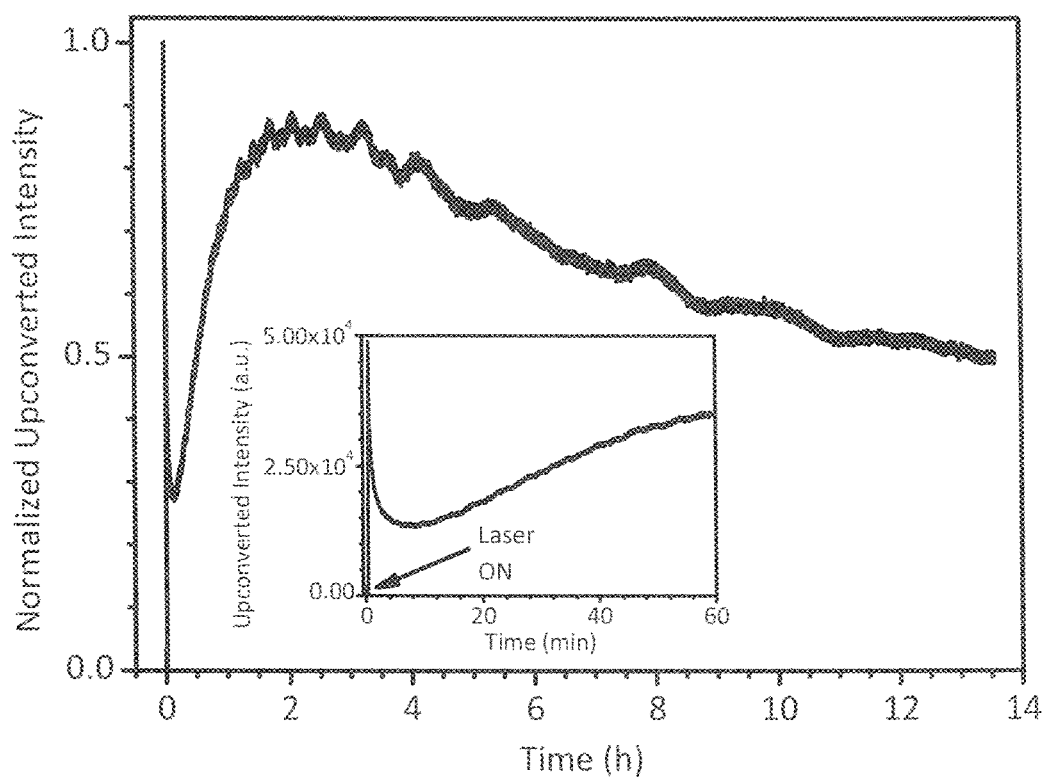
FIG. 17 illustrates the upconversion emission intensity of a green-to-blue upconverting cross-linked liquid-filled polymeric material according to the present invention containing PdOEP (c=$2 \cdot 10^{-5}$ M) and DPA (c=$1.5 \cdot 10^{-2}$ M) monitored at 433 nm upon continuous irradiation of 10 mW·cm$^{-2}$ at 543 nm with a 2 mW HeNe laser. The upconversion intensity decays to 86%, 73%, 58% and 50% of the maximum intensity after 2, 5, 10 and 13.5 hours, respectively. Inset: Upconversion intensity decay and recovery behavior during the first 60 min of irradiation. In the first few seconds TTA-UC reaches maximum and rapidly decays, in order to recover to 100% during the following 2 h.

The operational stability is very important for practical use and a pivotal factor deciding about the implementation in long-term application schemes. Therefore, the continuous-wave photostability as well as the shelf-life of the green-to-blue upconverting, PdOEP/DPA containing cross-linked liquid-filled polymeric material have been measured and evaluated. The continuous-wave stability of the material was evaluated by continuously irradiating at 543 nm, using power densities of 10 and 100 mW·cm$^{-2}$, respectively (FIG. 16, FIG. 17). If irradiated with 100 mW·cm$^{-2}$, 67%, 50% and 43% of the maximum intensity were retained after 1, 2 and 3 hours, respectively (FIG. 16). If irradiated with 10 mW·cm$^{-2}$, a considerably enhanced photostability was found. In fact, the NG retained 86% and 50% of the maximum intensity after 2 h and 13.5 h, respectively (FIG. 17). In both cases, the loss of upconversion intensity diminished at prolonged irradiation times.

Figure 18:
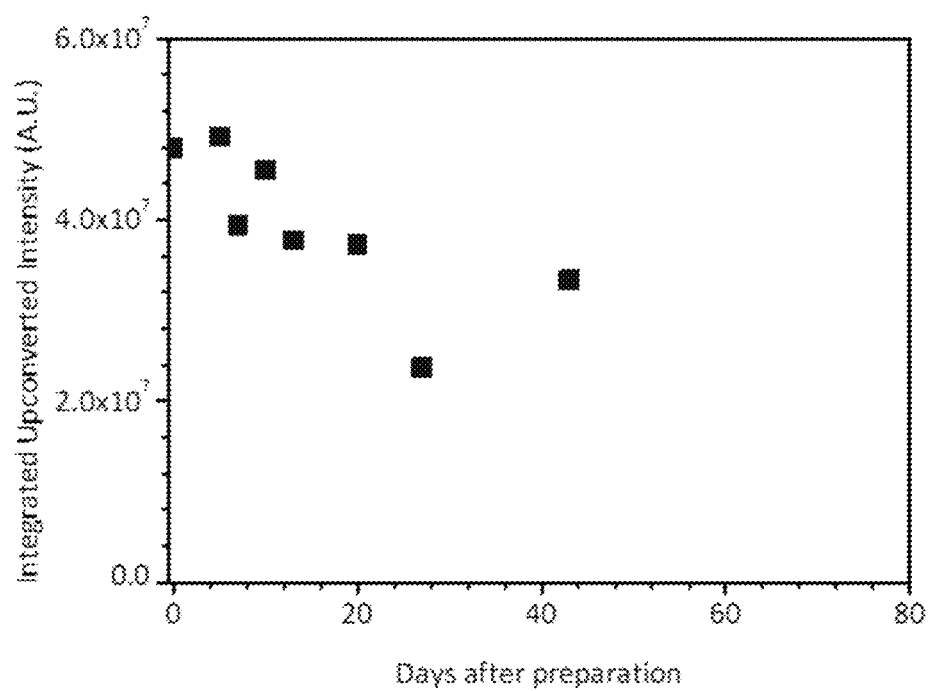
FIG. 18 illustrates the shelf-life of a green-to-blue upconverting cross-linked liquid-filled polymeric material according to the present invention containing PdOEP (c=$2 \cdot 10^{-5}$ M) and DPA (c=$1.5 \cdot 10^{-2}$ M) irradiated at 543 nm with 180 mW·cm$^{-2}$. The integrated upconversion emission was measured over time of a sample prepared under ambient conditions and kept sealed in a glass cuvette in the dark.

The shelf-life of the green-to-blue upconverting, PdOEP/DPA containing cross-linked liquid-filled polymeric material according to the present invention was evaluated by measuring the upconverted light of a sample that had been prepared under ambient conditions and was kept sealed in the dark over a prolonged time. The sample was measured after various time points in a glass cuvette and always irradiated at 543 nm using a power density of 180 mW·cm$^{-2}$ (FIG. 18). It showed a remarkable shelf-life, as it retained 49% of the initial upconversion intensity after 27 days. In contrast, a similar material that was prepared and kept under ambient conditions qualitatively completely lost its blue upconverted emission and only displayed red phosphorescence after five to seven days. The nanostructured glasses seem to offer a very good short-term protection from oxygen. However, we speculate that oxygen can diffuse into the hydrophobic BMB phase and oxidize DPA over the course of five to seven days, leading to the appearance of red phosphoresce.

Structural Tuning of Upconverting Nanostructured Polymers

As mentioned above, the design principle for the upconverting cross-linked liquid-filled polymeric material according to the present invention is very versatile, as this concept is not only confined to cross-linked glassy matrix polymers, but it can readily be extended to elastomers (i.e., cross-linked polymers with a sub-ambient glass transition temperature) and heat-deformable glasses (i.e., by omitting the cross-linker). Upconverting elastomers can be prepared by simply replacing the methacrylate monomers with the corresponding acrylates (2-hydroxyethyl acrylate, acrylic acid, tetraethylene glycol diacrylate) and heat-deformable glasses can be prepared by simply omitting the cross-linker, otherwise following identical procedures used for the cross-linked glasses containing PdOEP/DPA-dyes.

Figure 19:
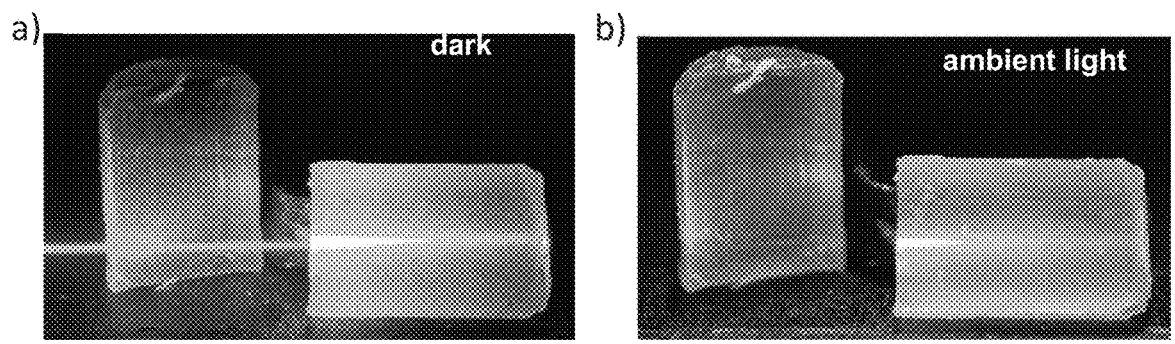
FIG. 19 illustrates pictures of an elastic, green-to-blue upconverting cross-linked liquid-filled polymeric material according to the present invention, irradiated with a 2 mW green HeNe laser at 543 nm (power density ca. 250 mW·cm$^{-2}$). The sample contains PdOEP (c=$2.10^5$ M) and DPA (c=$1.5 \cdot 10^{-2}$ M) and emits blue upconverted light visible a) in the dark and b) under ambient illumination. The elastomer was prepared under ambient conditions using a glass vial as mold.

The transparent, PdOEP/DPA-containing, elastomers were found to display a visible blue upconverted emission upon irradiation of ca. 250 mW·cm$^{-2}$ at 543 nm (FIG. 19).

Figure 20:
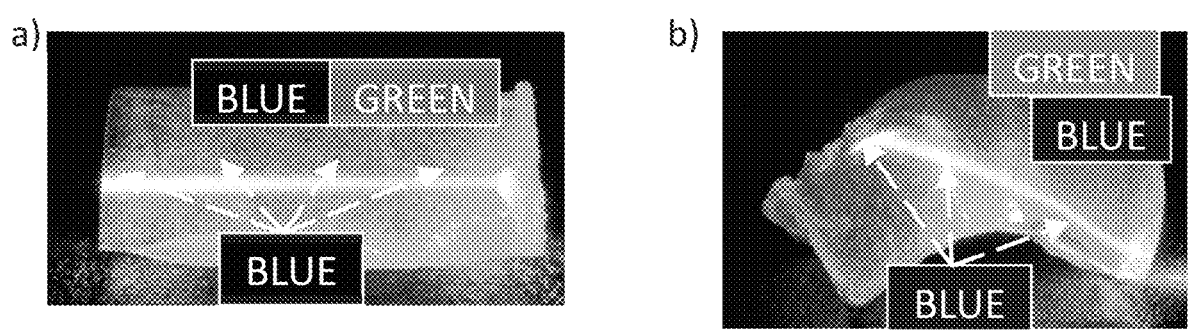
FIG. 20 illustrates pictures of a thermally shapeable green-to-blue upconverting non-cross-linked liquid-filled polymeric material according to the present invention, irradiated with a 2 mW green HeNe laser at 543 nm (power density ca. 225 mW·cm$^{-2}$). The sample contains PdOEP (c=$10^{-5}$ M) and DPA (c=$1.5 \cdot 10^{-2}$ M) and emits blue light visible a) before and b) after deformation upon heating.

The transparent, non-cross-linked, liquid-filled glasses containing PdOEP/DPA were found to be qualitatively more ductile upon heating than their cross-linked counterparts and to retain visible upconversion as well as their given shape after cooling back to ambient conditions (FIG. 20).

In order to probe the importance of every single component on the TTA-UC efficiency of the polymers, PdOEP/DPA-containing, cross-linked liquid-filled polymeric materials were prepared without either ethylene glycol or CTAB-surfactant.

Figure 21:
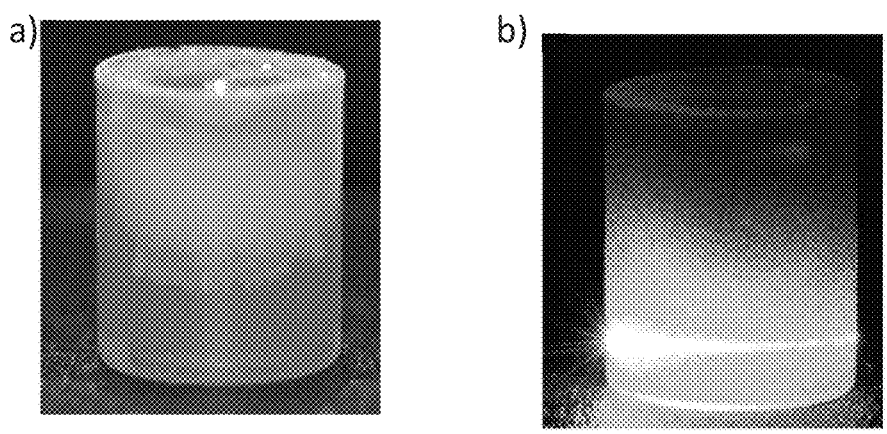
FIG. 21 illustrates pictures of a PdOEP/DPA-containing, cross-linked liquid-filled polymeric material made without ethylene glycol, a) taken under ambient lightning and b) taken in the dark upon irradiation with a 2 mW HeNe laser (power density ca. 225 mW·cm$^{-2}$). Picture b) displays visible blue upconverted light despite some scattering. The polymers were prepared by following the same procedure as for PdOEP/DPA-containing polymers with ethylene glycol reported in the experimental section.

Materials containing no ethylene glycol were prepared by using otherwise the identical preparation procedure as for green-to-blue upconverting, cross-linked polymeric materials. The opaque glasses displayed visible upconversion in the dark upon irradiation with ca. 225 mW·cm$^{-2}$ at 543 nm (FIG. 21). However, the UC efficiency was found to be qualitatively inferior compared to the one observed in cross-linked liquid-filled polymeric materials containing ethylene glycol above. The opaque nature is consistent with phase segregation and larger domain sizes than in preferred embodiments of the present invention.

Figure 4:
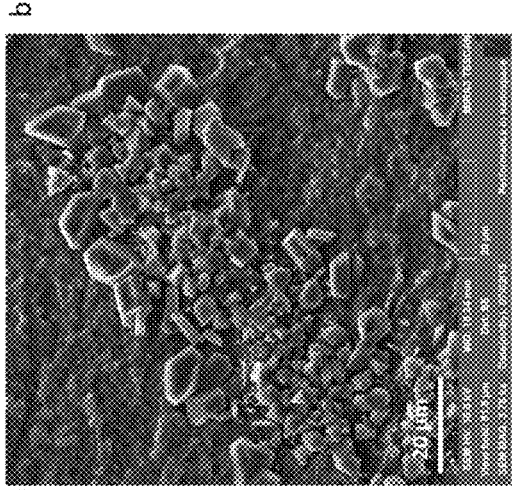
FIG. 4 illustrates scanning electron microscopy (SEM) images of a PdOEP/DPA-containing, cross-linked material made without the CTAB surfactant. Images were obtained by fracturing samples and coating them with a 5 nm thin gold layer. Images a)-c) show the same sample at different magnifications. At low magnifications (a) the formation of crystals and thus phase segregation can be observed. In contrast to samples with CTAB-surfactant (FIG. 3), no nanostructures could be observed at high magnifications.
Figure 4:
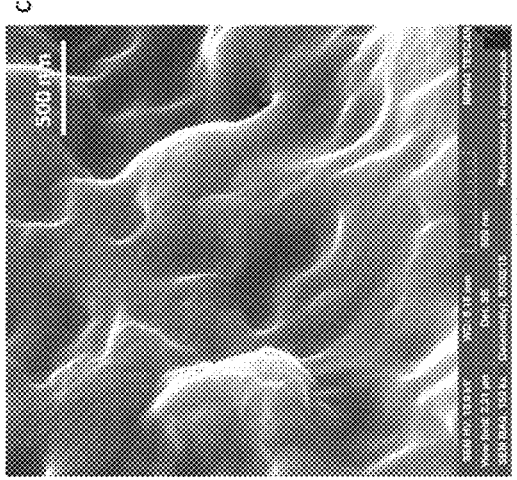
Figure 4:
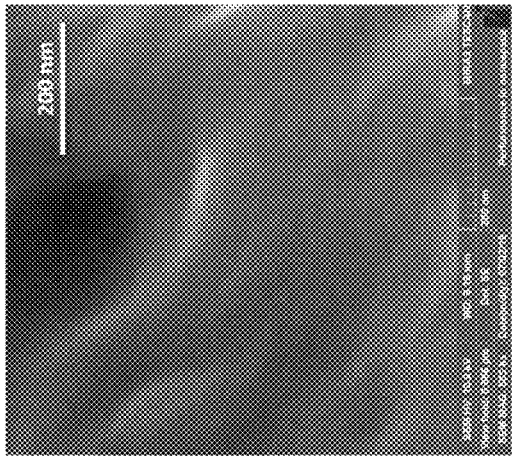
Figure 5:
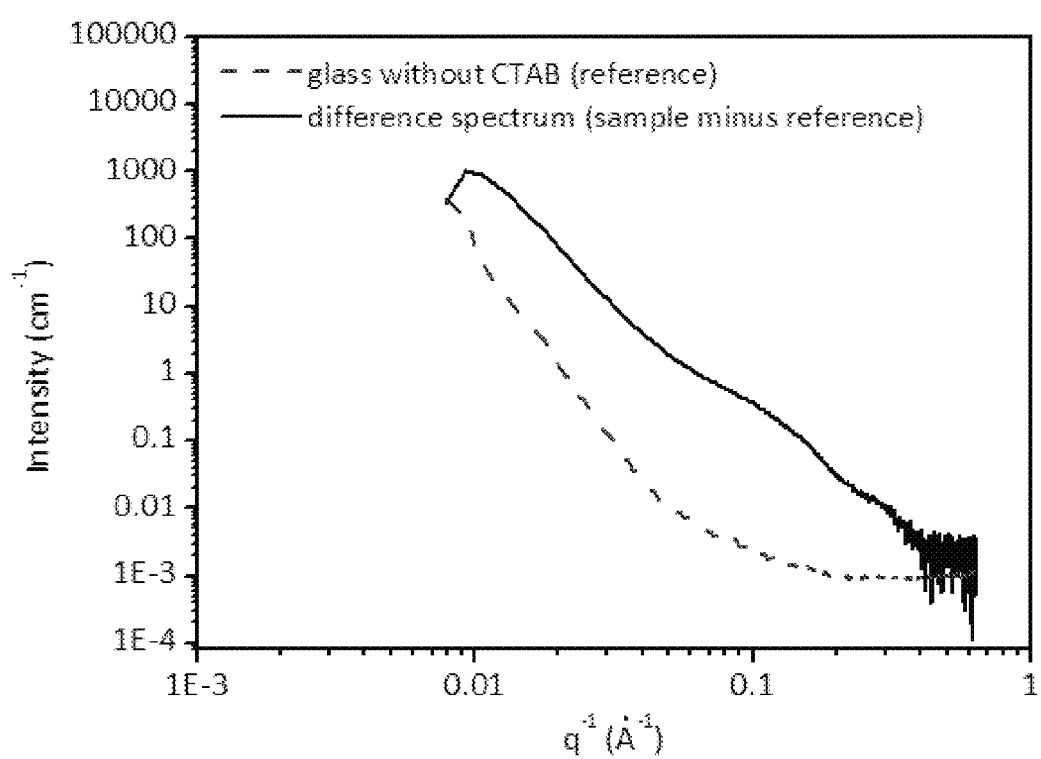
FIG. 5 illustrates SAXS-data for a PdOEP/DPA-containing, upconverting cross-linked liquid-filled polymeric material according to the present invention (black line, the spectrum was measured and is shown minus the reference spectrum) and a reference material that was made with the same process but without CTAB (reference, red line). The comparison clearly shows the presence of a nanoscale morphology the in the bulk of the sample made according to the present invention.
Figure 22:
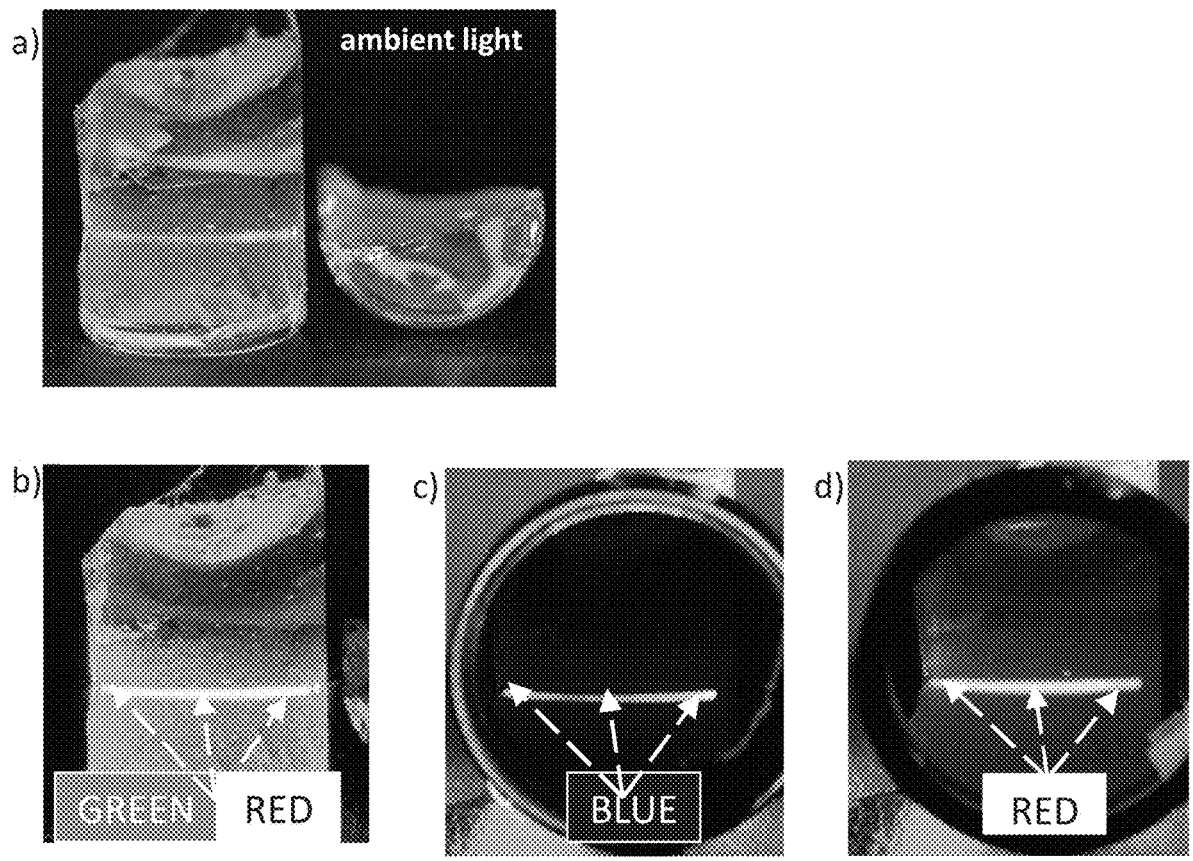
FIG. 22 illustrates pictures of a PdOEP/DPA-containing, cross-linked liquid-filled polymeric material made without CTAB-surfactant, taken a) under ambient lightening, b) in the dark, c) using a 500 nm short-pass and d) using a 600 nm long-pass filter. The sample was irradiated with a 2 mW HeNe laser (power density ca. 225 mW·cm$^{-2}$) and predominantly displayed porphyrin phosphorescence besides some blue upconverted emission. The mostly clear sample showed signs of phase separation and could not be detached from the glass mold.

Similarly to the polymers without ethylene glycol, polymeric materials containing no CTAB-surfactant were prepared by using otherwise the identical preparation procedure as for green-to-blue upconverting, cross-linked liquid-filled polymers. The mostly clear materials showed only a minor blue emission visible through a 500 nm short-pass filter and mainly red porphyrin phosphorescence (FIG. 22). Scanning electron micrographs (SEM) and small-angle x-ray scattering (SAXS) spectra of such polymers have been discussed above in the context of structural characterization of PdOEP/DPA-containing, liquid-filled polymeric materials. Polymers without CTAB-surfactant displayed a very different morphology that the materials according to the present invention. No liquid/solid phase separation can be observed, but SEM images show the formation of microcrystals, likely consisting of DPA, which is the only crystallizable compound remaining in significant concentrations (FIG. 4). This structure precludes an efficient triplet-exciton diffusion and TTA.

Figure 23:
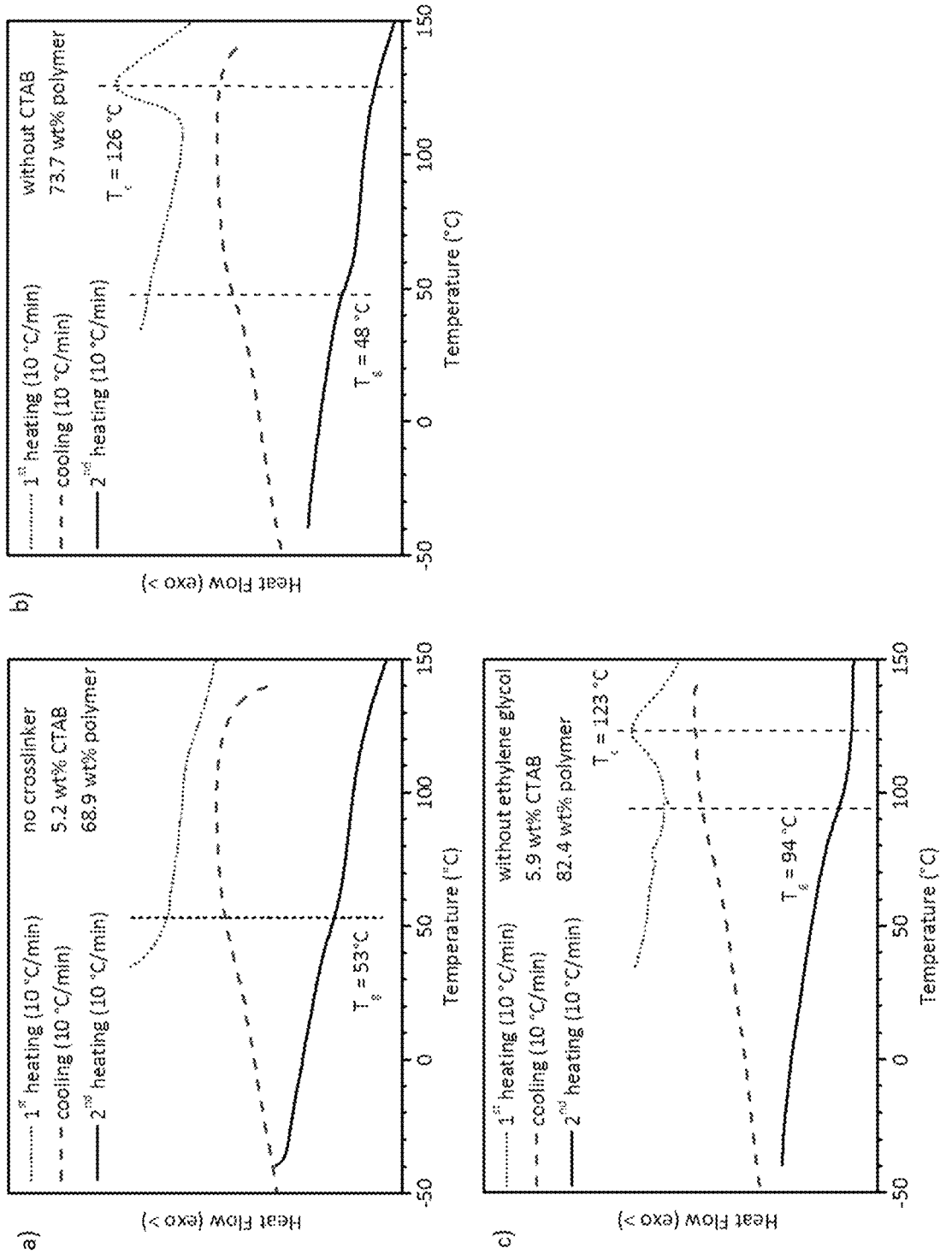
FIG. 23 illustrates DSC scans of liquid-filled polymeric materials prepared a) without cross-linker, b) without CTAB surfactant and c) without ethylene glycol. All the polymers were prepared using the same preparation procedure as for the neat, photoinactive polymeric materials. Interestingly, polymers prepared without cross-linker or CTAB showed the same glass transition temperature range $T_g$=48-53° C. as the standard composition during the second heating cycle.

Differential scanning calorimetry (DSC)-measurements of liquid-filled polymers prepared without cross-linker, without CTAB-surfactant and without ethylene glycol were performed in order to further characterize these materials and to determine the origin of the glass transition at $T_g$=48-53° C. observed in the previously discussed polymers (FIG. 6). DSC-measurements were performed with dye-free materials, since only a small difference in $T_g$ was found between PdOEP/DPA-containing ($T_g$=53° C.) and dye-free ($T_g$=48° C.) liquid-filled polymers (second heating cycle, 10° C./min). The non-cross-linked polymeric materials displayed a virtually identical DSC-scan compared to the cross-linked polymers. Apparently, the three-dimensional cross-linking does not have a major impact on the glass transition temperature (FIG. 23a). Polymeric materials prepared without CTAB-surfactant (FIG. 23b) also displayed a similar glass transition temperature ($T_g$=53° C.) in the second heating cycle as polymers containing CTAB. The glass transition at 53° C. therefore probably originates from the polymer network as it is not influenced by the absence of CTAB. However, contrary to the "standard" liquid-filled polymeric materials (FIG. 6), the first heating cycle in FIG. 23b displayed an exothermic transition at $T_c$=126° C. Liquid-filled polymeric materials prepared without ethylene glycol (FIG. 23c) displayed the same exothermic transition at $T_c$=123° C. as the CTAB-free glasses in the first heating cycle but a much higher glass transition at $T_g$=94° C. during the second heating cycle. The higher glass transition at $T_g$=94° C. during the second heating cycle strongly indicates that ethylene glycol resides in the hydrophilic polymer phase and that it acts as a plasticizer therefore reducing its glass transition temperature. The exothermic transition in the first heating cycle at $T_c$=123-126° C. is believed to originate from the polymer-network, since it is also observed in the CTAB-free polymers lacking a second phase (FIG. 4). This transition may be explained by an exothermic, thermally-induced polymerization of residual monomer, by exothermic esterification/cross-linking between the HEMA and MAA-units or, although unlikely, by crystallisation of the cross-linked polymer network. The hydrophobic solvent 1-tert-butyl-3,5-dimethylbenzene did not display any visible first- or second-order thermal transition when cooling to or heating from −50° C. at heating/cooling rates as low as 1° C./min.

TABLE 1

Composition and second heating cycle glass transition temperatures of liquid-filled, cross-linked polymeric materials with varying amounts of CTAB-surfactant. The composition of the monomers employed leading to the cross-linked polymer phase remains unchanged for all the samples and follows the scheme given in Table 2. Increasing the surfactant content and decreasing the polymer content seems to have only a small influence on the glass transition temperature $T_g$ of the polymeric materials.

| polymer | CTAB | BMB + ethylene glycol | glass transition temperature $T_g$ |
| --- | --- | --- | --- |
| 70 wt % | 5 wt % | 10 + 15 wt % | 48° C. |
| 65 wt % | 10 wt % | 10 + 15 wt % | 48° C. |

TABLE 1-continued

Composition and second heating cycle glass transition temperatures of liquid-filled, cross-linked polymeric materials with varying amounts of CTAB-surfactant. The composition of the monomers employed leading to the cross-linked polymer phase remains unchanged for all the samples and follows the scheme given in Table 2. Increasing the surfactant content and decreasing the polymer content seems to have only a small influence on the glass transition temperature $T_g$ of the polymeric materials.

| polymer | CTAB | BMB + ethylene glycol | glass transition temperature $T_g$ |
|---|---|---|---|
| 60 wt % | 15 wt % | 10 + 15 wt % | 44° C. |
| 55 wt % | 20 wt % | 10 + 15 wt % | 44° C. |

Besides the standard materials made with 70 wt. % polymer, 5 wt. % CTAB, 10 wt. % BMB, and 15 wt. % ethylene glycol (Table 2) we investigated also materials with a higher CTAB and lower polymer content (Table 1) following the same procedure. The composition of the various monomers employed leading to the cross-linked polymer-phase corresponds to the one given in Table 2 and remained unchanged for all the samples. DSC measurements of materials made without any upconverting dyes displayed $T_g$s ranging from 44 C to 48 C, for liquid-filled polymeric materials containing 55-65 wt. % polymer and 5-20 wt. % CTAB (Table 1). These results support the previous conclusion that this glass transition originates from the polymer phase, since it is scarcely influenced by changing the overall CTAB or polymer content.

Figure 3:
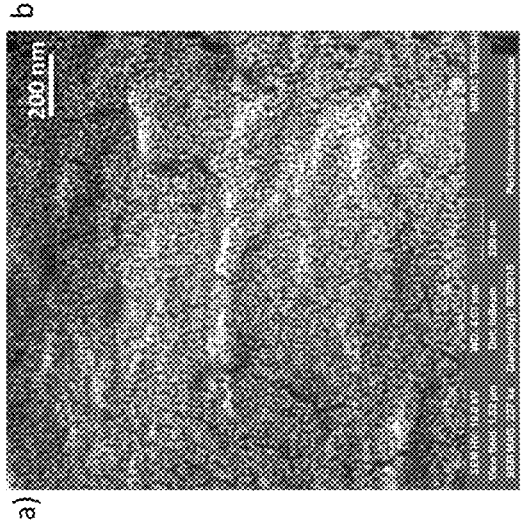
FIG. 3 illustrates scanning electron microscopy (SEM) images of a PdOEP/DPA-containing, upconverting cross-linked liquid-filled polymeric material according to the present invention. The images show two interpenetrated, nanostructured phases, where the minor phase forms ca. 20 nm wide and up to ca. 100 nm long channels. Images were obtained by fracturing the sample and coating it with 5 nm gold. Images a)-c) show the same sample at different magnifications.
Figure 3:
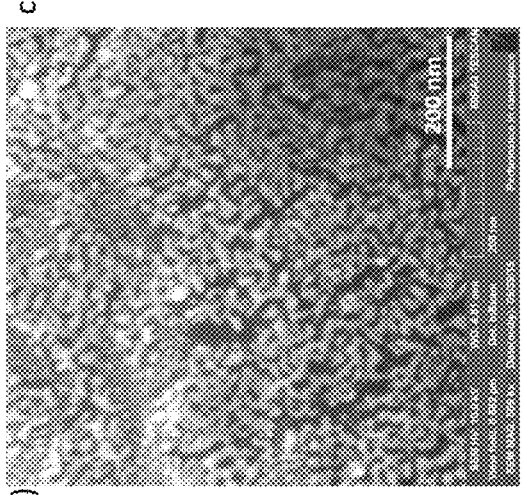
Figure 3:
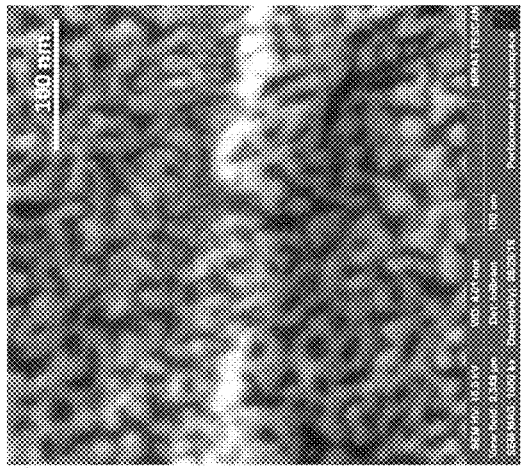
Figure 24:
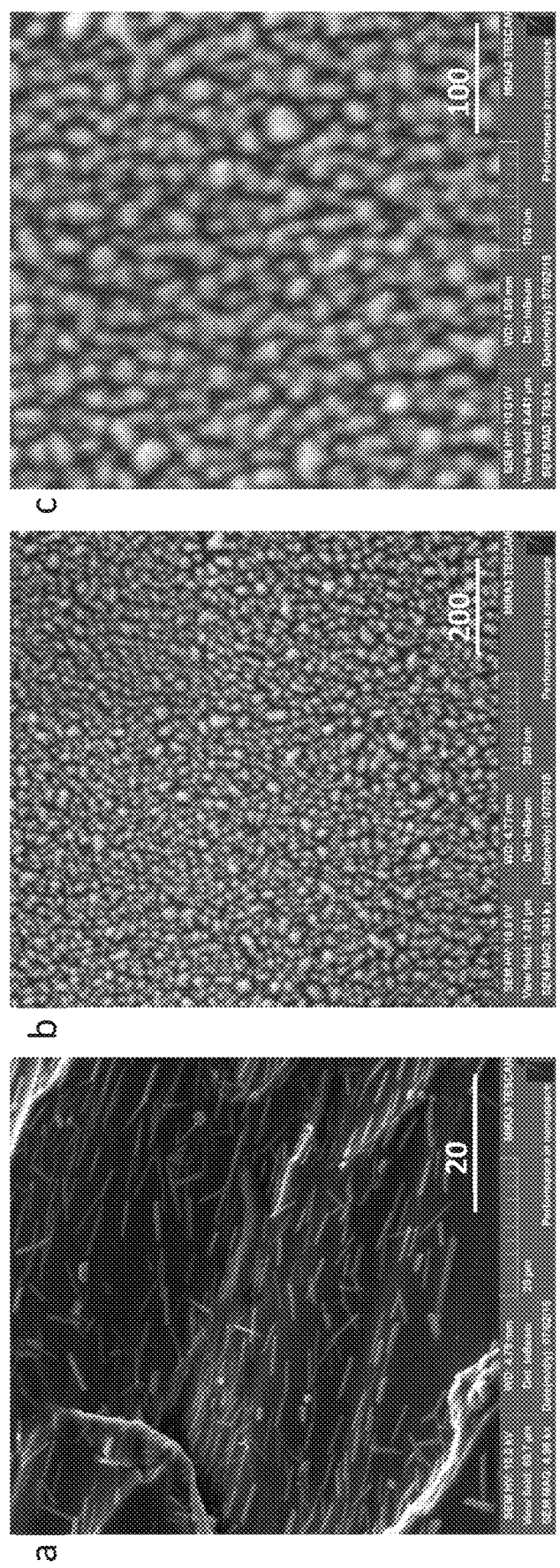
FIG. 24 illustrates SEM images of PdOEP/DPA-containing, cross-linked liquid-filled polymeric materials with 15 wt. % CTAB surfactant content a) showing microcrystal-formation on the surface, b-c) showing two phases, where the minor phase forms sphere-like structures of up to ca. 20 nm diameter. The surface of a fractured sample was imaged ca. 2 h after preparation. Microcrystal-formation is believed to stem from the slower polymerization observed for this material, thus facilitating phase-segregation.

In contrast to the polymeric material's glass transition temperature, which remains stable, increasing the CTAB content from 5 wt. % to 15 wt. % leads to different morphologies at the nanoscale. For example, PdOEP/DPA, cross-linked, liquid-filled polymeric materials with a CTAB-content of 15 wt. % displayed rather spherical domains (FIG. 24) instead of the interpenetrated network observed in the PdOEP/DPA-containing, cross-linked polymers with a CTAB-content of 5 wt. % (FIG. 3). This result is explained with the fact that a higher surfactant content more effectively reduces the interfacial tension, which leads to a higher radius of curvature.[46]

Optical Tuning of Nanostructured Glasses

Figure 25:
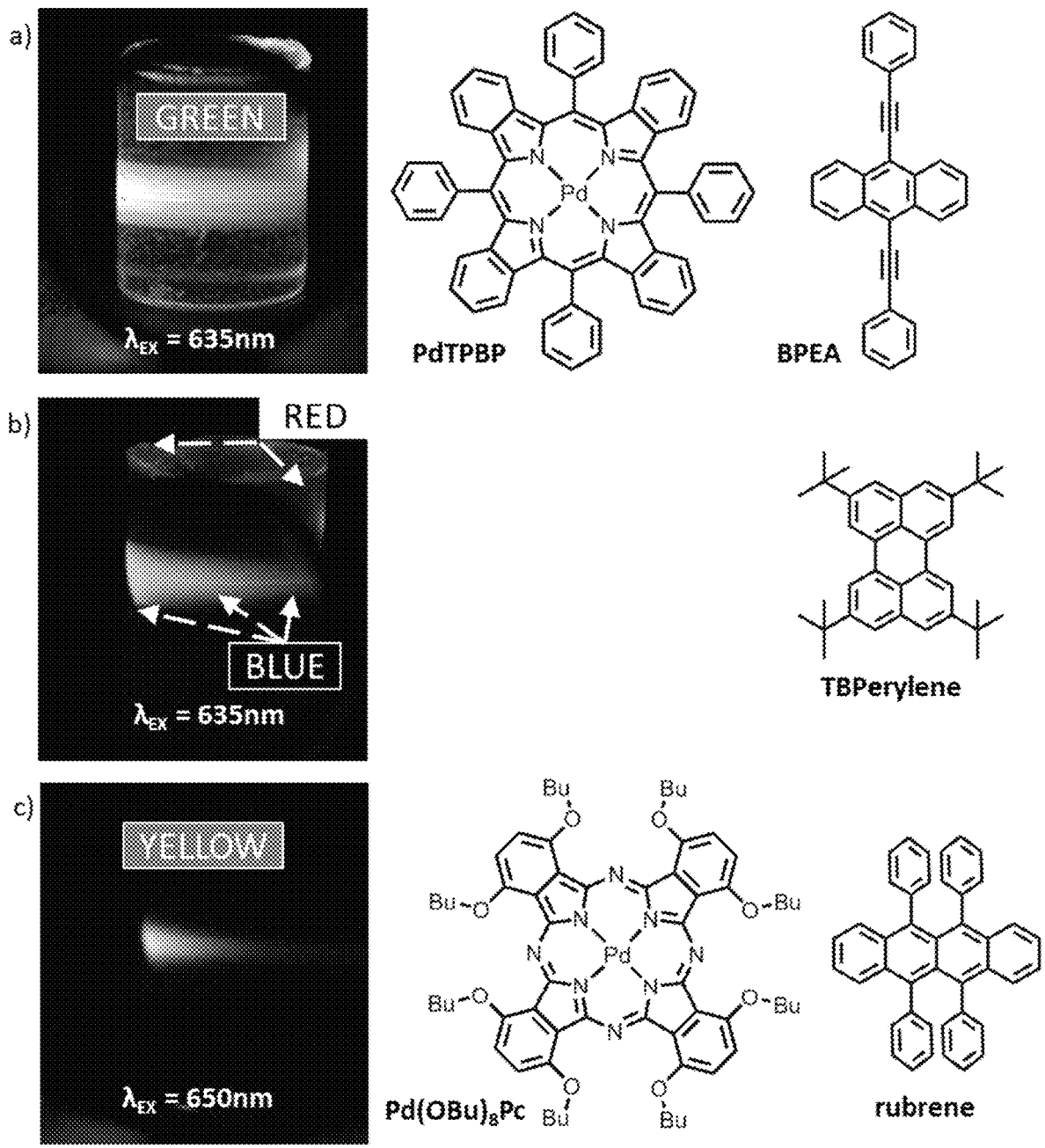
FIG. 25 illustrates pictures and chemical structures of upconverting liquid-filled polymeric materials according to the present invention: a) red-to-green upconverting containing PdTPBP (c=2·10$^{-5}$ M)/BPEA (c=2·10$^{-3}$ M), b) red-to-blue upconverting containing PdTPBP (c=2·10$^{-5}$ M)/TBPe (c=2·10$^{-3}$ M) and c) NIR-to-yellow upconverting containing Pd(OBu)$_8$Pc (c=10$^{-5}$ M)/rubrene (c=10$^{-3}$ M). All images were taken in the dark. Samples a) and b) were excited with a 3.2 mW diode-laser at 635 nm and sample c) with a 5.9 mW laser pointer at 650 nm. All the samples were prepared under ambient conditions using glass vials as molds.
Figure 27:
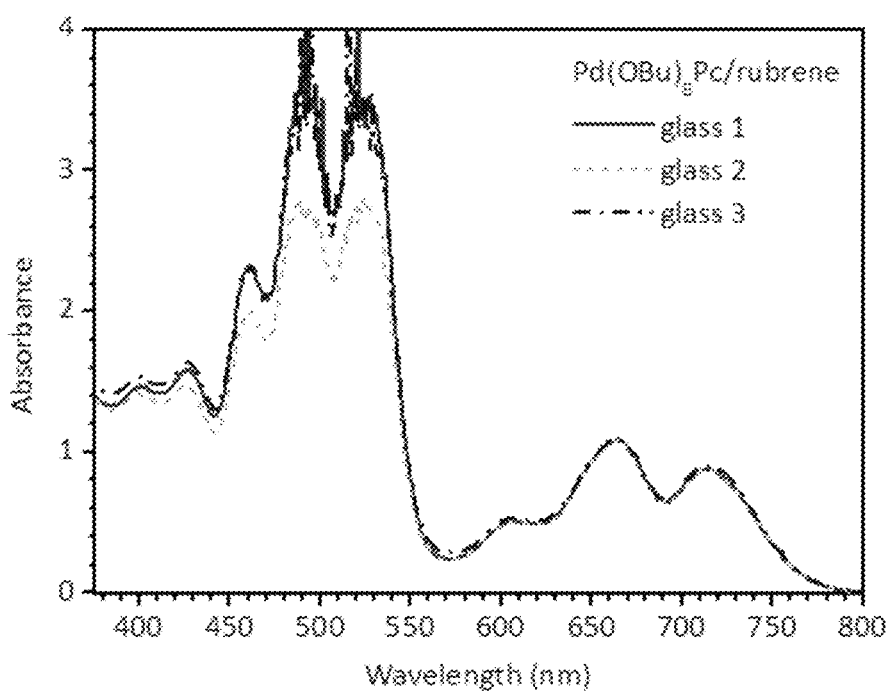
FIG. 27 illustrates the absorption spectra of three NIR-to-yellow upconverting, cross-linked liquid-filled polymeric materials according to the present invention of the same composition (R1, R2, R3), recorded at normal incidence with an optical path length of 1 cm.
Figure 28:
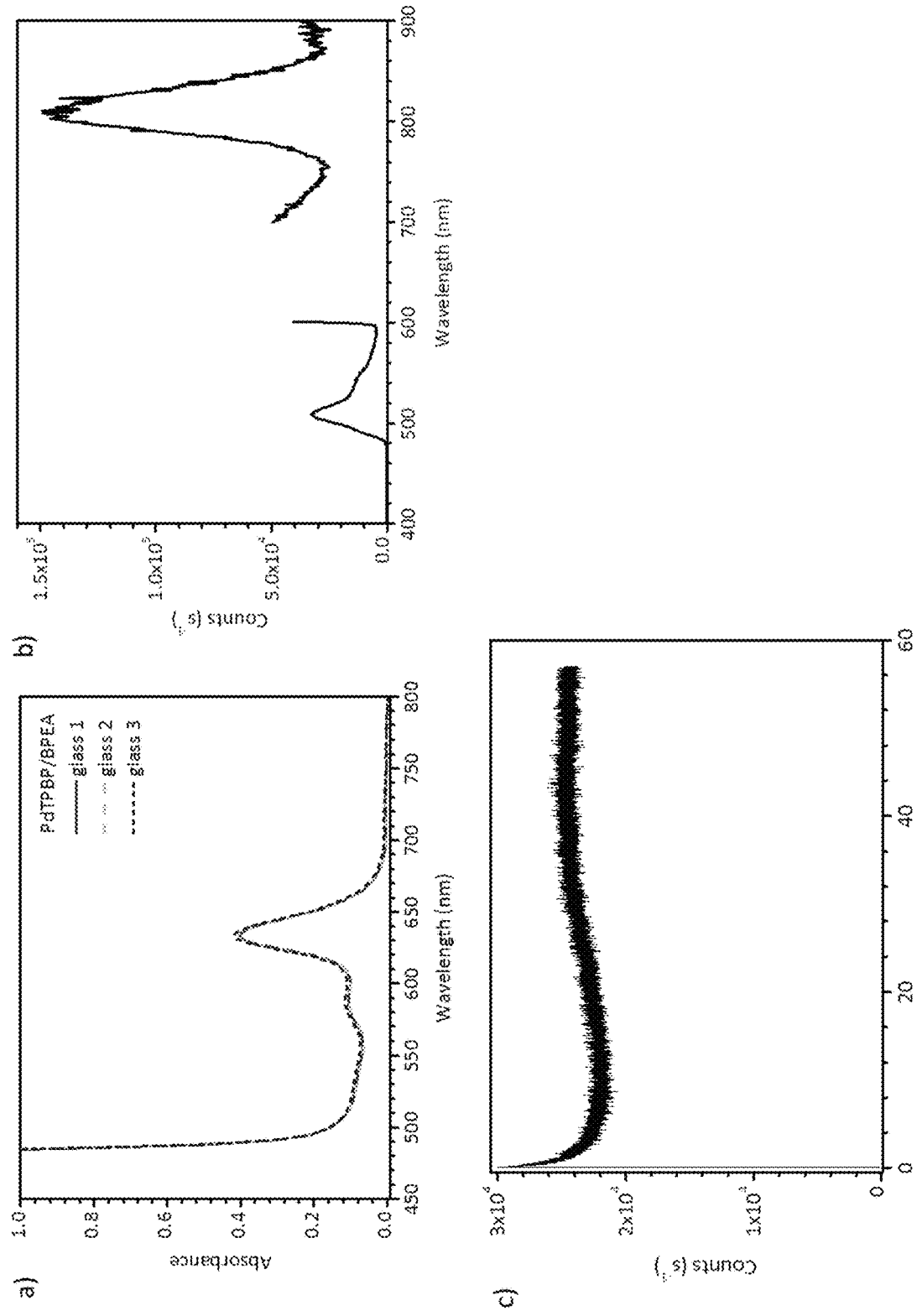
FIG. 28 illustrates the optical properties of red-to-green upconverting, cross-linked liquid-filled polymeric materials according to the present invention comprising PdTPBP (c=2·10$^{-5}$ M)/BPEA (c=2·10$^{-3}$ M). a) Absorption spectrum of three different samples (optical path: 0.5 cm). b) Qualitative photoluminescence spectrum and c) upconverted light intensity upon continuous irradiation of 2.23 mW at 635 nm.
Figure 29:
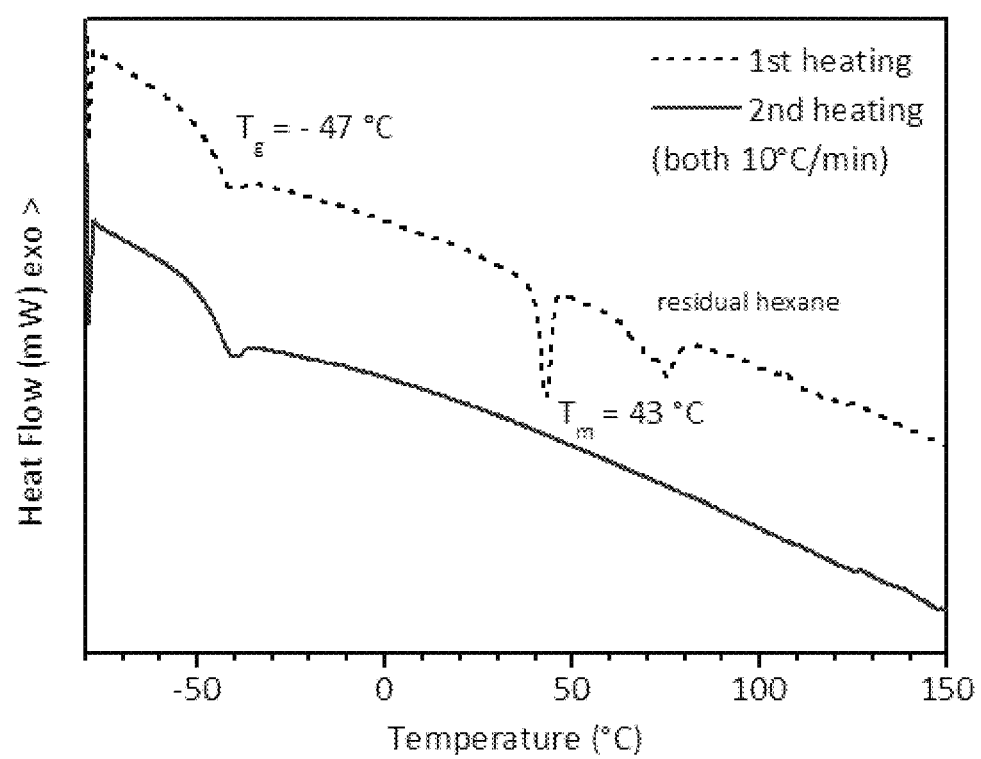
FIG. 29 illustrates the DSC trace of [anthracene-9,10-diylbis(4,1-phenylene)]bis(methylene) bis(2-heptylundecanoate) and shows a melting ($T_m$) and a glass transition ($T_g$) temperature during the first heating and only a $T_g$ during the second heating.
Figure 30:
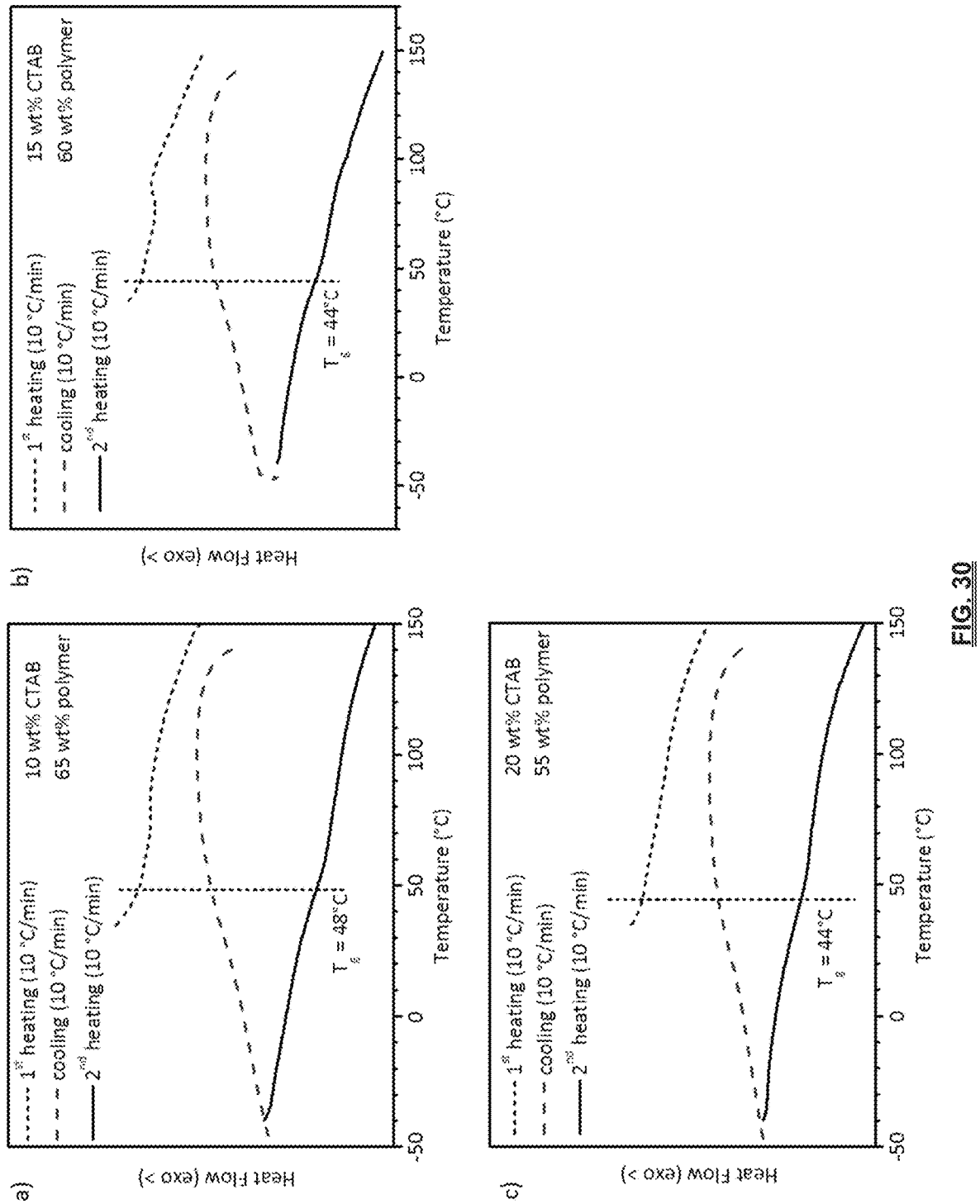
FIG. 30 illustrates the DSC traces of cross-linked, dye-free liquid-filled polymeric materials containing higher amounts of CTAB surfactant than the "standard composition" with 70 wt. % polymer and 5 wt. % CTAB-surfactant, discussed herein, a) 10 wt CTAB and 65 wt. % polymer, b) 15 wt. % CTAB and 60 wt. % polymer and c) 20 wt. % CTAB and 55 wt. % polymer.

Besides the many possibilities to tune the morphology and mechanical properties of the upconverting liquid-filled polymeric materials according to the present invention, the concept also enables to easily tune the materials' optical response by simply utilizing different chromophores. Thus, the composition can be changed to upconvert different radiation than green-to-blue by introducing other UC-dye pairs. To demonstrate this, a red-to-green upconverting, cross-linked liquid-filled polymeric material was made by introducing Pd(II)-meso-tetraphenyl tetrabenzoporphine (PdTPBP)/9,10-bis(phenylethynyl)anthracene (BPEA) instead of PdOEP/DPA. Similarly, a red-to-blue upconverting material was made by introducing PdTPBP/tetra-tert-butylperylene (TBPe) instead of PdOEP/DPA. As a last example, a material performing NIR-to-yellow upconversion was made by utilizing Pd(II)-octabutoxyphthalocyanine (Pd(OBu)$_8$Pc)/rubrene instead of PdOEP/DPA (FIG. 25). All these materials displayed upconversion that was clearly visible through low-pass filters, which cut out scattered excitation light at 635 (FIG. 28) or at 650 nm. NIR-to-Vis upconverting systems are very important for high-impact applications such as photovoltaics[51] or bioimaging.[52] Therefore, the NIR-to-yellow upconverting, cross-linked liquid-filled polymeric material containing Pd(OBu)$_8$Pc/rubrene was further investigated by determining its quantum efficiency upon excitation at 670 nm. Gratifyingly, the material prepared under ambient conditions and stored sealed in an optical glass cuvette displayed a very high quantum efficiency of $\phi_{UC}$=0.15±0.03 (see FIG. 27). The very high efficiency observed for the technically important upconversion of NIR-light will open the door to disruptive advantages for the previously mentioned applications and beyond.

Upconverting, liquid-filled polymeric materials represent a new, easy and highly versatile concept to prepare highly efficient upconverting materials that mimic and vastly preserve some photophysical dye-properties found in degassed organic solvents. The polymers presented herein have the potential to be applied for a wide range of optical materials and for high-impact applications, such as upconversion of sub-bandgap light for perovskite or dye-sensitized solar cells[51] by incorporating non-commercially available NIR-systems upconverting light longer than 800 nm.[53-55] Shelf-life and photostability may be even further improved by using liquid DPA-derivatives as the hydrophobic nano-phase[56] or by controlled variation of the morphologies at the nanoscale. The invention thus includes, inter alia, the following embodiments Nos. 1-25:

1) A light upconverting phase-separated material made by curing a curable composition, comprising: at least one solid phase that comprises, by majority, a polymer; and containing at least one liquid phase, wherein said at least one liquid phase contains at least a dye pair that is capable of optical upconversion.

2) The light upconverting phase-separated material of embodiment 1, wherein said curing involves a polymerization reaction.

3) The light upconverting phase-separated material of embodiment 2, wherein said polymerization reaction is a free radical polymerization reaction.

4) The light upconverting phase-separated material according to any of embodiments 1-3, wherein said light-upconverting phase-separated material is substantially transparent.

5) The light upconverting phase-separated material according to any of embodiments 1-4, in which the liquid phase or phases forms or form domains with a dimensions of maximally 100 nm, preferably maximally 50 nm, and most preferably maximally 30 nm.

6) The light upconverting phase-separated material according to any of embodiments 1-5, wherein said solid phase contains at least one polymer in an amount of at least 50 wt. %, preferably at least about 70 wt. %, and most preferably at least about 80 wt. % based on the total weight of the solid phase.

7) The light upconverting phase-separated material according to any of embodiments 1-6, wherein said at least one liquid phase includes at least one hydrophobic liquid in an amount of about 1 wt. % to about 70 wt. % and preferably from about 5 wt. % to about 30 wt. % based on the total weight of the composition, and wherein said at least one hydrophobic liquid has a boiling temperature of more than 100° C., preferably more than 200° C., and most preferably more than 300° C., and wherein said at least one hydrophobic liquid has a solidification temperature of less than 20° C., preferably less than 0° C. and most preferably less than −20° C.

8) The light upconverting phase-separated material according to any of embodiments 1-7, wherein said light-upconverting phase-separated material contains at least one cationic, nonionic or anionic surfactant preferably in an amount of less than 30 wt. %, more preferably in an amount from about 0.5 wt. % to about 20 wt. % and most preferably from about 2 wt. % to about 15 wt % based on the total weight of the composition.

9) The light upconverting phase-separated material according to any of embodiments 1-8, wherein said light-upconverting phase-separated material contains at least one plasticizer.

10) The light upconverting phase-separated material according to any of embodiments 1-9, wherein said at least one solid phase includes a polymer formed by the polymerization one or more of acrylates, methacrylates, acrylamides, methacrylamides, acrylic acids, methacrylic acids, and their salts, vinylpyridines, oxazolines, diacrylates, and dimethacrylates.

11) The light upconverting phase-separated material according to any of embodiments 1-10, wherein said at least one liquid phase is not liquid crystalline.

12) The light upconverting phase-separated material according to any of embodiments 1-11, which is characterized by an upconversion quantum efficiency of at least 0.001, more preferably of more than 0.01, more preferably of more than 0.05, even more preferably of more than 0.1, and most preferably of 0.14 or more.

13) The light upconverting phase-separated material according to any of embodiments 1-12, wherein said light-upconverting phase-separated material comprises CTAB.

14) A method for producing a light upconverting phase-separated material, containing at least one solid phase that comprises, by majority, a polymer, and containing at least one liquid phase, wherein said at least one liquid phase contains at least a dye pair that is capable of optical upconversion, comprising the steps of: providing a curable composition and curing said curable composition to form said light upconverting phase-separated material.

15) The method of embodiment 14, wherein said curable composition contains at least one polymerizable monomer, a non-polymerizable liquid, and a dye pair that is capable of optical upconversion.

16) The method according to any of embodiments 14-15, where said curable composition contains at least one cationic, nonionic or anionic surfactant in an amount of less than 30 wt. %, more preferably in an amount from about 0.5 wt. % to about 20 wt. % and most preferably from about 2 wt. % to about 15 wt % based on the total weight of the composition.

17) The method according to any of embodiments 14-16, where said curing involves a free radical polymerization reaction.

18) A process according to any of embodiments 14-16, wherein the polymerization step is a radical polymerization process, wherein the phase-separated material formed has a feature dimensions of maximally 100 nm, preferably maximally 50 nm, and most preferably maximally 30 nm.

19) A process according to any of embodiments 14-18, wherein said solid phase contains at least one polymer in an amount of at least 50 wt. %, preferably at least about 70 wt. %, and most preferably at least about 80 wt. % based on the total weight of the solid phase.

20) A process according to any of embodiments 14-19, wherein said at least one liquid phase includes at least one hydrophobic liquid in an amount of about 1 wt. % to about 70 wt. % and preferably from about 5 wt. % to about 30 wt. % based on the total weight of the composition, and wherein said at least one hydrophobic liquid has a boiling temperature of more than 100° C., preferably more than 200° C., preferably more than 250° C. and most preferably more than 300° C., and wherein said at least one hydrophobic liquid has a solidification temperature of less than 20° C., preferably less than O° C. and most preferably less than −20° C.

21) A process according to any of embodiments 14-20, wherein said light-upconverting phase-separated material contains CTAB preferably in an amount of less than 30 wt. %, more preferably in an amount from about 0.5 wt. % to about 20 wt. % and most preferably from about 2 wt. % to about 15 wt % based on the total weight of the composition.

22) A process according to any of embodiments 14-21, wherein said light-upconverting phase-separated material contains at least one plasticizer.

23) A process according to any of embodiments 14-21, wherein said at least one solid phase includes a polymer formed by the polymerization one or more of acrylates, methacrylates, acrylamides, methacrylamides, acrylic acids, methacrylic acids, and their salts, vinylpyridines, oxazolines, diacrylates, and dimethacrylates.

24) A process according to any of embodiments 14-23, wherein said at least one liquid phase is not liquid crystalline.

25) A process according to any of embodiments 14-24, which is characterized by an upconversion quantum efficiency of at least 0.001, more preferably of more than 0.01, more preferably of more than 0.05, even more preferably of more than 0.1, and most preferably of 0.14 or more.

Wherever used, the term "wt. %" stands for "% by weight".

Experimental Section

Preparation of Nanostructured Polymers

General

PdOEP [2,3,7,8,12,13,17,18-octaethyl-21H,23H-porphine palladium(II), dye content 85%], Acrylic acid (AA, 99%, 200 ppm MEHQ as inhibitor), 1-tert-butyl-3,5-dimethylbenzene (BMB, 98%), 9,10-bis(phenylethynyl)anthracene (BPEA, 97%), cetyltrimethylammonium bromide (CTAB, >99%), benzoyl peroxide (BPO, 75%, 25% water, Luperox® A75FP), N,N-dimethylaniline (DMA, 99%), ethylene glycol (>99.5%), 2-Hydroxyethyl methacrylate (HEMA, >99%, 50 ppm MEHQ as inhibitor), 2-Hydroxyethyl acrylate (HEA, 96%, 200 ppm MEHQ as inhibitor), methacrylic acid (MAA, 99%, 250 ppm MEHQ as inhibitor), rubrene, tetraethylene glycol diacrylate (TEG-diA, >90%, 300 ppm MEHQ as inhibitor), triethylene glycol dimethacrylate (TEG-diMA, 95%, 100 ppm MEHQ as inhibitor) and Xylenes (isomer-mix) were purchased from Sigma-Aldrich and were used as received. 9,10-Diphenylanthracene (DPA, 99%) was purchased from ABCR. Spectroscopic grade toluene was purchased from Acros Organics. 2,5,8,11-tetra-tert-butylperylene (TBPe) was obtained from TCI (Tokyo Chemical Industry Co., Ltd.). Pd(II) mesotetraphenyl tetrabenzoporphine (PdTPTB) and Pd(II) 1,4,8,11,15,18,22,25-octabutoxyphthalocyanine (Pd(OBu)$_8$Pc) were obtained from Inochem, Ltd. (Frontier Scientific, Inc).

Preparation of cross-linked dye-free liquid-filled polymeric materials

A 20 mL vial was charged with hexadecyltrimethylammonium bromide (CTAB; 250 mg, 5 wt. %), HEMA (2-hydroxyethyl methacrylate; 2.66 g, 53.2 wt. %), triethylene glycol dimethacrylate (TEG-diMA; 175 mg, 3.5 wt. %), 1-tert-butyl-3,5-dimethylbenzene (BMB; 500 mg, 10 wt. %), ethylene glycol (750 mg, 15 wt. %) and methacrylic acid (MAA; 665 mg, 13.3 wt. %) (total weight=5 g). Benzoyl peroxide (BPO; 10 mg, 0.2 wt. % of the total mixture) was subsequently added and the mixture was heated to 80° C. for 10-15 min in order to mix all components and obtain a clear, homogeneous mixture.

TABLE 2

Composition of the curable composition used to from cross-linked, liquid-filled polymeric materials. Initiators and dyes were added per explanations given in the text.

3.5 wt % TEG-diMA cross-linker
13.3 wt % MAA
53.2 wt % HEMA
5 wt % CTAB surfactant
15 wt % ethylene glycol
10 wt % BMB hydrophobic oil The warm solution was then filtered through a 0.2 μm PTFE-filter in either a cuvette or a glass vial serving as mould containing N,N-dimethyl aniline (DMA; 10 mg, 0.2 wt. % of the total mixture). The homogenous, transparent mixture was then left to stand at 20° C. until gelation, after which the sample was placed into a water bath (15° C.) that served as a cooling medium. After a maximum of 30 min, the polymerization was completed and a transparent, hard block was obtained after breaking the glass mould with a hammer. Polymer glasses were also made in cuvettes and used in the cuvettes in which they were made for quantitative optical measurements. The exact composition of the feed is shown in Table 2. Transparent glasses were also obtained by using either toluene or xylenes instead of BMB.

Preparation of Green-to-Blue Upconverting, Cross-Linked Liquid-Filled Polymeric Materials These glasses were prepared by adapting the above procedure as follows. A 20 mL vial was charged with the components mentioned before, but instead of BMB (500 mg, 10 wt. %), a $c=2\cdot10^{-4}$ M palladium(II) octaethylporphyrin (PdOEP) BMB (500 mg, 10 wt. %) solution and additionally 9,10-diphenylanthracene (DPA, 25 mg) were added. Assuming density of the glass of 1 g/cm$^3$, the chromophore concentrations are $c=2\cdot10^{-5}$ M PdOEP and $c=1.5\cdot10^{-2}$ M DPA, unless stated otherwise.

Preparation of Red-to-Green Upconverting, Cross-Linked Liquid-Filled Polymeric Materials These glasses were prepared by adapting the procedure for cross-linked dye-free liquid-filled polymeric materials. A 20 mL vial was charged with the components mentioned there, but instead of BMB (500 mg, 10 wt. %), a $c=2\cdot10^{-4}$M palladium(II) tetraphenyltetrabenzoporphyrin (PdTPBP) BMB (500 mg, 10 wt. %)-solution and additionally 9,10-bis(phenylethynyl)anthracene (BPEA, 3.8 mg) were added. Assuming a glass density of 1 g·cm$^{-3}$, the chromophore concentrations are $c=2\cdot10^{-5}$ M PdTPBP and $c=2\cdot10^{-3}$ M BPEA, unless stated otherwise.

Preparation of Red-to-Blue Upconverting, Cross-Linked Liquid-Filled Polymeric Materials These glasses were prepared by adapting the procedure for red-to-green upconverting, cross-linked liquid-filled polymeric materials above. Instead of BPEA, 2,5,8,11-tetrakis(tert-butyl)perylene (TBPe, 4.8 mg) was used. Assuming a glass density of 1 g/cm$^3$, the chromophore concentrations are $c=2\cdot10^{-5}$ M PdTPBP and $c=2\cdot10^{-3}$ M TBPe, unless stated otherwise.

Preparation of NIR-to-Yellow Upconverting, Cross-Linked Liquid-Filled Polymeric Materials These glasses were prepared by adapting the procedure for cross-linked dye-free liquid-filled polymeric materials. A 20 mL vial was charged with the components mentioned before, but instead of BMB (500 mg, 10 wt. %), a $c=10^{-4}$ M palladium(II) octabutoxyphthalocyanine (PdPc(Bu)$_8$) BMB (500 mg, 10 wt. %) solution and additionally rubrene (5.3 mg) were added. Assuming a glass density of 1 g/cm$^3$, the chromophore concentrations are $c=10^{-5}$ M PdPc(Bu)$_8$ and $c=10^{-3}$ M rubrene, unless stated otherwise.

Preparation of Elastic Green-to-Blue Cross-Linked Liquid-Filled Polymeric Materials A 20 mL vial was charged with CTAB (250 mg, 5 wt. %), HEA (2-hydroxyethyl acrylate; 2.66 g, 53.2 wt. %), tetraethylene glycol diacrylate (TEG-diA; 175 mg, 3.5 wt. %), 1-tert-butyl-3,5-dimethylbenzene (BMB; 500 mg, 10 wt. %), ethylene glycol (750 mg, 15 wt. %) and acrylic acid (AA; 665 mg, 13.3 wt. %) (total weight=5 g). Benzoyl peroxide (BPO; 10 mg, 0.2 of the total mixture) was subsequently added and the mixture was heated to 80° C. for 10-15 min in order to mix all components and obtain a clear, homogeneous mixture. The warm solution was then filtered through a 0.2 μm PTFE-filter in a glass vial serving as mould containing N,N-dimethyl aniline (DMA; 10 mg, 0.2 wt. % of the total mixture). The homogenous, transparent mixture was then let to stand at 20° C. until gelation, after which the sample was placed into a water bath (15° C.) that served as a cooling medium. After a maximum 30 min, the polymerization was completed and a transparent, hard elastomeric block was obtained after breaking the glass mould with a hammer. The exact polymer-composition of the rubbers applies analogously to the values reported in Table 2 for the cross-linked glasses.

Preparation of Green-to-Blue Upconverting, Non-Cross-Linked Liquid-Filled Polymeric Materials These glasses were made by adapting the procedure for green-to-blue upconverting, cross-linked liquid-filled polymeric materials, in that the dimethacrylate cross-linker (TEG-diMA) was omitted.

Preparation of Green-to-Blue Upconverting Cross-Linked Liquid-Filled Polymeric Materials with 15 wt. % CTAB-Content These hard elastomers with a CTAB-surfactant content of 15 wt. % were prepared by adapting the procedure for green-to-blue upconverting, cross-linked liquid-filled polymeric materials: different ratios of reagents were used as follows: CTAB (750 mg, 15 wt. %), HEMA (2.28 g, 45.6 wt. %), TEG-diMA (150 mg, 3 wt. %), BMB (500 mg, 10 wt. %), ethylene glycol (750 mg, 15 wt. %) and MAA (570 mg, 11.4 wt. %). (total weight=5 g). Also, higher amounts of redox-initiator BPO and DMA were used (both 50 mg, 1 wt. % of the total mixture).

TABLE 3

Exact composition of hydrophilic monomers in the cross-linked, liquid-filled polymeric materials with 15 wt % CTAB-content. Initiators and dyes were added per explanations given in the text.

3 wt % TEG-diMA cross-linker
11.4 wt % MAA
45.6 wt % HEMA
15 wt % CTAB surfactant
15 wt % ethylene glycol
10 wt % BMB hydrophobic oil Optical and TTA-UC Quantum Yield Measurements Here, the quantum yield $\phi_{UC}$ is defined as the ratio of the number of upconverted photons emitted divided by the number of the absorbed photons.

Optical Equipment Used

Steady-state photoluminescence (PL) experiments were carried out on a Photon Technology International (PTI) C720 spectrophotometer equipped with a Hamamatsu R928P photomultiplier. Upconversion was accomplished with a 2 mW non-polarized 543 nm green HeNe laser (Thorlabs HGR020, 1/e² beam diameter 0.83 mm) equipped with a laser line filter (543.5±2 nm, FWHM=10±2 nm). In order to provide good power stability, the lasers were turned-on at least 30 min prior to measurement. Power densities were varied using reflective power density filters (Thorlabs) and measured with an optical power meter (Thorlabs PM100USB with photodiode power sensor S120VC). UV-Vis absorption spectra were recorded on a Shimadzu UV-2401PC or on a Cary Varian spectrometer. Quantum yield measurements were carried out using a green, 150 mW 532 nm Nd:YAG duplicated laser or a far-red 670 nm solid-state laser (all from Roithner Lasertechnik)

Q Y-Measurements of Green-to-Blue Upconverting, Cross-Linked Liquid-Filled Polymeric Materials Relative QY—quasi collinear setup: The photoluminescence (PL) intensities have been integrated in the overall excited volume to take into account the difference in the laser beam attenuation within the sample given by the different absorbances of the standard solution and the glass (FIG. 26). Green-to-blue TTA-UC quantum yields (Table 4) have been measured by taking a PtOEP (c=$10^{-4}$ M), DPA (c=$10^{-2}$ M) solution in THF as a reference, which has a $\phi_{UC}$ of 0.26.[34]

TABLE 4

Absorbances at 532 nm and quantum yields of three different green-to-blue upconverting, cross-linked liquid-filled polymeric materials with the same composition, measured by using the quasi-collinear setup.

| Sample | Absorbance (0.1 cm) | Absorption (0.1 cm) | $\phi_{uc}$ |
|---|---|---|---|
| D1 | 7.6900e-3 | 0.0176 | 0.1693 |
| D2 | 7.4100e-3 | 0.0169 | 0.1528 |
| D3 | 7.3400e-3 | 0.0168 | 0.1103 |
| average | — | — | 0.1441 |
| standard | 0.6964 | 0.7988 | 0.2600 |

Figure 31:
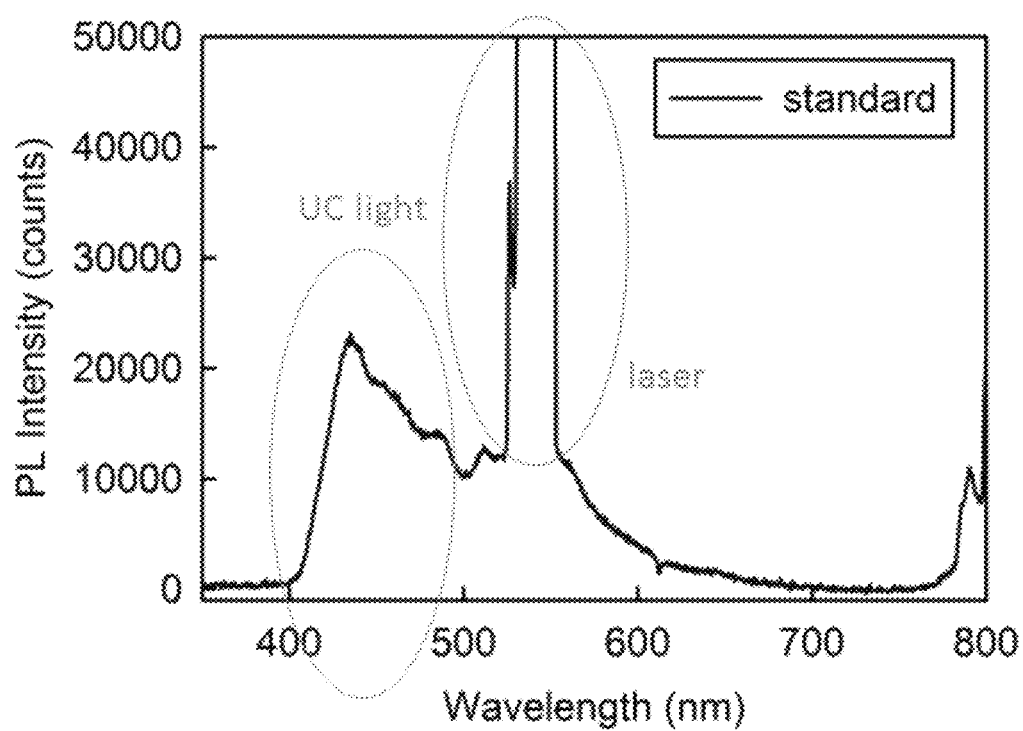
FIG. 31 illustrates a photoluminescence spectrum of the standard green-to-blue upconverting, PtOEP/DPA-containing, air-free THF-solution excited with a 150 mW, 532 nm laser at full power.

Relative QY—Integrating Sphere:

The quantum yields (Table 5) have also been measured by taking the same reference solution as in the previous method PtOEP (c=$10^{-4}$ M) and DPA (c=$10^{-2}$ M) in THF, $\phi_{UC}$=0.26). The relative method was also used with the integrating sphere due to scattering of the incident laser light, especially for the solid samples, in which the absorption is weaker than the standard. Scattering gave a not negligible background signal, which avoided a careful calculation of emitted photons. The amount of absorbed photons has been calculated by considering the ratio between the laser intensity in the sphere with and without the sample. The UC light generated by self-absorption and by re-absorption of the scattered laser light has been taken into account by measuring the UC light generated in the sphere while the laser beam did not hit directly the sample, following the protocol by DeMello et al.[57] No significant signal was detected in this configuration. Further raw-data for calculating the quantum efficiencies are displayed in Appendix FIG. 31.

The average quantum efficiency was obtained by averaging all the quantum efficiencies over both methods $\phi_{UC}$=($\phi_{collinear}$+$\phi_{sphere}$)/2=0.15±0.03

TABLE 5

Quantum yields of three different green-to-blue upconverting, cross-linked liquid-filled polymeric materials with the same composition shown in Table 4, measured by using the integrating sphere setup.

| Sample | $\phi_{uc}$ |
|---|---|
| D1 | 0.1650 |
| D1 - backside | 0.1740 |
| D2 | 0.1716 |
| D2 - backside | 0.1445 |
| D3 | 0.1326 |
| D3 - backside | 0.1452 |
| average | 0.1555 |
| standard | 0.2600 |

The results obtained with the integrating sphere setup are shown in Table 5 and in full agreement with the ones obtained using the quasi collinear setup. The same three different samples with the same composition have been measured twice, from the "front" and the "back".

Q Y-Measurements of NIR-to-Yellow Upconverting, Cross-Linked Liquid-Filled Polymeric Materials Three different samples of the same composition have been measured using the integrating sphere setup without a standard-solution. An average quantum yield $\phi_{UC}$=0.15±0.03 was obtained from six independent measurements (Table 6).

TABLE 6

Quantum yields of three different NIR-to-yellow upconverting, cross-linked liquid-filled polymeric materials with the same composition, measured by using the integrating sphere setup.

| Sample | $\phi_{uc}$ |
|---|---|
| R1 | 0.14 |
| R1 - backside | 0.18 |
| R2 | 0.11 |
| R2 - backside | 0.17 |
| R3 | 0.15 |
| R3 - backside | 0.16 |
| average | 0.15 ± 0.03 |

Syntheses

For the syntheses reported herein, the materials and methods reported in Vadrucci et al.[18] apply. DPA-(CH$_2$OH)$_2$ was synthesized following a similar procedure in the same publication.

9-(4-Hydroxymethylphenyl)-10-phenyl anthracene, DPA-(CH$_2$OH)$_2$

Scheme 1 Microwave-assisted Suzuki-Miyaura synthesis of (anthracene-9,10-diylbis[4,1-phenylene])dimethanol [DPA—(CH$_2$OH)$_2$].

9-(4-Hydroxymethylphenyl)-10-phenyl anthracene, DPA—(CH$_2$OH)$_2$

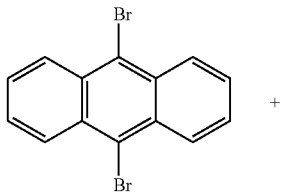

+

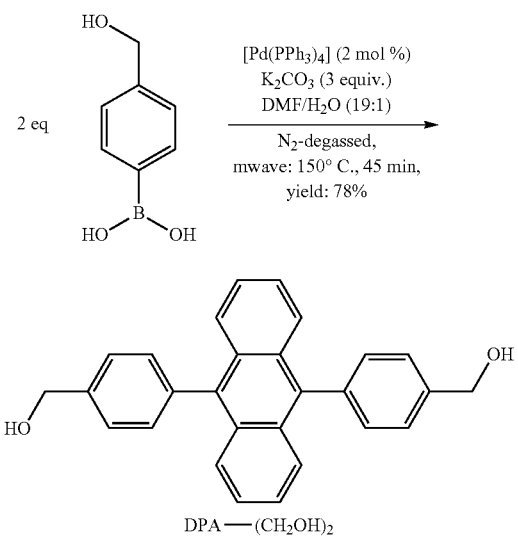

A 20 mL microwave vessel was charged with 9,10-dibromo-anthracene (1 g, 2.98 mmol), (4-hydroxyethyl)phenylboronic acid (996 mg, 6.56 mmol, 2.2 eq.) and $K_2CO_3$ (1.24 g, 8.94 mmol, 3 eq.). DMF (19 mL) and water (1 mL) were added to form a yellow mixture. $Pd(PPh_3)_4$ (69 mg, 60 μmol, 2 mol %) was quickly added to the mixture before sealing the vessel. The reaction mixture was purged with nitrogen for 15 min, subsequently stirred for 5 min at RT and finally heated to 150° C. for 45 min at 5 bar in the microwave synthesizer. A yellowish solution over an off-white precipitate was obtained. This procedure was performed four times and the resulting reaction mixtures combined.

Under continuous shaking, water (100 mL) was added and the resulting mixture filtered through filter paper. The solid residue was then further washed with DCM (3×40 mL), giving a brown filtrate which was discarded. In order to extract the product, the residue was suspended in a 1:1 toluene-ethanol mixture, the solid residue filtered off and the filtrate collected. This procedure was repeated four times, the filtrates collected and solvents removed under vacuo to give 3.6 g (yield: 78%) of a yellow-grey powder.

$T_m$=310.5° C. (DSC, first heating cycle, heating rate 10° C./min)

$^1$H NMR (400.2 MHz, DMSO-d$^6$): δ (ppm)=7.63-7.57 (m, 8H, CH$^{Ar}$), 7.44-7.38 (m, 8H, CH$^{Ar}$), 5.37 (t, $^3$J=5.8 Hz, 2H, CH$_2$OH), 4.70 (d, $^3$J=5.8 Hz, 4H, CH$_2$OH).

$^{13}$C APT NMR (100.6 MHz, CDCl$_3$): δ (ppm)=142.1 (s, C$^{Ar}$), 136.6 (s, C$^{Ar}$), 136.4 (s, C$^{Ar}$), 130.7 (s, CH$^{Ar}$), 129.3 (s, C$^{Ar}$), 126.7 (s, CH$^{Ar}$), 126.5 (s, CH$^{Ar}$), 125.4 (s, CH$^{Ar}$), 62.8 (s, CH$_2$OH).

MS (MALDI): m/z 390.16 (M$^+$)

Scheme 2 DPA-diester was synthesized by a Steglich-esterification of DPA—(CH$_2$OH)$_2$ with 2-heptylundecanoic acid using DCC/DMAP as coupling agents.

[anthracene-9,10-diylbis(4,1-phenylene)] bis(methylene) bis(2-heptylundecanoate)

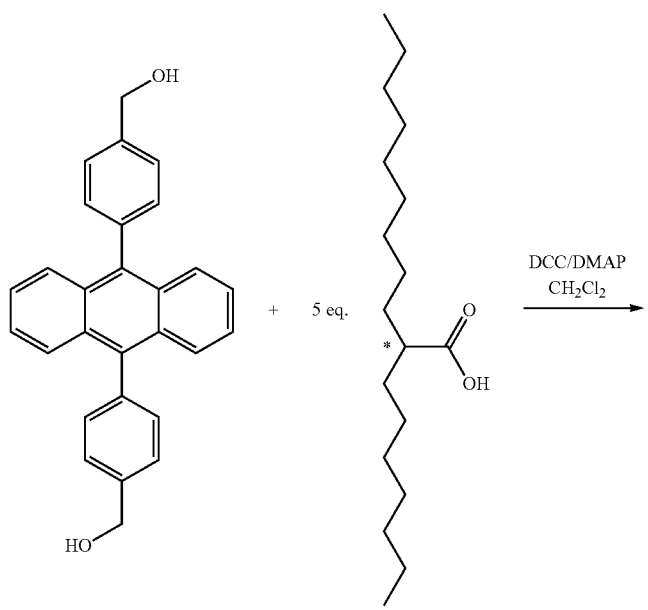

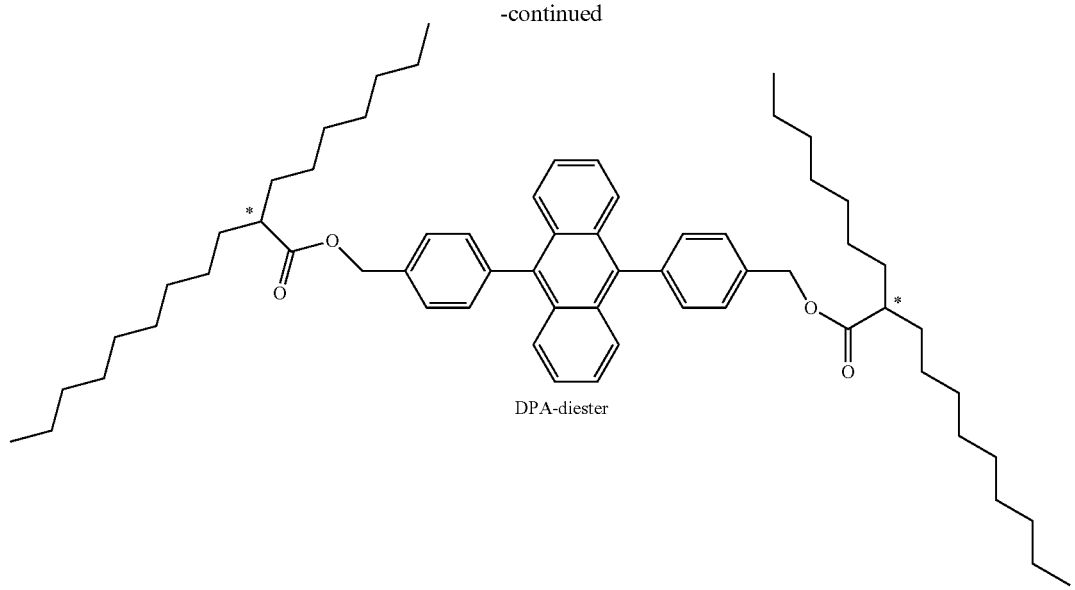
DPA-diester

In a 20 mL round-bottom flask DPA-(CH$_2$OH)$_2$ (500 mg, 1.28 mmol), 2-heptylundecanoic acid (1.82 g, 6.4 mmol, 5 eq.), DCC (792 mg, 3.84 mmol, 3 eq.) and DMAP (78 mg, 0.64 mmol, 0.5 eq.) were suspended in 15 mL DCM and the resulting mixture stirred at 25° C. for 16 h.

The reaction mixture was subsequently adsorbed onto a small amount of silica and purified by column chromatography on silica and a subsequently on alumina by using a hexane/ethyl acetate gradient mixture (2-20%) as eluent. 800 mg of a yellowish oil, which crystallized over the course of 5 days were obtained (yield: 68%).

$T_g$=−47° C., $T_m$=43° C. (DSC, first heating cycle, heating rate 10° C./min)

$^1$H NMR (400.2 MHz, CDCl$_3$): δ (ppm)=7.69-7.66 (m, 4H, CH$^{Anthr}$), 7.60 (d, $^3$J=8 Hz, 4H, CH$^{Ar}$), 7.48 (d, $^3$J=8 Hz, 4H, CH$^{Ar}$), 7.34-7.31 (m, 4H, CH$^{Anthr}$), 5.32 (s, 4H, CO$_2$CH$_2$), 2.49 (h, $^3$J=4 Hz, 2H, CHR$_2$CO$_2$), 1.70 (p, $^3$J=4 Hz, 4H, RR'CHCH$_2$R), 1.53 (p, $^3$J=4 Hz, 4H, RR'CHCH$_2$R), 1.31-1.23 (m, 48H, CH$_2$), 0.87-0.82 (m, 12H, CH$_3$).

$^{13}$C APT NMR (100.6 MHz, CDCl$_3$): δ (ppm)=176.8 (s, RCO$_2$CH$_2$), 139.0 (s, C$^{Ar}$), 136.9 (s, CA), 135.8 (s, C$^{Ar}$), 131.6 (s, CH$^{Ar}$), 130.0 (s, C$^{Ar}$), 128.3 (s, CH$^{Ar}$), 127.0 (s, CH$^{Ar}$), 125.2 (s, CH$^{Ar}$), 65.9 (s, CO$_2$CH$_2$C$^{Ar}$), 46.0 (s, R$_2$CHCO$_2$R'), 32.8 (s, CH$_2$), 32.0 (s, CH$_2$), 32.0 (s, CH$_2$), 29.8 (s, CH$_2$), 29.7 (s, CH$_2$), 29.7 (s, CH$_2$), 29.7 (s, CH$_2$), 29.5 (s, CH$_2$), 29.3 (s, CH$_2$), 27.7 (s, CH$_2$), 22.8 (s, CH$_2$), 22.8 (s, CH$_2$), 14.2 (s, CH$_3$).

MS (MALDI): m/z 922.68 (M$^+$)

REFERENCES

1. T. N. Singh-Rachford and F. N. Castellano, *Coord. Chem. Rev.*, 2010, 254, 2560-2573.
2. Y. C. Simon and C. Weder, *J. Mater. Chem.*, 2012, 22, 20817-20830.
3. M. C. DeRosa and R. J. Crutchley, *Coord. Chem. Rev.*, 2002, 233-234, 351-371.
4. K. Moth-Poulsen, D. Coso, K. Borjesson, N. Vinokurov, S. K. Meier, A. Majumdar, K. P. C. Vollhardt and R. A. Segalman, *Energy Environ. Sci.*, 2012, 5, 8534-8537.
5. K. Borjesson, D. Dzebo, B. Albinsson and K. Moth-Poulsen, *J. Mater. Chem. A*, 2013, 1, 8521-8524.
6. V. Gray, D. Dzebo, M. Abrahamsson, B. Albinsson and K. Moth-Poulsen, *Phys. Chem. Chem. Phys.*, 2014, 16, 10345-10352.
7. R. S. Khnayzer, J. Blumhoff, J. A. Harrington, A. Haefele, F. Deng and F. N. Castellano, *Chem. Commun.*, 2012, 48, 209-211.
8. A. Monguzzi, F. Bianchi, A. Bianchi, M. Mauri, R. Simonutti, R. Ruffo, R. Tubino and F. Meinardi, *Adv. Energy Mater.*, 2013, 3, 680-686.
9. C. Ye, B. Wang, R. Hao, X. Wang, P. Ding, X. Tao, Z. Chen, Z. Liang and Y. Zhou, *J. Mater. Chem. C*, 2014, 2, 8507-8514.
10. Z. Jiang, M. Xu, F. Li and Y. Yu, *J. Am. Chem. Soc.*, 2013, 135, 16446-16453.
11. Q. Liu, T. Yang, W. Feng and F. Li, *J. Am. Chem. Soc.*, 2012, 134, 5390-5397.
12. Q. Liu, W. Feng, T. Yang, T. Yi and F. Li, *Nat. Protocols*, 2013, 8, 2033-2044.
13. S. M. Borisov, C. Larndorfer and I. Klimant, *Adv. Funct. Mater.*, 2012, 22, 4360-4368.
14. S. A. Bagnich and H. Bassler, *Chem. Phys. Lett.*, 2003, 381, 464-470.
15. P. E. Keivanidis, S. Baluschev, T. Miteva, G. Nelles, U. Scherf, A. Yasuda and G. Wegner, *Adv. Mater.*, 2003, 15, 2095-2098.
16. P. Duan, N. Yanai, Y. Kurashige and N. Kimizuka, *Angew. Chem. Int. Ed.*, 2015, 54, 7544-7549.
17. P. Mahato, A. Monguzzi, N. Yanai, T. Yamada and N. Kimizuka, *Nat. Mater.*, 2015, 14, 924-930.
18. R. Vadrucci, C. Weder and Y. C. Simon, *J. Mater. Chem. C*, 2014, 2, 2837-2841.
19. R. Vadrucci, C. Weder and Y. C. Simon, *Mater. Horiz.*, 2015, 2, 120-124.
20. P. Duan, N. Yanai, H. Nagatomi and N. Kimizuka, *J. Am. Chem. Soc.*, 2015, 137, 1887-1894.
21. K. Sripathy, R. W. MacQueen, J. R. Peterson, Y. Y. Cheng, M. Dvorak, D. R. McCamey, N. D. Treat, N. Stingelin and T. W. Schmidt, *J. Mater. Chem. C*, 2015, 3, 616-622.
22. R. Perez-Ruiz and D. Diaz Diaz, *Soft Matter*, 2015, 11, 5180-5187.

23. R. R. Islangulov, J. Lott, C. Weder and F. N. Castellano, *J. Am. Chem. Soc.,* 2007, 129, 12652-12653.
24. T. N. Singh-Rachford, J. Lott, C. Weder and F. N. Castellano, *J. Am. Chem. Soc.,* 2009, 131, 12007-12014.
25. P. B. Merkel and J. P. Dinnocenzo, *J. Lumin.,* 2009, 129, 303-306.
26. S. H. Lee, J. R. Lott, Y. C. Simon and C. Weder, *J. Mater. Chem. C,* 2013, 1, 5142-5148.
27. S. H. Lee, M. A. Ayer, R. Vadrucci, C. Weder and Y. C. Simon, *Polym. Chem.,* 2014, 5, 6898-6904.
28. S. H. Lee, D. C. Thévenaz, C. Weder and Y. C. Simon, *J. Polym. Sci., Part A: Polym. Chem.,* 2015, 53, 1629-1639.
29. S.-H. Lee, Á. Sonseca, R. Vadrucci, E. Giménez, E. J. Foster and Y. Simon, *J. Inorg. Organomet. Polym.,* 2014, 24, 898-903.
30. A. Monguzzi, R. Tubino and F. Meinardi, *Phys. Rev. B,* 2008, 77, 155122.
31. A. Monguzzi, R. Tubino, M. M. Salamone and F. Meinardi, *Phys. Rev. B,* 2010, 82, 125113.
32. C. Wohnhaas, K. Friedemann, D. Busko, K. Landfester, S. Baluschev, D. Crespy and A. Turshatov, *ACS Macro Lett.,* 2013, 2, 446-450.
33. A. J. Svagan, D. Busko, Y. Avlasevich, G. Glasser, S. Baluschev and K. Landfester, *ACS Nano,* 2014, 8, 8198-8207.
34. A. Monguzzi, R. Tubino, S. Hoseinkhani, M. Campione and F. Meinardi, *Phys. Chem. Chem. Phys.,* 2012, 14, 4322-4332.
35. C. L. Lester, S. M. Smith, C. D. Colson and C. A. Guymon, *Chem. Mater.,* 2003, 15, 3376-3384.
36. D. L. Gin, W. Gu, B. A. Pindzola and W.-J. Zhou, *Acc. Chem. Res.,* 2001, 34, 973-980.
37. K. Yamamoto, E. Ito, S. Fukaya and H. Takagi, *Macromolecules,* 2009, 42, 9561-9567.
38. M. Yokota, H. Ajiro and M. Akashi, *J. Appl. Polym. Sci.,* 2013, 127, 3325-3332.
39. M. Seo and M. A. Hillmyer, *Science,* 2012, 336, 1422-1425.
40. M. W. Schulze, L. D. Mcintosh, M. A. Hillmyer and T. P. Lodge, *Nano Lett.,* 2014, 14, 122-126.
41. F. N. Castellano and T. N. Singh-Rachford, *J. Phys. Chem. A,* 2009, 113, 5912-5917.
42. S. Baluschev, T. Miteva, V. Yakutkin, G. Nelles, A. Yasuda and G. Wegner, *Phys. Rev. Lett.,* 2006, 97, 143903.
43. F. N. Castellano and T. N. Singh-Rachford, *J. Phys. Chem. A,* 2008, 112, 3550-3555.
44. T. N. Singh-Rachford and F. N. Castellano, *J. Phys. Chem. Lett.,* 2009, 1, 195-200.
45. A. Monguzzi, R. Tubino and F. Meinardi, *J. Phys. Chem. A,* 2009, 113, 1171-1174.
46. S. Peng, Q. Guo, T. C. Hughes and P. G. Hartley, *Macromolecules,* 2011, 44, 3007-3015.
47. K. A. Page, D. England and J. Texter, *ACS Macro Lett.,* 2012, 1, 1398-1402.
48. M. Gratzel, *Nature,* 2001, 414, 338-344.
49. A. Monguzzi, J. Mezyk, F. Scotognella, R. Tubino and F. Meinardi, *Phys. Rev. B,* 2008, 78, 195112.
50. A. Haefele, J. Blumhoff, R. S. Khnayzer and F. N. Castellano, *J. Phys. Chem. Lett.,* 2012, 3, 299-303.
51. J. C. Goldschmidt and S. Fischer, *Adv. Optical Mater.,* 2015, 3, 510-535.
52. J. Zhou, Q. Liu, W. Feng, Y. Sun and F. Li, *Chem. Rev.,* 2015, 115, 395-465.
53. S. Amemori, N. Yanai and N. Kimizuka, *Phys. Chem. Chem. Phys.,* 2015, 17, 22557-22560.
54. V. Yakutkin, S. Aleshchenkov, S. Chernov, T. Miteva, G. Nelles, A. Cheprakov and S. Baluschev, *Chem. Eur. J.,* 2008, 14, 9846-9850.
55. V. Yakutkin, M. A. Filatov, I. Z. Ilieva, K. Landfester, T. Miteva and S. Baluschev, *Photochem. Photobiol. Sci.,* 2015.
56. P. Duan, N. Yanai and N. Kimizuka, *J. Am. Chem. Soc.,* 2013, 135, 19056-19059.
57. J. C. de Mello, H. F. Wittmann and R. H. Friend, *Adv. Mater.,* 1997, 9, 230-232.

What is claimed is:

1. A light upconverting phase-separated material made by curing a curable composition, comprising: at least one solid phase that comprises, by majority, a polymer; and containing at least one liquid phase,
   wherein the at least one liquid phase and the at least one solid phase have different polarities,
   wherein said at least one liquid phase contains at least a dye pair that is capable of optical upconversion by triplet-triplet annihilation.

2. The light upconverting phase-separated material according to claim 1, wherein said curing involves a polymerization reaction.

3. The light upconverting phase-separated material according to claim 2, wherein said polymerization reaction is a radical polymerization reaction.

4. The light upconverting phase-separated material according to claim 3, wherein said polymerization reaction is a free radical polymerization reaction.

5. The light upconverting phase-separated material according to claim 1, wherein said light-upconverting phase-separated material is substantially transparent, wherein the phase-separated material displays a transmission of at least 50% measured over a path length of 1 cm at any wavelength between 415 and 670 nm.

6. The light upconverting phase-separated material according to claim 1, in which the liquid phase or phases forms or form domains with dimensions of maximally 100 nm.

7. The light upconverting phase-separated material according to claim 1, wherein said solid phase contains at least one polymer in an amount of at least 50 wt. % based on the total weight of the solid phase.

8. The light upconverting phase-separated material according to claim 1, wherein said at least one liquid phase is present in an amount of 1-70 wt. % based on the combined total weight of the material.

9. The light upconverting phase-separated material according to claim 1, wherein said at least one liquid phase includes at least one hydrophobic liquid in an amount of at least about 1 wt. % based on the combined total weight of the material, and wherein said at least one hydrophobic liquid has a boiling temperature of more than 100° C., and wherein said at least one hydrophobic liquid has a solidification temperature of less than 20° C.

10. The light upconverting phase-separated material according to claim 1, wherein said light-upconverting phase-separated material contains at least one cationic, nonionic or anionic surfactant preferably in an amount of less than 30 wt. % based on the total weight of the material, wherein the material comprises cetyltrimethylammonium bromide as surfactant.

11. The light upconverting phase-separated material according to claim 1, wherein said light-upconverting phase-separated material contains at least one plasticizer in the at least one solid phase.

12. The light upconverting phase-separated material according to claim 1, wherein said at least one solid phase includes a polymer formed by radical polymerization, wherein the polymer comprises one or more of acrylates, methacrylates, acrylamides, methacrylamides, acrylic acids, methacrylic acids, and their salts, vinylpyridines, oxazolines.

13. The light upconverting phase-separated material according to claim 1, wherein said at least one liquid phase is not liquid crystalline.

14. The light upconverting phase-separated material according to claim 1, which is characterized by an upconversion quantum efficiency of at least 0.001.

15. The light upconverting phase-separated material according to claim 14, which is characterized by an upconversion quantum efficiency of 0.14 or more.

16. The light upconverting phase-separated material according to claim 1, wherein said light-upconverting phase-separated material is substantially transparent, wherein the phase-separated material displays a transmission of at least 70% measured over a path length of 1 cm at any wavelength between 415 and 670 nm; in which the liquid phase or phases forms or form domains with dimensions of maximally 50 nm; wherein said solid phase contains at least one polymer in an amount of at least about 70 wt. % based on the total weight of the solid phase; wherein said at least one liquid phase is present in an amount of up to 40 wt. % based on the combined total weight of the material; wherein said at least one liquid phase includes at least one hydrophobic liquid in an amount of at least about 5 wt. %, based on the combined total weight of the material; wherein said at least one hydrophobic liquid has a boiling temperature of more than 200° C.; wherein said at least one hydrophobic liquid has a solidification temperature of less than 20° C.; wherein said light-upconverting phase-separated material contains at least one cationic, nonionic or anionic surfactant preferably in an amount about 0.5 wt. % to about 20 wt. % based on the total weight of the material and which is characterized by an upconversion quantum efficiency of at least 0.01.

17. The light upconverting phase-separated material according to claim 1, wherein said light-upconverting phase-separated material is substantially transparent, wherein preferably the phase-separated material displays a transmission of at least 85% measured over a path length of 1 cm at any wavelength between 415 and 670 nm; in which the liquid phase or phases forms or form domains with dimensions of maximally 30 nm; wherein said solid phase contains at least one polymer in an amount of at least about 80 wt. % based on the total weight of the solid phase; wherein said at least one liquid phase is present in an amount of up to 30 wt. % based on the combined total weight of the material; wherein said at least one liquid phase includes at least one hydrophobic liquid in an amount of at least about 10 wt. %, based on the combined total weight of the material; wherein said at least one hydrophobic liquid has a boiling temperature of more than 250° C.; wherein said at least one hydrophobic liquid has a solidification temperature of less than 0° C.; wherein said light-upconverting phase-separated material contains at least one cationic, nonionic or anionic surfactant preferably in an amount of from about 2 wt. % to about 15 wt. % based on the total weight of the material and which is characterized by an upconversion quantum efficiency of at least 0.05.

18. A method for producing a light upconverting phase-separated material, containing at least one solid phase that comprises, by majority, a polymer, and containing at least one liquid phase, wherein said at least one liquid phase contains at least a dye pair that is capable of optical upconversion by triplet-triplet annihilation, wherein the at least one liquid phase and the at least one solid phase have different polarities,
comprising the steps of:
providing a curable composition and curing said curable composition to form said light upconverting phase-separated material,
wherein said curable composition is a liquid containing at least one polymerizable monomer, a non-polymerizable liquid, and at least one dye pair that is capable of optical upconversion, wherein preferably the polymerizable monomer is selected from hydrophilic monomers, and the non-polymerizable liquid is selected from hydrophobic liquids.

19. The method according to claim 18, where said curable composition contains at least one cationic, nonionic or anionic surfactant in an amount of less than 30 wt. % based on the total weight of the curable composition, wherein the surfactant is cetyltrimethylammonium bromide.

20. The method according to claim 19, where said curable composition contains at least one cationic, nonionic or anionic surfactant in an amount from about 0.5 wt. % to about 20 wt. % based on the total weight of the curable composition, wherein said curing involves a radical polymerization reaction, wherein said solid phase contains at least one polymer in an amount of 50 wt. % to about 90 wt. % based on the total weight of the composition and wherein said at least one liquid phase includes at least one hydrophobic liquid in an amount of at least 5 wt. % based on the combined total weight of the material, wherein said at least one hydrophobic liquid has a boiling temperature of more than 200° C., and wherein said at least one hydrophobic liquid has a solidification temperature of less than 20° C.

21. The method according to claim 20, where said curable composition contains at least one cationic, nonionic or anionic surfactant in an amount from about 2 wt. % to about 15 wt. % based on the total weight of the curable composition, and wherein said curing involves a radical polymerization reaction, wherein said solid phase contains at least one polymer in an amount of 50 wt. % to about 75 wt. % based on the total weight of the composition, wherein said at least one liquid phase includes at least one hydrophobic liquid in an amount of about 10 wt. % based on the combined total weight of the material, wherein said at least one hydrophobic liquid has a boiling temperature of more than 250° C., and wherein said at least one hydrophobic liquid has a solidification temperature of less than 0° C.

22. The method according to claim 19, wherein said curing involves a free radical polymerization reaction, wherein said solid phase contains at least one polymer in an amount of at least 50 wt. % based on the total weight of the composition and wherein said at least one liquid phase includes at least one hydrophobic liquid in an amount of about 1 wt. % based on the combined total weight of the material, and wherein said at least one hydrophobic liquid has a boiling temperature of more than 100° C., and wherein said at least one hydrophobic liquid has a solidification temperature of less than 20° C.

23. A liquid curable composition, comprising: at least one monomer polymerizable by radical polymerization, at least one non-polymerizable liquid, and at least one dye pair that is capable of optical upconversion by triplet-triplet annihilation, and one or more auxiliary components selected from surfactants, plasticizers, stabilizers, wherein said liquid curable composition can be cured into a light upconverting phase-separated material that comprises at least one solid phase and at least one liquid phase, and wherein the at least one liquid phase and the at least one solid phase have different polarities.

24. The liquid curable composition according to claim 23, consisting of
  a) 30-90 wt. % of the monomer or monomers,
  b) 1-70 wt. % of a hydrophobic non-polymerizable liquid,
  c) 0.0001-20 wt. % of dyes capable of optical upconversion, and
  d) 0.5-40 wt. % of at least one auxiliary component selected from surfactants, plasticizers and stabilizers.

25. The liquid curable composition according to claim 23, wherein said at least one monomer is hydrophilic and said at least one non-polymerizable liquid is hydrophobic.

\* \* \* \* \*